Figure 6:
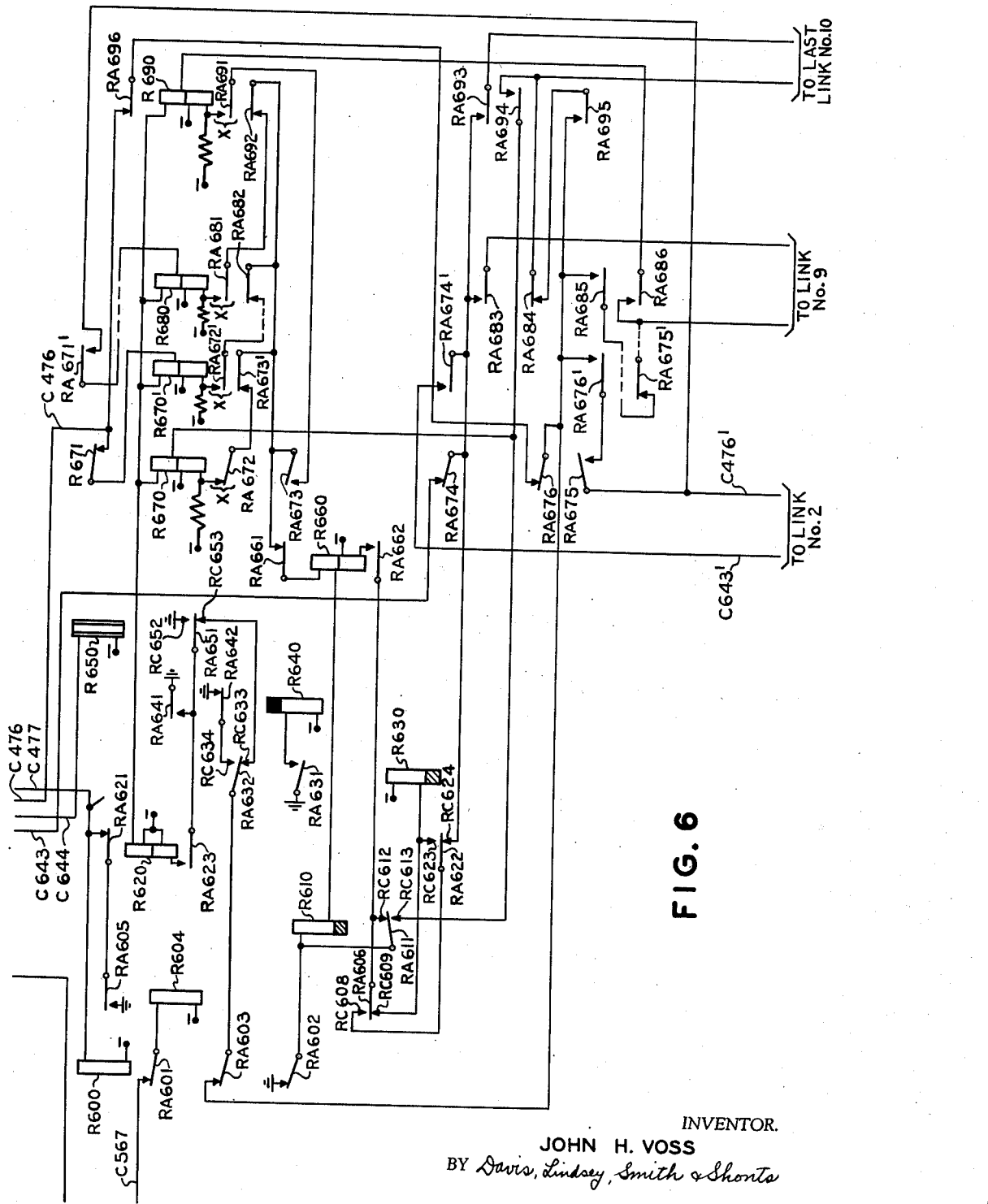

Aug. 12, 1941.    J. H. VOSS    2,252,309
TELEPHONE SYSTEM
Filed Feb. 7, 1938    14 Sheets-Sheet 1
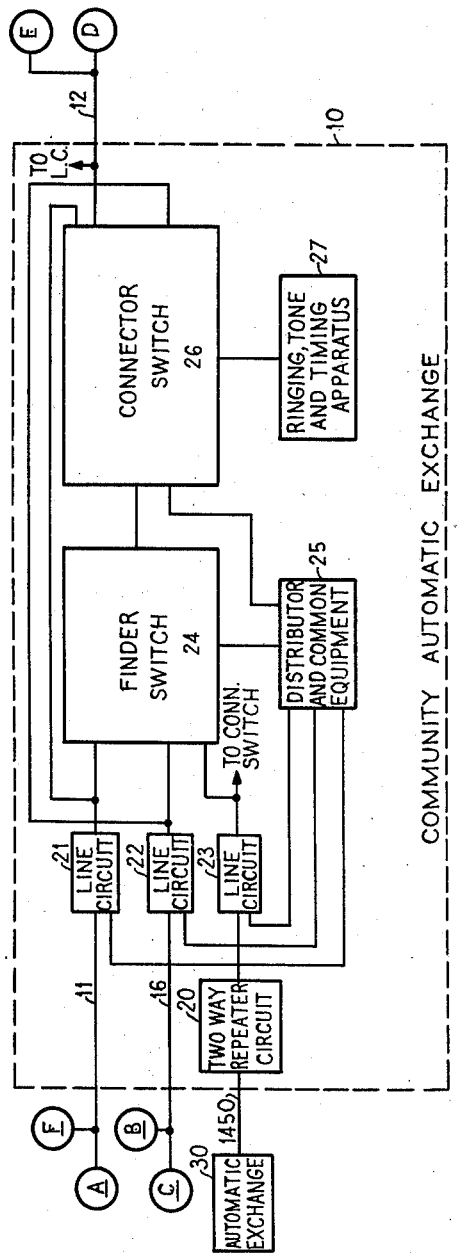
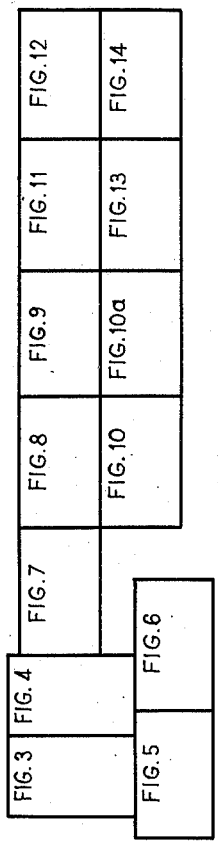
INVENTOR.
JOHN H. VOSS
BY Davis, Lindsey, Smith & Shonts
ATTORNEYS.

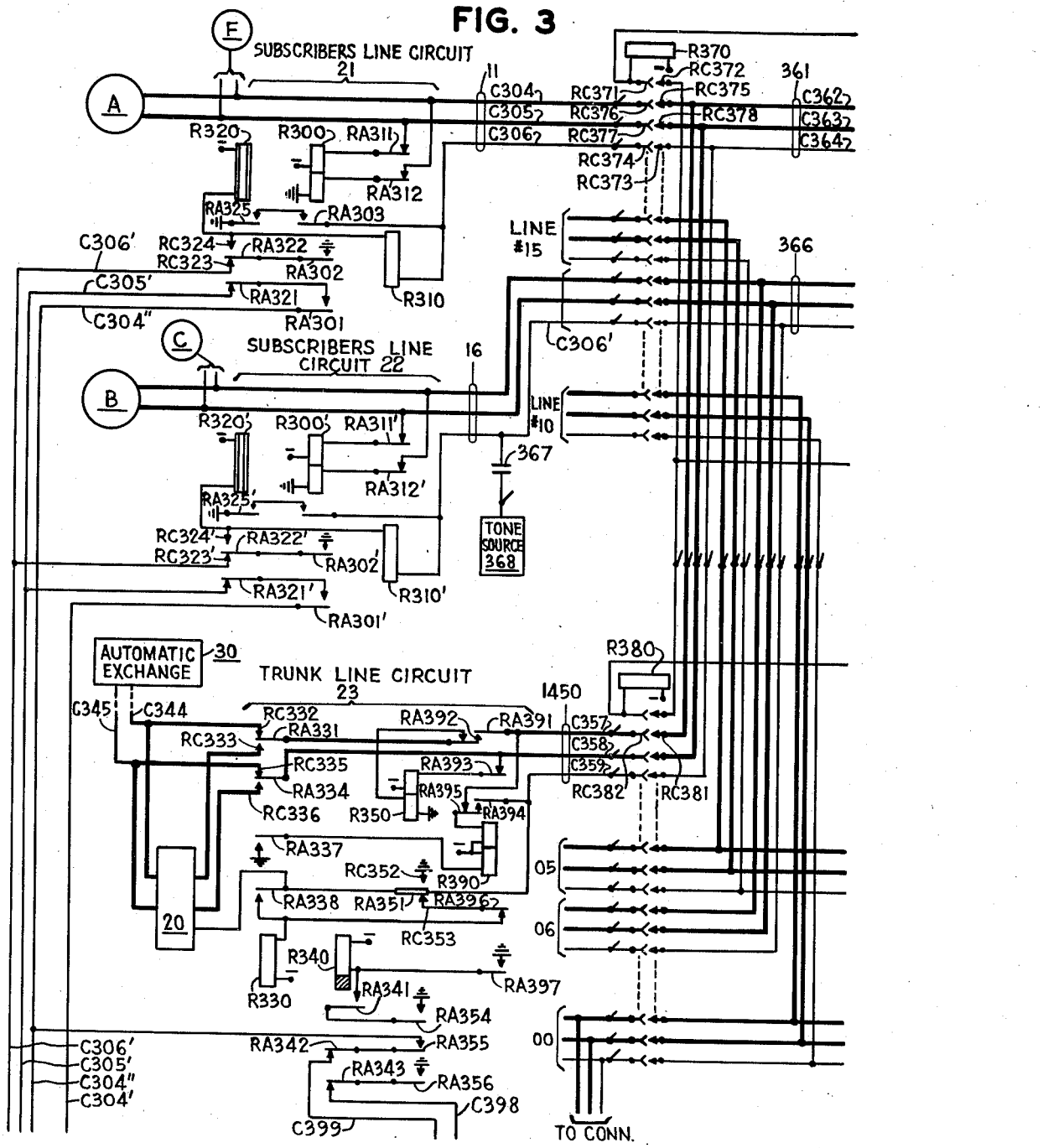

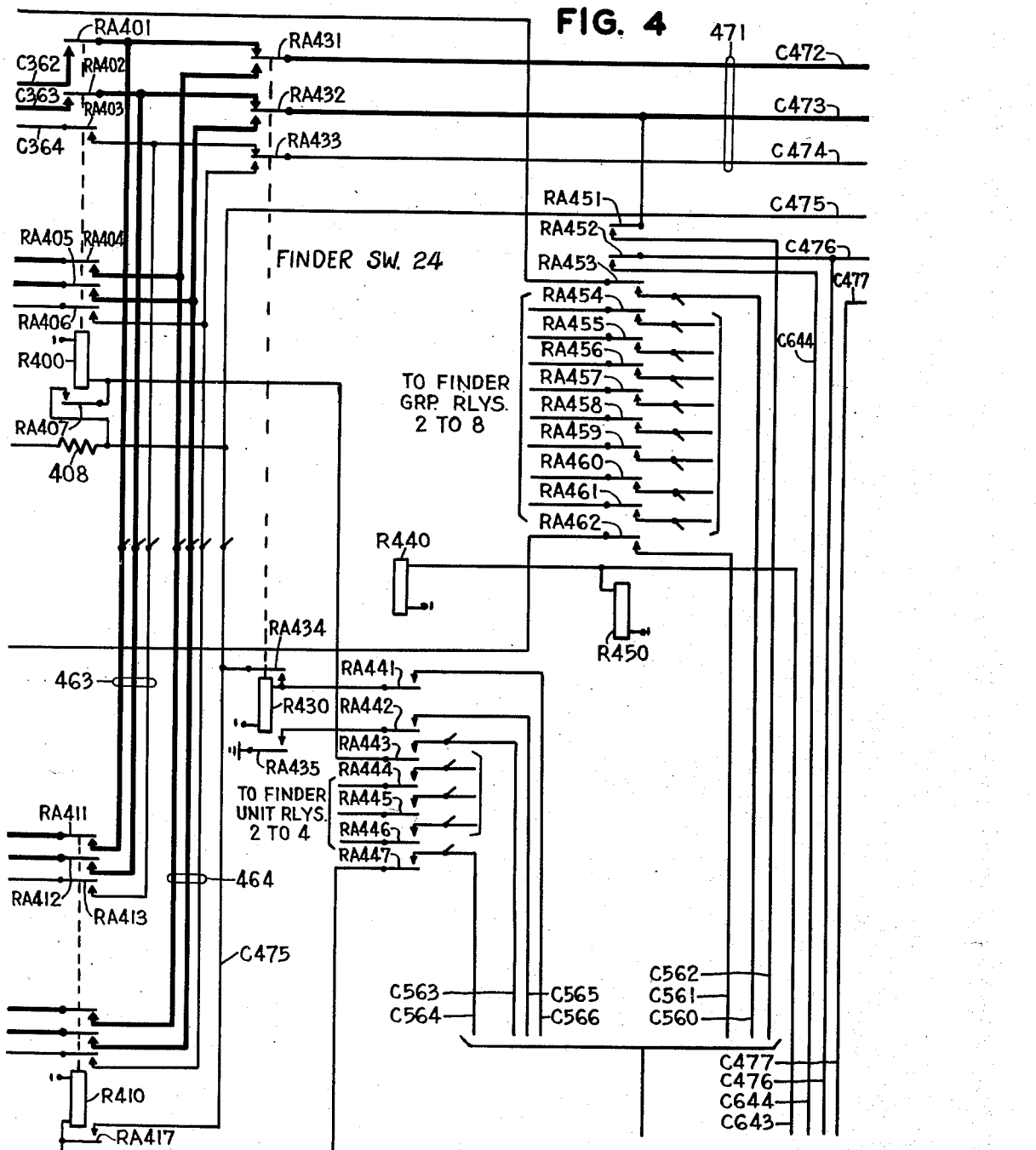

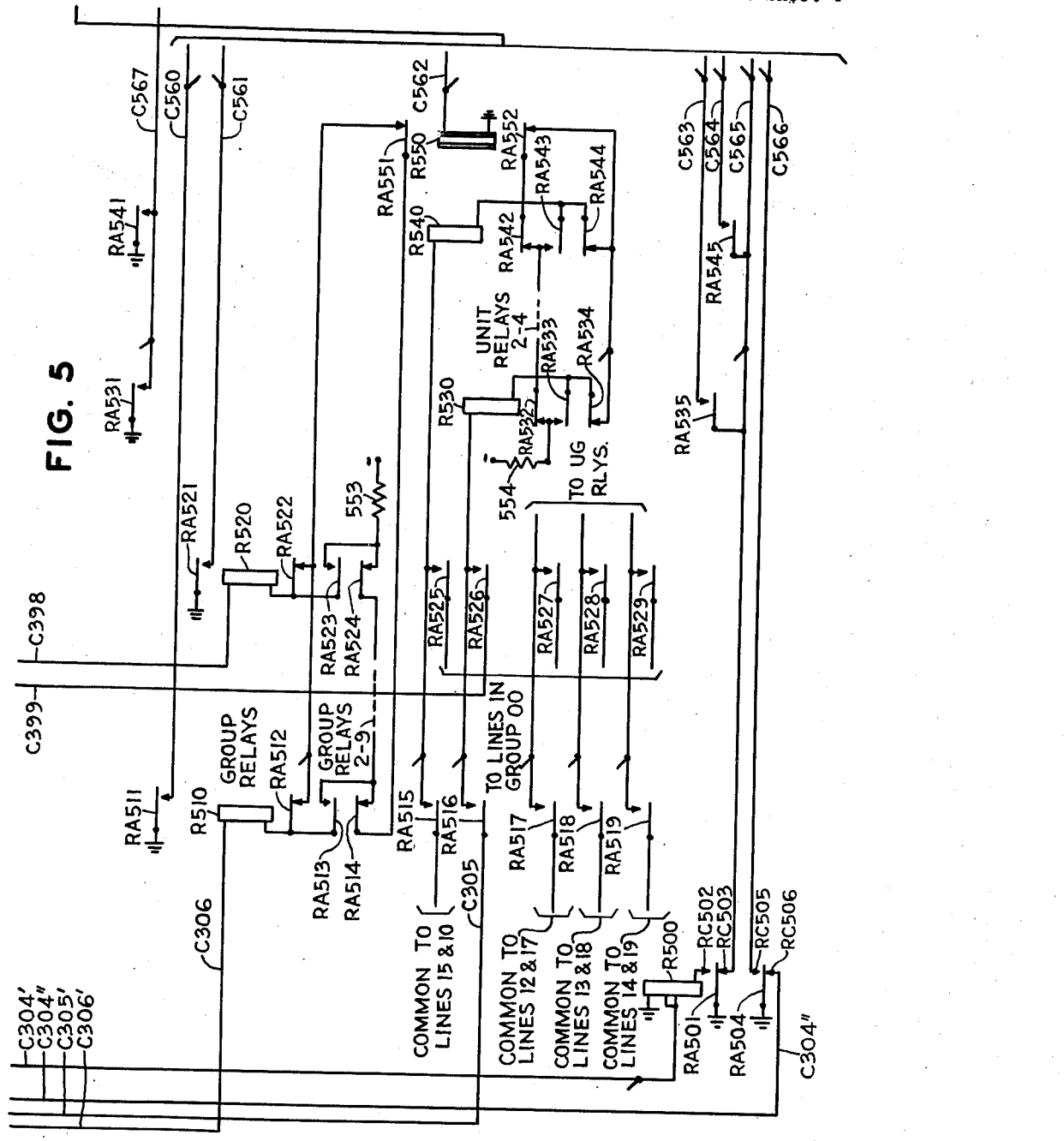

Aug. 12, 1941.  J. H. VOSS  2,252,309
TELEPHONE SYSTEM
Filed Feb. 7, 1938  14 Sheets-Sheet 5

INVENTOR.
JOHN H. VOSS
BY Davis, Lindsey, Smith & Shonts
ATTORNEYS

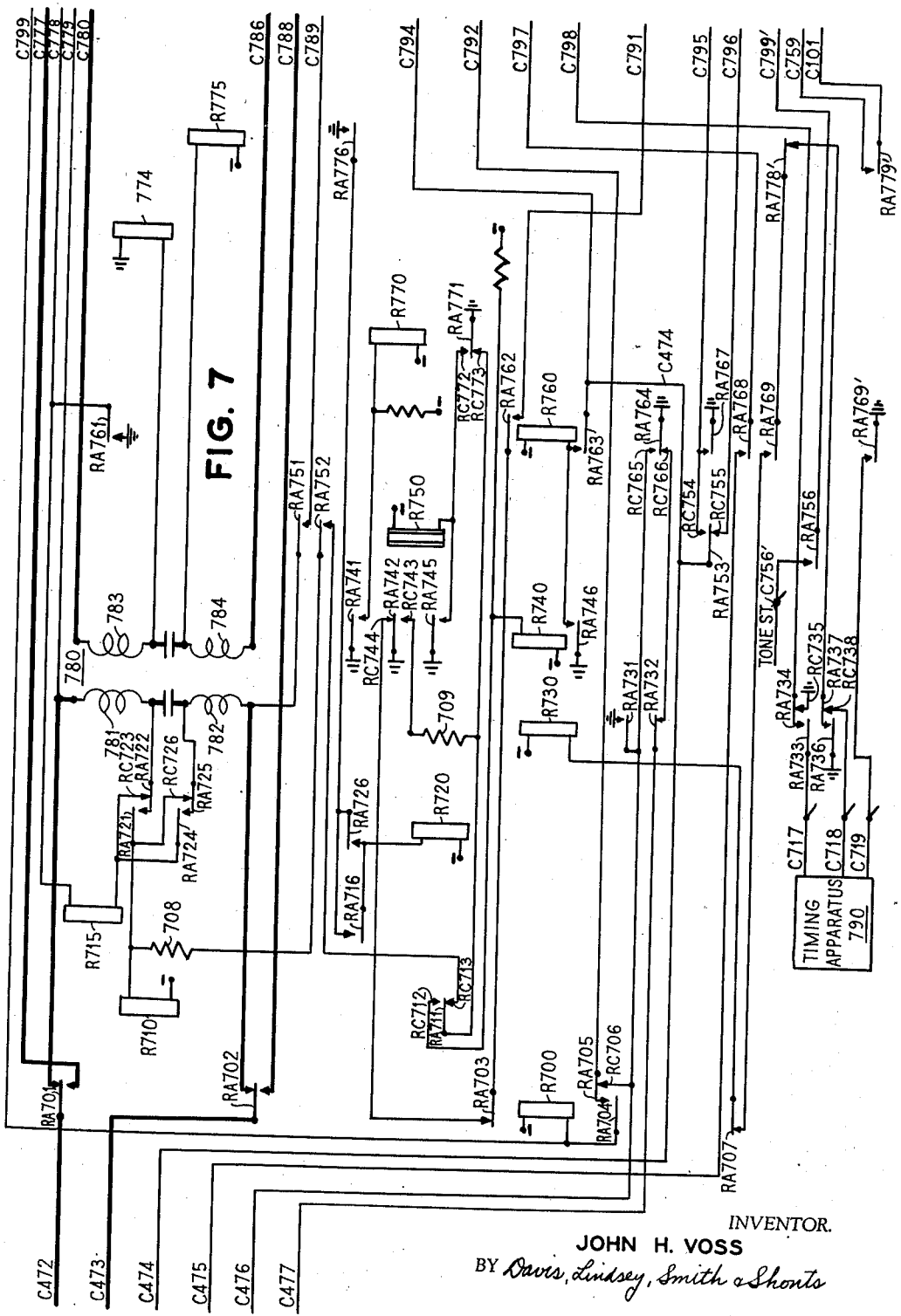

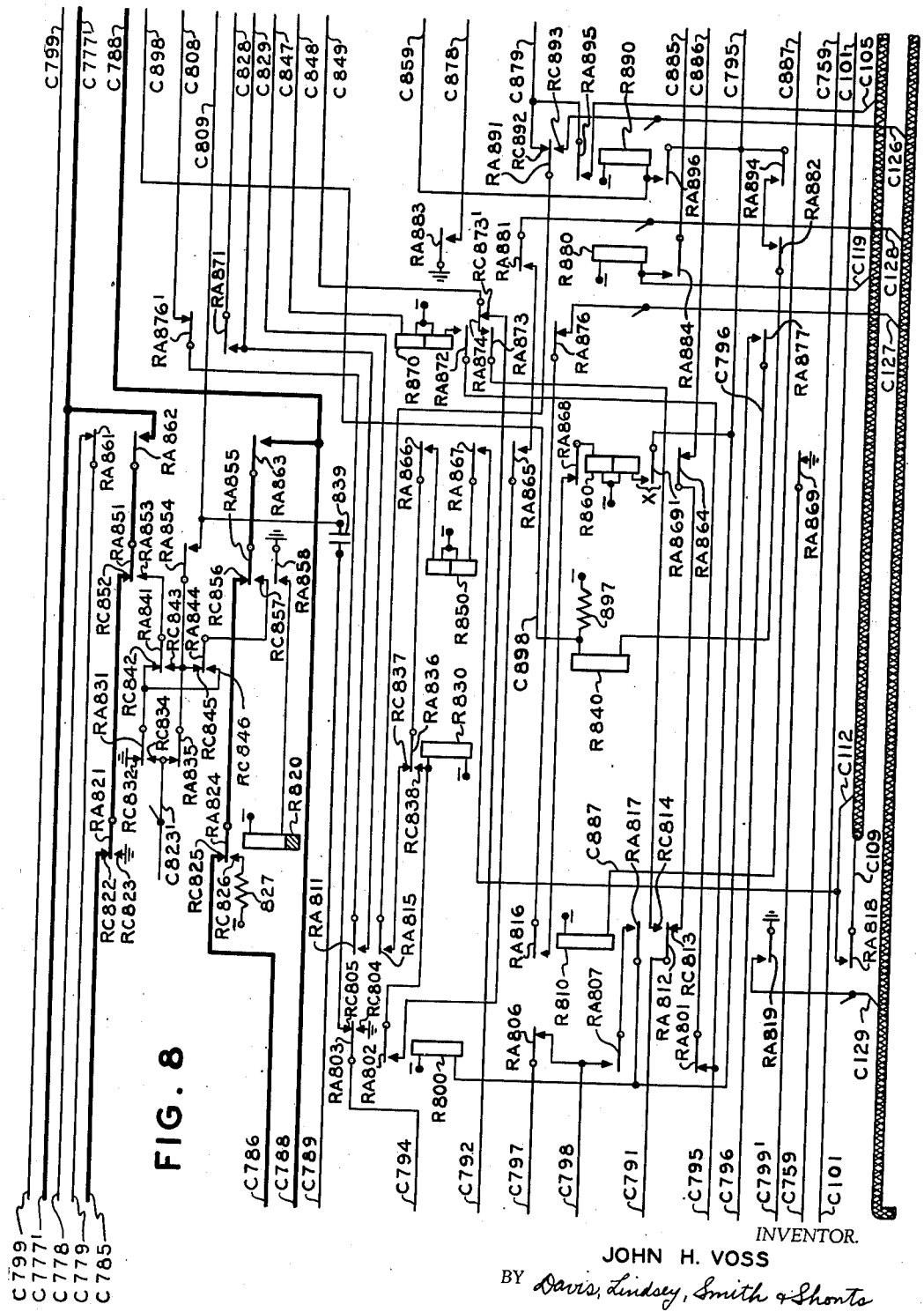

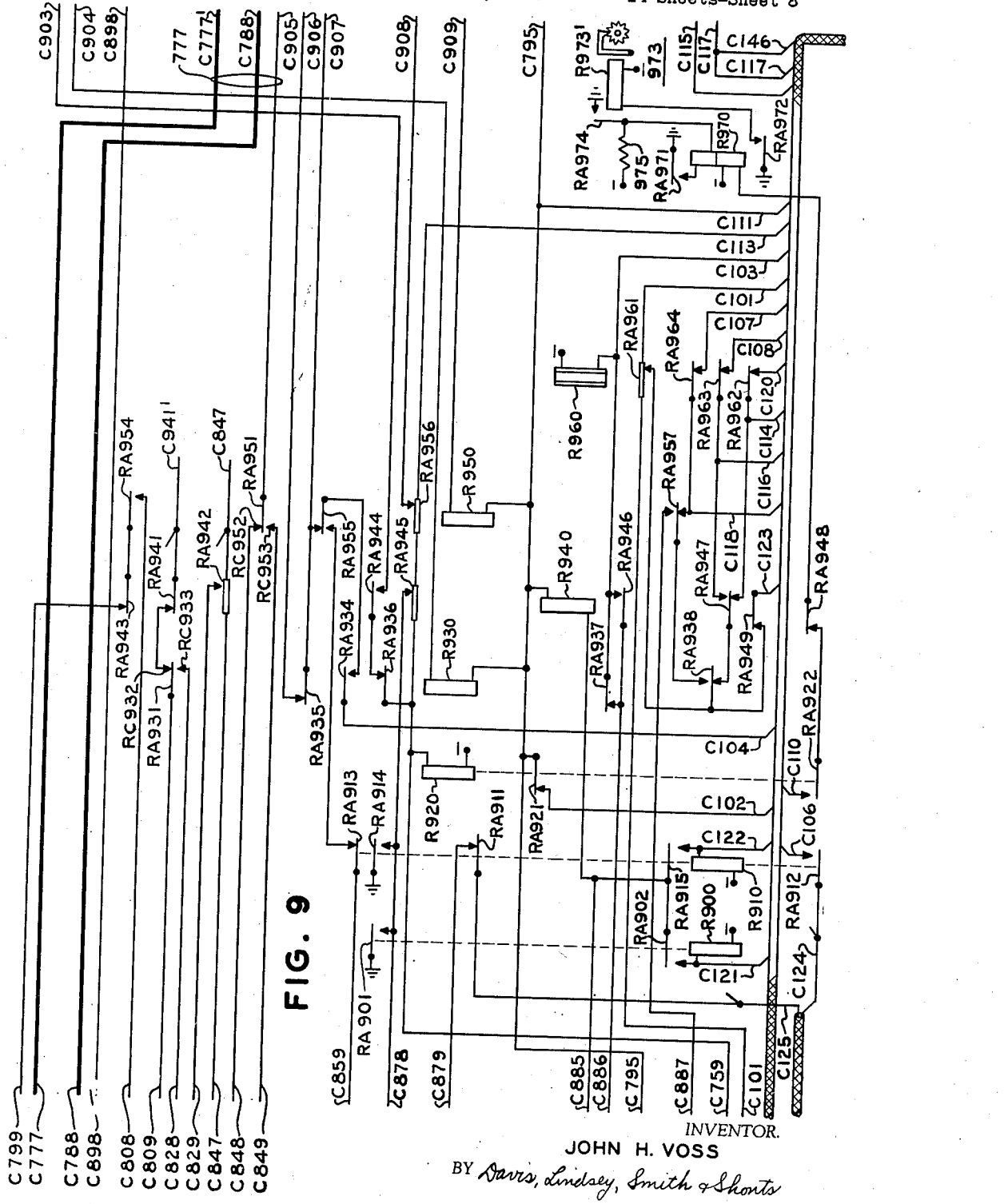

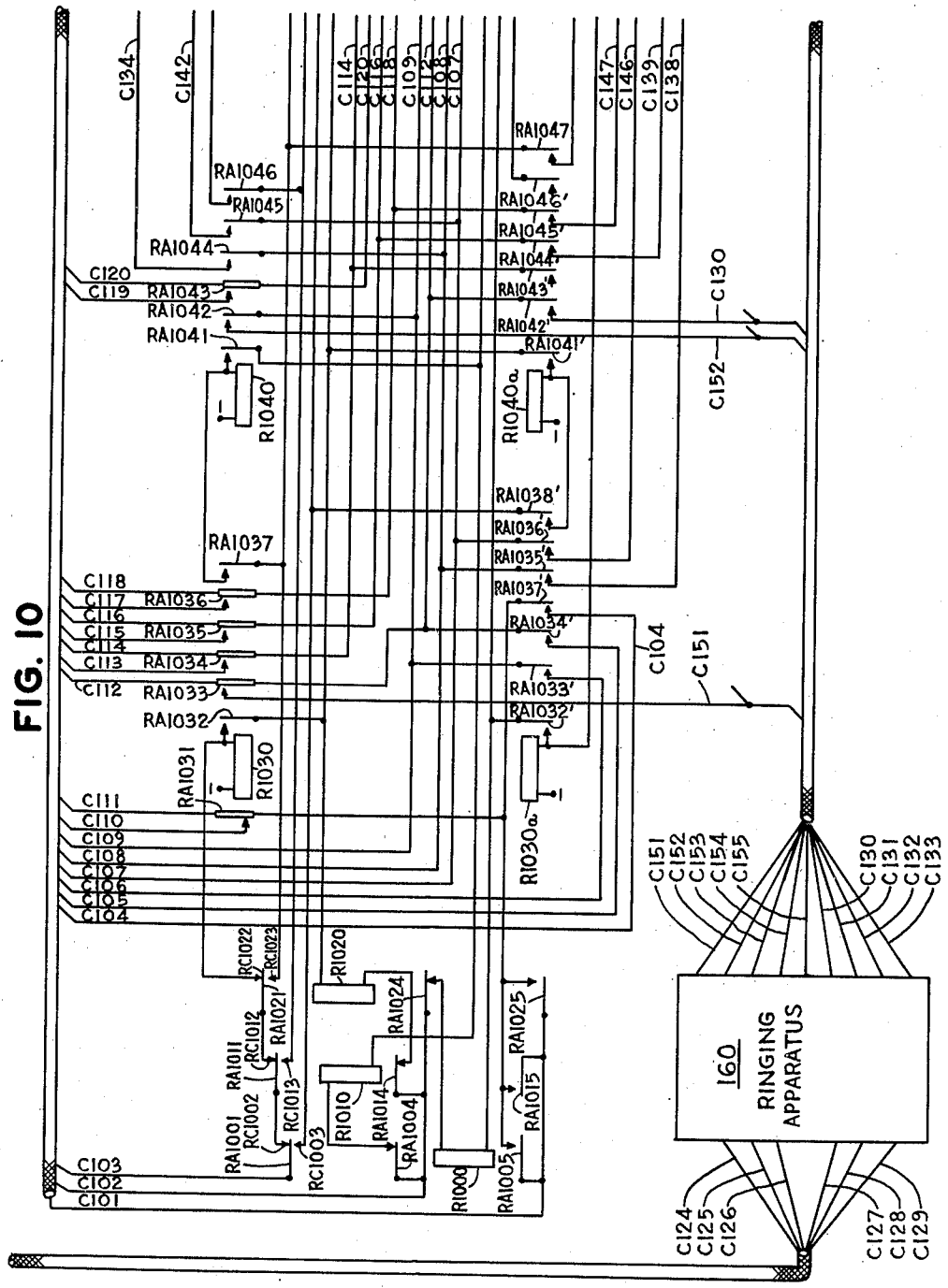

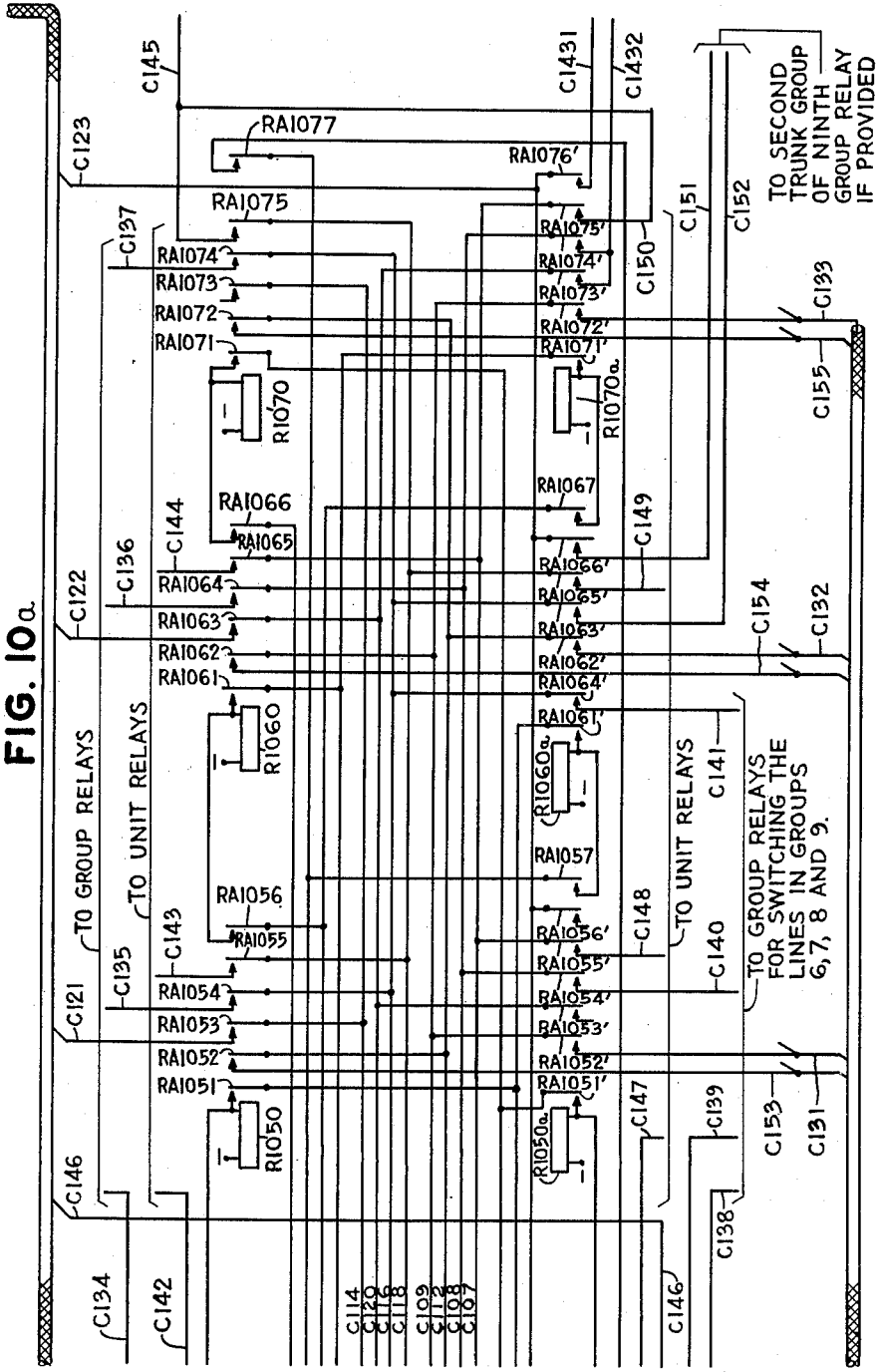

Aug. 12, 1941.    J. H. VOSS    2,252,309

TELEPHONE SYSTEM

Filed Feb. 7, 1938    14 Sheets-Sheet 11

INVENTOR.
JOHN H. VOSS
BY Davis, Lindsey, Smith & Shonts
ATTORNEYS.

Aug. 12, 1941.   J. H. VOSS   2,252,309
TELEPHONE SYSTEM
Filed Feb. 7, 1938   14 Sheets-Sheet 14

INVENTOR.
JOHN H. VOSS
BY Davis, Lindsey, Smith & Shouts
ATTORNEYS.

Patented Aug. 12, 1941

2,252,309

UNITED STATES PATENT OFFICE 2,252,309

TELEPHONE SYSTEM

John H. Voss, Downers Grove, Ill., assignor to Associated Electric Laboratories, Inc., Chicago, Ill., a corporation of Delaware Application February 7, 1938, Serial No. 189,121

104 Claims. (Cl. 179—17)

REISSUED
DEC 21 1943

The present invention relates to telephone systems and has for one of its objects the provision of improvements in small automatic systems of the type adapted for installation in small towns or villages.

An automatic telephone system of the character noted is generally known as a community automatic exchange or C. A. X. and usually has a line capacity of one hundred lines or less. Certain of the subscribers' lines may be of the metallic, two-conductor variety while others of the subscribers' lines may be of the well-known ground return type. The metallic lines are usually of the multi-party type and bridged or divided code ringing is utilized for selectively signaling the substations thereon. In order to provide toll service to the subscribers, provisions are also made for trunking calls to and from one or more distant exchanges. One improved all-relay exchange of this type is disclosed and claimed in the copending application, Serial No. 188,443, Frank Kessler, filed Feb. 3, 1938, and the present invention is directed more particularly to further improvements in the circuits illustrated and described in this copending application. In brief, in the system as disclosed in the Kessler application, the subscribers' lines and trunk lines of the system extend to the finder and connector switches of each of a plurality of all-relay finder-connector links, common equipment including a relay type link distributor or allotter being provided for assigning idle ones of the links to successive calling ones of the lines in a definite order. The finder switches of the various links are fully directive in character; that is, all lines hunting operations are eliminated through an arrangement whereby only the group and unit relays corresponding to a particular calling line are caused to operate when a link is taken for use. For the purpose of decreasing the cost of the links, the number of unit relays provided in the finder and connector portions of each link are reduced by half through the provisions of a subgroup relay. By providing such subgroup relays, each unit relay of each line selecting finder or connector switch is rendered operative to select either of two lines depending upon the operated or non-operated condition of the associated subgroup relay. In the particular disclosed arrangement of the finder switches, however, there is a possibility of a busy line being momentarily connected through to the link circuit of a seized link, to the annoyance of the conversing parties, due to the fact that no apparatus is provided for insuring the operation of the subgroup relays before the operation of selected ones of the unit relays. In the improved trunk selecting facilities of the system disclosed in the above-referred-to copending application, no provisions are made for fully utilizing the unit relays of the various connector switches to accommodate the selection of trunks arranged in groups of more than five lines, these relays only being individually operative to select for use a single corresponding trunk when the corresponding trunk is idle. Also, no distinction is made between the trunk lines and the subscribers' lines as regards the method of arranging the line circuits individually associated therewith. Provisions are made for the selection of coded ringing current for signaling desired substations on the multi-party lines, the code selection being entirely performed in any operating link through the response of the link circuit apparatus to a code selecting digit which follows the line selecting digits required for the selection of the desired called line.

It is a further object of the present invention to provide for use in a system of the character noted an automatic line selecting switch of the all-relay type which is fully directive in character, which requires a minimum number of relays both in the switch itself and in the associated common equipment, and which is operative to preclude the connection of more than one line to its associated link circuit during a line selecting operation.

It is another object of the invention to provide an improved arrangement of the allotter or distributor equipment associated with the all-relay finder-connector links, whereby a new link is substantially instantaneously assigned to the use of a calling line in the event a first assigned link fails to find a calling line, and which functions in a manner such that there is no possibility of more than one link seizing the same calling line at the same time or more than one calling line being seized by one link.

It is a further object of the invention to provide an improved line terminating circuit which is so arranged that the line associated therewith is immediately marked as busy in the connector switches to which it extends when a calling condition is created on the line and before the finder switch of an assigned link functions to seize the line.

It is an additional object of the invention to provide an improved finder-selector link circuit arrangement whereby either of two different line circuit arrangements may be employed in terminating different ones of the lines extending to the link.

It is a further object of the invention to provide in a link of the character described an improved arrangement for determining the type of ringing to be utilized in ringing over a selected called line and for determining the code of the ringing current to be projected over the selected called line.

It is a further object of the invention to provide, in a link circuit arranged to provide divided ringing on multi-party metallic lines, an arrangement for preventing the ringing current source from being short-circuited when ringing over a selected line of the ground return type.

It is another object of the invention to provide improved apparatus for registering the operation of a link each time the link is involved in a connection.

It is a still further object of the invention to provide an improved arrangement for selecting idle ones of a group of trunk lines accessible to a link, which arrangement is such that the number of selecting relays utilized in each of the several links is reduced to a minimum.

The features of the present invention are illustrated as being incorporated in an exchange having an ultimate capacity of one hundred lines, ten of which are two-way trunk lines extending to a distant exchange and the remaining ninety of which are subscribers' lines. The various lines individually terminate in line circuits which are differently connected and arranged depending upon whether the terminated line is a trunk line or a subscriber's line. In accordance with one feature of the invention, the control apparatus of any assigned finder-connector link is so arranged that the line circuit associated with any calling one of the lines is caused to operate when the assigned link finds the calling line irrespective of which type of line is responsible for the seizure of the link. More specifically, each line circuit which terminates a subscriber's line is of the usual type wherein busying potential is only applied to the private or control conductor of the line following the operation of an assigned link to seize the associated line when a calling condition is created thereon. In each of the line circuits terminating a trunk line, an improved arrangement is utilized which insures that the terminated line will be marked as busy immediately a calling condition is created thereon. To this end, each of the last-mentioned line circuits has embodied therein a line relay which operates to apply a predetermined busying potential to the private or control conductor of the terminated line when a call is initiated on the line. Also, each of the last-mentioned line circuits is provided with a cut-off relay which is operative to disconnect the associated line relay from across the associated line only in response to the application of a predetermined potential to one of the talking conductors of the associated line. In order to make each link circuit universally effective to control either form of line circuit, there is provided therein control apparatus for applying busying ground potential to the control conductor of a seized calling line and also to the line conductor of the link line by way of which the cut-off relays of the trunk terminating line circuits are energized.

For the purpose of selecting idle ones of the links for the use of calling ones of the lines and for the further purpose of controlling the operation of the finder switch of any assigned link to seize the calling line to which it is assigned, there is provided in association with the several links common equipment including a group of allotter relays individually corresponding to the links and a group of auxiliary relays individually corresponding to the unit relays of the respective finder switches. The allotter relays are connected and arranged sequentially to operate to select idle ones of the links and are individually provided with locking or holding circuits which are so arranged that the locking circuit for each relay is opened in response to the operation of the next succeeding relay. The allotter relays are arranged to control start circuits individually extending to the various links. These start circuits are successively prepared during the sequential operation of the allotter relays and an improved arrangement is provided for maintaining the start circuits open independently of the allotter relays during the sequential operation of these relays. In order to prevent more than one of the allotter relays from inadvertently being locked operated in a link assigning position at the same time, there is provided an additional relay which is operative to prevent two of the locking circuits from being held completed at the same time for a prolonged time interval. Provisions are also made in the allotter for assigning a new link to the use of a calling line in the event a first assigned link fails to find the line. To this end and in accordance with a further feature of the invention, there is provided a relay which is conditioned to operate from one position to a second position in response to the assignment of one of the links to the use of a particular calling line, and the allotter relays are arranged to respond to the operation of this relay to its second position to assign a second link to the use of the calling line. This relay is constructed to have an operating characteristic such that the time required for it to operate from its first to its second position, following the conditioning thereof for such operation, exceeds the time normally required for the finder switch of one of the links to seize a calling line. The circuit arrangement is such that if the first assigned link is successful in finding the calling line the relay is prevented from operating to its second position.

The arrangement of the unit relays provided in each of the finder and connector switches is similar to that employed in the system of the above-referred-to copending application in that the lines of each line group are divided into subgroups and each unit relay is operative to select either of two different lines individually included in different subgroups depending upon the operated or non-operated condition of an associated subgroup relay. In accordance with a further feature of the present invention, however, the operation of any unit relay provided in any one of the finder switches and corresponding to a line to be selected is made dependent upon the prior operation of the associated subgroup relay in any case where the selection of the line requires that both the subgroup relay and the unit relay, corresponding to the line, be operated. More particularly, each finder switch is arranged so that the subgroup relay provided therein operates when a calling line is included in one subgroup of lines and, upon operating, completes the operating circuit for the one unit relay which is operative to select the calling line, whereas this one unit relay is caused to operate independently of the subgroup relay when it is included in the other subgroup of lines. By this arrangement there is eliminated any possibility of a busy line momentarily being connected through to the link circuit of an assigned link.

In accordance with a still further feature of the invention the connector switch of each link is provided with a subgroup relay which is connected and arranged to cooperate with the unit relays of the switch in selecting idle ones of the group of ten trunks terminating at the switch. More particuarly, two sets of relays are provided in association with the trunk lines, which relays are so arranged that an idle trunk line is selected immediately a previously selected trunk line is made busy. The function of any one of the connector switches on a trunk call is, therefore, to pick out a trunk which has previously been selected by the two sets of relays noted. To this end, the control apparatus provided in each link is arranged to cause the operation of the one of the unit relays which is operative to select a preselected idle trunk, without causing the operation of the subgroup relay, so long as certain of the trunk lines are idle, and is arranged to cause the operation of both the subgroup relay and one of the unit relays when more than a predetermined number of the trunk lines are busy.

Each link is provided with a group of impulse counting relays which function to control the connector group and unit relays during the operation of the connector portion of the link to select a desired called line. Two successive operations are required on the part of the impulse counting relays to cause the selection of a desired called subscriber's line, the first line selecting operation of the counting relays being effective to cause the selection and operation of the group relay in the connector switch which corresponds to the particular group of ten lines including the called line, and the second operation being utilized to cause the selection and operation of the particular unit relay corresponding to the called line, or the operation of this relay and its associated subgroup relay. For the purpose of preventing the ringing current source from being short-circuited in ringing over a subscriber's line of the ground return type, improved apparatus is provided for preventing the ground conductor of a line of this type from being connected to the ungrounded output terminal of the source during the ringing operation. At least a portion of the subscribers' lines are of the multi-party type and certain thereof are arranged for divided code ringing. Others of the multi-party lines are arranged for bridged code ringing. This means that each link must be equipped to provide code ringing of either type and that suitable provisions be made for selecting the type of ringing as well as the particular code of the ringing current to be projected over the called line. In accordance with another feature of the invention, apparatus is provided in each link which responds to the operation of the assoicated impulse counting relays during the dialing of a digit preceding the line selecting digits to determine whether bridged or divided ringing will be utilized in ringing over a selected one of the subscribers' lines. This apparatus also functions at least partially to select the code of the ringing current to be projected over the selected line. More specifically, the operation of this apparatus is dependent upon the number of impulses comprising the first digit dialed into the counting relays from a calling substation and, if the digit comprises ten impulses, it does not operate. In the case of a ten-impulse first digit, certain of the control apparatus embodied in the link circuit functions to cause a preselected idle one of the trunk lines terminating at the connector portion of the link to be selected for the use of the calling subscriber by the connector portion of the link. For the purpose of registering the operation of the links, there are individually provided therein registering or recording devices, each of which is arranged to operate only in response to the operation of the assoicated counting relays when a first-received series of impulses transmitted thereto comprises more than one impulse. By this arrangement the operation of a link is only recorded when it is taken for use by a calling line and a series of impulses is actually transmitted thereto from a calling substation associated with the calling line.

Further features of the invention pertain to the particular arrangement of the circuit elements whereby the above-outlined and additional operating features are attained.

The novel features believed to be characteristic of the invention are set forth in the appended claims. The invention, both as to its organization and method of operation, together with further objects and advantages therof, will best be understood by reference to the specification taken in connection with the accompanying drawings in which Fig. 1 illustrates the general arrangement of a system to which the present invention pertains, Fig. 2 illustrates the mode of combining the succeeding figures of the drawings to form a unified system, and Figs. 3 to 14, inclusive, illustrate the details of a system having incorporated therein the features of the invention as briefly outlined above.

Referring now more particularly to Fig. 1 of the drawings, the system there shown comprises a small community exchange 10 and a second automatic exchange 30 interconnected by a group of two-way trunk lines, one of which is indicated in the drawings at 1450 as terminating at a repeater circuit 20 forming a part of the apparatus located at the exchange 10. Also extending to the exchange 10 are a plurality of subscribers' lines, three of which are indicated at 11, 12 and 16. Each of the enumerated subscribers' lines is illustrated as being of the multi-party type having two or more telephone substations associated therewith. Thus, two telephone substations A and F are diagrammatically shown as being connected to the line 11, two additional substations B and C are shown in association with the line 16 and two substations D and E are illustrated as being connected to the line 12. Each of the substations connected to the various subscribers' lines may comprise the usual hand set telephone having embodied therein a dial controlled impulsing device of conventional arrangement. Each of the lines extending to the exchange 10 terminates in a line circuit through which it is rendered accessible to the finder and connector switches included in the exchange. Thus, the line 11 terminates at a line circuit 21 through which it is connected to the contact springs of a finder switch 24 and a connector switch 26, which two switches are connected together to form a finder-connector link. Similarly, the line 16 terminates at a line circuit 22 and the illustrated two-way trunk 1450 interconnecting the exchanges 10 and 30 terminates at a line circuit 23.

The exchange 10 is designed to serve a relatively small number of subscribers' lines, specifically 90, and the trunk lines of a ten-line trunk group and, accordingly, all of the subscribers' lines and trunk lines are arranged to be served by any one of the plurality of finder-connector links included therein. Obviously, the number of links required for satisfactory service will depend upon the volume of telephone traffic but, taking into account the character of the exchange, ten links are considered adequate for reasonably good service. In order to assign the links to successive calling lines in a definite order so that a link is always available for the use of a calling line, excepting, of course, those instances when all of the links are simultaneously busy, there is provided certain common equipment 25 which includes a link distributor or allotter. The several links also have commonly associated therewith ringing, tone and timing apparatus which is diagrammatically shown at 27.

Neglecting for the present the details of the circuit arrangement, and considering briefly the operation of the system, when a subscriber, such, for example, as the subscriber at the telephone A, initiates a call over the line 11 to a second subscriber's telephone, such, for example, as the telephone C, by lifting his receiver from its hook, the line circuit 21 operates to cause the finder-connector link previously assigned by the distributor to the calling line, to be started in operation to seize the calling line. Assuming that the link 24, 26 is delegated by the distributor to set up the connection, the finder portion 24 of the link operates to select the calling line and to connect it through to the conductors of the link line incoming to the connector portion 26 of the link. When the calling line 11 is seized and extended by way of the finder switch to the associated connector switch, it is marked as busy in all of the other connector switches and the control equipment of the seized link is automatically conditioned to respond to the impulses of the first series of impulses transmitted from the impulsing device at the calling substation A. Since the subscribers' lines are of the multi-party type, provision must necessarily be made for selectively signaling the desired called substation on any selected line. With the arrangement to be described more in detail hereinafter, coded ringing is utilized to accomplish this end. It is further contemplated that certain of the lines may be arranged for bridged ringing and others of the lines may be arranged for divided ringing and, in accordance with one feature of the present invention, the link circuit apparatus of any seized link is arranged to respond to the impulses of the first digit dailed at the calling substation to select the type of ringing to be used and further, if bridged ringing is selected, partially to select the code of the ringing current subsequently to be projected over the called line. Further in accordance with this feature of the invention, the operation of the link circuit apparatus during the first digit determines whether the selected line will be a called subscriber's line or a trunk line extending to the distant exchange. Also, if the number of impulses making up this first digit is more than a predetermined number, a registering device provided in the link is caused to operate to register the operation of the link.

In the case under consideration wherein the call is to be extended to the subscriber's line 16, the connector switch 26 will respond to the impulses of the first digit to select the type of ringing to be utilized and to cause the operation of the link to be registered or recorded. If the called line 16 happens to be one of the lines arranged for bridged ringing, the first digit also results in the partial selection of the ringing code to be used in ringing over the called line.

The connector switch 26 responds to the impulses of the second digit dialed at the calling substation by selecting the group of ten lines which includes the called line 16. Thereafter, and in response to the dialing of the third digit, the called line 16 is selected from the selected group of lines. When the called line is selected, the control apparatus included in the link circuit functions to test this line for the purpose of determining the busy or idle condition thereof.

Busy tone current, as generated by a portion of the common apparatus 27, is not returned over the loop extending to the calling subscriber's substation until the fourth or code selecting digit is dialed at this substation. When this digit is dialed, the link circuit apparatus functions to select the particular code of the ringing current to be projected over the called line for signaling the substation desired by the calling party. At the conclusion of this digit and if the called line is busy, busy tone current is returned over the loop to the calling subscriber's substation to indicate to the calling party that the desired connection can not immediately be completed. If, on the other hand, the called line is idle at the time it is selected, ringing current of the selected code corresponding to the called substation C is projected over the called line for the purpose of energizing the signaling devices individually provided in association with at least a portion of the substations on the called line. In this connection it will be understood that, if divided ringing is utilized, the ringing current is projected over the side of the line to which the ringing device at the desired substation is connected. On the other hand, if bridged ringing is selected as the type of ringing to be used, ringing current is conducted over both sides of the called line to energize all of the ringing devices individually provided at the substations connected to the line. During the ringing operation, ring-back tone current is applied to the loop extending to the calling substation to indicate to the calling party that the desired substation is being signaled. Finally, a connection between the calling and called substations is completed when the call is answered at the substation C. As pointed out with particularity hereinafter, the arrangement of the link circuit apparatus is such that a link utilized in setting up a desired connection is released only when the connection is cleared out at the calling substation.

The switching apparatus located in the exchange 10 may also be utilized in setting up a connection between two substations connected to the same line, the sole function of the apparatus in this regard being that of selecting and applying ringing current to the calling line of the proper code to signal a party at the called substation. The discharge of this function necessitates the seizure of the calling line by an idle link, all in the manner outlined above. Thereafter, and following the dialing of the four digits of the called substation directory number at the calling substation, the calling party restores his receiver to its hook. When the calling party hangs up, the finder portion of the operated link is released, and ringing current of the selected code identifying the called substation is projected over the calling line. If the calling line is one of the lines arranged for divided ringing, the link circuit apparatus functions to project a reverting call signal ringing current over the line conductor which is not used for conducting ringing current to the signal device at the called substation. This reverting call signal ringing current energizes the ringing device at the calling substation to indicate to the calling party that the called substation is being rung. When the call is answered, the operated link is released and the line circuit of the line in service operates to busy the line, thereby to prevent its seizure by the connector portion of another link on a second call to one of the substations on the line. Finally, the line circuit of the line in use is restored to normal when the connection is cleared out at the calling and called substations.

In the operation of the link to select one of the group of trunk lines interconnecting the exchange 10 and the exchange 30, only one digit comprising a predetermined number of impulses is dialed at the calling substation. The connector portion of the seized link responds to the impulses of this one digit to select a preselected idle one of the group of trunk lines. More specifically, these lines have associated therewith trunk preselecting apparatus which functions to select an idle line for use immediately a previously selected line is taken for use. Hence, at the conclusion of a trunk selecting digit dialed at a calling substation, the connector portion of the seized link immediately operates to seize the preselected idle trunk. When the trunk line is seized, the calling line is switched through by way of the selected trunk line and its associated repeater circuit to the terminating apparatus located in the distant exchange. In this connection, it is noted that two sets of link line conductors are provided in the link circuit of each link, one of which is devoid of all voice frequency coupling elements, such, for example, as condensers or repeating coils, and is utilized in extending a desired connection by way of one of the trunk lines. Following the extension of the connection to the trunk line terminating apparatus located in the distant exchange 30, the connection may further be extended to the desired called line through the dialing of the regular directory number corresponding to the desired line at the calling substation. The manner in which the connection is released following the establishment of a connection to the desired line depends upon the nature of the repeater circuit associated with the trunk line which is used in setting up the connection.

Since the trunk lines interconnecting the exchanges 10 and 30 are of the two-way type, it will be understood that any one of these lines and the switching apparatus included in the exchange 10 may be utilized in the completion of calls originating or extended by way of the exchange 30 and which are to be extended to one of the subscriber's lines terminating at the exchange 10. The mode of operation of the equipment in the exchange 10 following the extension of a call thereto by way of one of the trunk lines noted is substantially similar to that set forth above with reference to the connection established between the substations A and C, it being observed that each of these trunk lines terminates in a line circuit connected and arranged in a novel manner which is different from the arrangement of the line circuits individually terminating the subscribers' lines. In this case, the release of the connection is entirely under the control of the calling party whose line terminates at the distant automatic exchange.

Considering now in greater detail the apparatus embodied in the exchange 10 and involved in the above-described sequence of operations, and referring to Figs. 3 to 14, inclusive, there are illustrated the elements of the line circuits respectively terminating the lines 11, 16 and 1450, of the finder-connector link 24, 26, and of the common equipment 25. There are also diagrammatically illustrated those portions of the apparatus 27 which are essential to an understanding of the operation of the system. The line circuits individually terminating the subscribers' lines are of more or less conventional arrangement. More particularly, the line circuit 21 comprises a line relay R300, a cut-off relay R310, and a line lockout relay R320 connected and arranged to operate in the usual manner. The corresponding relays for the line circuit 22 are indicated at R300', R310' and R320'. This last-mentioned circuit is indicated as having associated therewith a pay station tone source 368 which is connected through a condenser 367 to impress a pay station tone current on the control or private conductor C306' of the line 16 for the purpose of indicating to a supervising operator in a distant exchange as, for example, the exchange 30, that the substation B is of the pay station type. This pay station tone circuit is shown in association with the line 16 for illustrative purposes only, it being pointed out that a circuit of this form is provided only in conjunction with those of the lines terminating at the exchange 10 which are of the single party pay station type. Since the apparatus for applying pay station tone current to the control conductor C306' may be entirely conventional in character, it has been only diagrammatically illustrated.

The line circuits individually terminating the respective trunk lines are identical in character and are differently connected and arranged from the line circuits terminating the subscribers' lines. In brief, the line circuit 23 comprises a line relay R350, a cut-off relay R390, a lockout relay R340 and a switching relay R330. The primary difference between this line current and the subscriber's line circuit 21, for example, pertains to the method of busying the associated lines to calls incoming thereto. With this illustrated circuit arrangement of the line circuit 23, the line relay R350 is operative to impress a line busying potential on the private or control conductor C359 immediately a calling condition is created on the associated line, and the cut-off relay R390 is operative over a circuit including the positive talking conductor C357 of the line. With the subscriber's line circuit 21, on the other hand, a line busying potential is only applied to the control conductor C306 following the operation of one of the finder switches to seize the line, and the cut-off relay R310 is only operative when the busying potential is applied to the control conductor C306.

Each of the finder switches is of the fully directive all-relay type, group and unit relays being provided for performing the line selecting functions. The lines terminating thereat are arranged in groups of ten lines and the lines of each group terminate at the contact springs of one group relay. More particularly, the finder switch 24 comprises ten group relays corresponding to and including the two relays R370 and R380 individually having contact springs for terminating the conductors of ten lines. While the group relays may be of any desired commercial type having the required number of contact springs, preferably these relays are of the improved form disclosed and claimed in the copending application Serial No. 109,813, Herbert F. Obergfell, filed November 9, 1936. The lines of each group are divided into two equal subgroups and through the provision of a subgroup relay in each finder switch a group of five unit relays is sufficient to permit the selection of any desired one of a selected group of ten lines. Thus, the finder switch 24 comprises a subgroup relay R430 and five unit relays corresponding to and including the two relays R400 and R410, each of which unit relays is operative to select either of two lines in a selected group of ten lines depending upon the operated or non-operated condition of the subgroup relay R430. The finder switch 24 also includes a pair of switching relays R440 and R450 which are arranged to be controlled by way of the common equipment illustrated in Figs. 5 and 6 and are operative to initiate the operation of the finder switch to seize a calling line.

The common equipment shown in Fig. 5 includes a plurality of auxiliary relays which are arranged to be energized over start circuits controlled by the line circuits associated with the respective lines terminating at the exchange 10. These relays are selectively operative in response to the selective completion of the start circuits and individually function to condition for operation a particular group relay and a particular unit relay embodied in the finder portion of an assigned link. More particularly, ten auxiliary group relays including the two relays R510 and R520 are provided, which individually correspond to the finder group relays of each link. A group of five auxiliary unit relays, including the two relays R530 and R540, are similarly provided which individually correspond to the unit relays provided in the respective finder switches and are operative to condition the corresponding finder switch unit relays for operation. The energization of the subgroup relay in the finder portion of any assigned link is dependent upon the operated or non-operated condition of a subgroup relay R500 provided in the common equipment, this latter relay also being arranged to be energized over those of the start circuits which are adapted to be completed in the line circuits terminating the lines included in predetermined ones of the line subgroups. Specifically, the arrangement of the apparatus is such that when a calling condition is created on one of the lines terminating at the exchange, start circuits are completed by the line relay associated with the calling line for causing the operation of the one of the auxiliary group relays R510, R520, etc., which corresponds to the group of lines including the calling line and for energizing the one of the auxiliary unit relays R530, R540, etc., which is operative to select the calling line. If the calling line is in one subgroup of its particular group the auxiliary subgroup relay R500 is not energized over the completed start circuits, but if the calling line is in the other subgroup, R500 is energized and operates to condition the subgroup relay embodied in the finder switch of the selected link for operation. In order to give the finder switch of any assigned link ample time to seize the calling line to which it is assigned and to connect the line through to the connector portion of the link before the auxiliary group and unit relays are reconditioned to respond to another call, the slow-to-release relay R550 is provided, which relay is operative immediately a link starts to seize a calling line and functions to open the operating circuits for all of the auxiliary group and unit relays.

The link alloter or distributor is illustrated in Fig. 6, as comprising a group of ten alloter relays R670, R670', R680, R690, etc., which individually correspond to the ten links corresponding to and including that illustrated, an all-links busy relay R600, a link start relay R604 and six additional relays R610, R620, R630, R640, R650, and R660. Of these six additional relays, the slow-to-release relay R610 and the relay R660 are provided for the purpose of opening the locking circuits for all of the alloter relays when two or more of the alloter relays are inadvertently locked operated in the link assigning position at the same time, and for automatically causing a single alloter relay corresponding to an idle link to be operated to its link assigning position following interruption of the alloter relay locking circuits. The relay R620, the slow-to-release relay R630, and the slow-to-operate relay R640 cooperate to cause the alloter relays to assign a second idle link to the use of a calling line in the event a first assigned link is found defective and fails to operate properly in response to the operation of the start relay R604. The relay R620 also functions to control the all-links busy relay R600 in a manner such that a multiple holding circuit is provided for maintaining R600 operated during the operation of an assigned link to seize the calling line, which holding circuit is opened to permit R600 to restore following the complete operation of the assigned link to seize the calling line and in the event the assigned link is the last available idle link. In addition, the relay R620 functions to hold open the link start circuits individually extending to the various links during the operation of the alloter relays to select an idle link. In order to insure the continued operation of R600 for a short interval after the alloter relays have operated to select an idle link, the slow-to-release relay R650 is provided.

The link circuit proper is illustrated in Figs. 7 to 10a of the drawings. The link line 471 incoming to the link circuit terminates in a repeater 780 and the talking conductors thereof are arranged to be included in the operating circuits for two line relays R710 and R715. The relay R710 is the usual impulse responsive relay and in combination with the two additional relays R740 and R770 forms an impulse correcting network for repeating impulses transmitted thereto from a calling substation over an impulsing circuit to the slow-to-release control relay R960 and the impulse counting relays illustrated in Figs. 10 and 10a. The link hold relay is indicated at R760, this relay being arranged to be held energized by a slow-to-release slave relay R750. The relay R700 is the usual switching through relay which is energized only when the link is utilized in extending a connection by way of one of the trunk lines to the distant exchange 30. The battery reversing relay is indicated at R715, this relay being arranged to operate in the usual manner when a call is answered at a called substation, and functions to control the operation of a slave relay R720 which actually performs the battery reversing operation. Any selected called line is electrically balanced through the provision of an impedance element 714 having an impedance substantially equal to that of the battery reversing relay R715. For the purpose of preventing the link from being permanently tied up through seizure by a defective line or a line having a calling condition present thereon for an unreasonable time interval, there is provided a link release relay R730 and timing apparatus diagrammatically illustrated at 790. This timing apparatus may be of any desired construction which includes means for applying ground pulses to the conductor C718 at spaced intervals, which normally retains ground on the conductor C717, and which removes ground potential from the conductor C717 at intervals spaced from the intervals during which ground potential is applied to C718. If desired, this apparatus may comprise a commutator driven by a synchronous motor through a gear reduction box and including commutator segments suitably arranged to control the application of ground potential to the two leads C717 and C718 in the manner described.

The counting relay network illustrated in Figs. 10 and 10a includes ten impulse counting relays R1030 to R1070, inclusive, and R1030a to R1070a, inclusive, which relays are sequentially operative in response to the impulses of each of four series of impulses transmitted to said switch and function to control the selection of a desired called line. These relays are also arranged to control the selection of the type of ringing to be utilized in signaling over a selected called subscriber's line and also the selection of the code of the ringing current to be projected over the called line. In addition, the counting relays function to control the operation of a registering device 973 which is provided for the purpose of registering each operation of the link. Each of the counting relays is arranged to be locked energized in series with a corresponding one of the three control relays R1000, R1010 and R1020 and to be deenergized in response to the operation of its succeeding counting relay in the manner described in detail hereinafter.

Ringing current is derived from a ringing generator included in the ringing apparatus diagrammatically illustrated at 160, which apparatus may be substantially similar to the ringing apparatus disclosed in Patent No. 2,023,239, Ostline, issued December 3, 1935. This apparatus includes a code interrupter connected to impress ground potential on each of the ten interrupter leads C124, C130 to C133, inclusive, and C151 to C155, inclusive, for coded intervals which are different for each of the leads. The arrangement of the interrupter is such that each ringing code is divided into two separated halves each consisting of one or more short ringing intervals and each of which is susceptible of being converted into one long ring by masking over the short ringing intervals in a well-known manner. To this end the masking leads C125 and C126 are also terminated in the interrupter, the arrangement of the apparatus being such that ground potential is impressed on the mask-1 lead C125 continuously during the first half of each code cycle and ground potential is impressed on the mask-2 lead C126 continuously during the second half of each code cycle. Also extending to the interrupter are the pick-up and reverting call signal conductors C127 and C128, respectively. The pick-up conductor is connected to have ground potential applied thereto for a short interval at the beginning of each code cycle and the reverting call signal conductor is arranged to have ground potential applied thereto for a very short interval at the end of each code cycle.

Ten relays are provided for enabling the two types of ringing, namely, bridged and divided ringing, to be selected, for selecting the proper code groups, for selecting the proper ringing code from a selected code group, and for controlling the application of ringing current to a selected called line, these relays being indicated at R810, R820, R830, R840, R850, R860, R880, R890, R900 and R910, respectively. More specifically, the relay R880 responds to the operation of the counting relays during the impulses of a particular first digit dialed at a calling substation to select divided ringing as the type of ringing to be utilized in signaling over a selected called line. This relay, in combination with the two relays R890 and R840, also determines which of the two sides of the selected line will be utilized to conduct ringing current to the signal device at the called substation. In a similar manner the two relays R900 and R910 are selectively operative in response to the operations of the counting relays during the impulses of different first digits and each thereof is operative to select bridged ringing as the type of ringing to be utilized in ringing over a selected called line. Each of the two relays R900 and R910 corresponds to a group of ten ringing codes, so that by selectively energizing the two relays in response to the operation of the counting relays during the first series of impulses transmitted thereto the ringing current code selection is partially achieved. The relay R810 is the ringing start relay and is operative to initiate the operation of the ringing apparatus, and R860 is the pick-up relay which responds to the application of ground to the pick-up conductor C127 to condition the ringing relay R850 to respond to the coded ground pulses applied to a selected one of the various interrupter leads and to a selected one or both of the masking leads C125 and C126. The relay R840 is provided for the purpose of selectively ringing over either side of a line arranged for divided ringing and is controlled by the counting relays in their response to the impulses of a code selecting digit dialed at a calling substation. The relay R830 is used during reverting call connections, this relay being responsive to the ground pulses applied to C127 and being operative to insure that a calling subscriber having a substation connected to a line arranged for divided ringing will be signalled that the desired called station is being rung. The slow-to-release relay R820 is provided for the purpose of completing a line condenser discharge path which is effective to discharge the condensers connected to a called line at the end of each ringing period.

The operating circuit for the relay R830 is under the control of a reverting call relay R800, which latter relay also cooperates with certain of the other relays to hold the connector portion of the link operated during the period when ringing current is being projected over a calling line on a reverting call. The remaining relay shown in Fig. 8 is the busy relay R870 which is provided for the purpose of causing busy tone to be returned to a calling subscriber when a selected called line is found busy.

In order to rearrange the circuit connections so that the counting relays are rendered effective to perform different duties during the successive series of impulses transmitted thereto, the three transfer relays R930, R940, and R950 are provided. More particularly, R940 is arranged to operate at the end of the first series of impulses to connect the counting relays so that one of the group relays of the connector portion of the link may be selected for energization, the relay R930 is arranged to operate at the end of the second series of impulses to condition the counting relays to select one of the connector unit relays for energization and to condition the connector subgroup relay for energization, and the relay R950 is operative at the end of the third series of impulses to condition the counting relays to select the particular code of the ringing current to be projected over the selected called subscriber's line. In order to release any operated one of the counting relays following each series of impulses the relay R920 is provided.

The device for registering each operation of the link is indicated generally at 973. This device is an impulse counter and may be of any desired commercial arrangement. It includes an operating magnet 973' arranged to be controlled by a relay R970, this relay only being operative to cause the operation of the registering device when two or more impulses are transmitted to the counting relays during the first series of impulses dialed at a calling substation.

The connector portion of the link, including the trunk line preselecting apparatus, is illustrated in Figs. 11 to 14, inclusive. The connector switch per se is similar to the finder switch in that ten group or tens relays each terminating the conductors of ten lines, five unit relays, and a subgroup relay are provided for performing the line selecting functions. Specifically, the connector switch illustrated comprises ten group relays corresponding to and including the two illustrated relays R1200 and R1400, five unit relays corresponding to and including the two illustrated relays R1110 and R1300 and a subgroup relay R1100. Here again, the lines terminating at the contact springs of each group relay are divided into two subgroups and each unit relay is operative to select either of two lines, individually included in different line subgroups, depending upon the operated or non-operated condition of the subgroup relay R1100. Preferably, each of the group relays R1200, R1400, etc., like each of the finder group relays, is of the form disclosed and claimed in the copending application Serial No. 109,813, Herbert F. Obergfell, filed November 9, 1936.

The trunk line preselecting apparatus is common to all of the links and includes a group of trunk select relays R1120, R1125, R1130, R1135, R1140, etc., which individually correspond to the ten trunk lines terminating at the contact springs of the tenth group or tens relay R1400, and a group of nine control relays R1310, R1315, R1320, etc., which individually correspond to the trunks numbered from one to nine in the ten line group. As pointed out in greater detail hereinafter, the two groups of relays cooperate in a manner such that an idle trunk line is preselected and ready for the use of any one of the links so long as any of the trunk lines are idle, and when all of the trunk lines become busy the link circuit apparatus of a link attempting to select one of the lines returns busy tone over the loop extending to the calling subscriber.

*Operation of the finder switch to seize a calling line*

Referring now more particularly to the operation of the apparatus to set up a connection between two substations associated with different ones of the subscribers' lines and considering a call from the substation A to the substation C as an example, the call is initiated in the usual manner when the receiver at the calling substation A is removed from its hook to complete a loop circuit for energizing the line relay R300. This circuit extends from ground at the lower terminal of the lower winding of R300 by way of this winding, RA312, C304, the bridge across C304 and C305 at the calling substation, C305, RA311 and the upper winding of R300 to battery. At RA301, the line relay, upon operating, prepares a circuit, traced hereinafter, for energizing the one of the auxiliary unit relays included in the common relay group of Fig. 5 which corresponds to the calling line 11. At RA302, the relay R300 completes a circuit for energizing the auxiliary group relay of the relay network illustrated in Fig. 5 which corresponds to the particular group of ten lines which includes the calling line. In the present assumed case wherein the calling line is the first line of the first ten-line subgroup, the group relay R510 is energized when the line relay R300 operates. The circuit for energizing R510 extends from ground at RA302 by way of RA322, RC323, C306', the winding of R510, RA512, RA551, RA514, the chain path including the armatures corresponding to RA514 and controlled by certain of the other group relays, RA524, and the resistor 553 to battery. When energized over the above-traced circuit, R510 operates to complete, at RA513, an obvious alternative branch circuit for maintaining itself energized, and to open, at RA512 and RA514, two points in the above-traced chain path which is commonly included in the operating circuits for all of the group relays. At RA516, the relay R510, upon operating, completes the above-mentioned circuit for energizing the particular auxiliary unit relay which corresponds to the calling line, this relay in the present case being R530. Specifically, the circuit for energizing R530 extends from ground at RA504 by way of RC506, C304", RA301, RA321, C305', RA516, the winding of R530, RA534, RA552, RA542, the armatures corresponding to RA542 on the other unit relays, RA532 and the resistor 554 to battery. The relay R530, upon operating, completes, at RA533, an alternative circuit for maintaining itself energized, which circuit is independent of the chain circuit extending through the contacts controlled by the other unit relays. At RA532 and RA534, the relay R530 opens two points in this chain circuit, thereby to prevent any of the other unit relays from being inadvertently energized. As indicated, the group relay R510, upon operating, prepares, at RA515, RA517, RA518 and RA519, circuits for energizing the other four unit relays. These relays are not energized, however, because the line relays respectively associated with the lines numbered from two to zero, inclusive, of the first line group are not operated. It will further be noted that, when one of the unit relays, in this case R530, operates, the circuits for energizing the other unit relays are interrupted.

At RA531, the relay R530, upon operating, completes a circuit extending by way of C561 and RA601 for energizing the link start relay R604. As pointed out in detail hereinafter, the arrangement of the allotter is such that an idle link is selected immediately a previously selected link is taken for use by a calling line. Assuming, for example, that the link illustrated is the link which has been previously selected by the allotter, when R604 operates, it completes, at RA606 and RC608, a circuit for energizing R440 and R450 in parallel, this circuit extending from RA602 by way of RA611, RC612, RA606, RC608, RA622, RC624, RA674, C643 and through the windings of R440 and R450 in parallel to battery. Simultaneously with the completion of the above-traced circuit, the normally completed operating circuit for the slow-to-release relay R630 is interrupted at RA606 and RC609 for a purpose to be described more in detail hereinafter. When R450 operates, it completes a previously prepared circuit for energizing the one of the group relays corresponding to the operated auxiliary group relay R510 and to the line group including the calling line which relay, in the present case, is the group relay R370. The circuit for energizing R370 extends from ground at RA511 by way of C560, RA453 and through the winding of R370 to battery. When R370 operates, it connects the talking and control conductors of the ten lines making up the associated line group through to the two link lines 361 and 366, thus performing the line group switching function. At RC371 and RC372 the group relay R370 prepares a holding circuit for itself. The selection of the particular calling line from the selected group of lines is accomplished simultaneously with the selection of the group of lines, through the energization of the unit relay which corresponds to the first line of each of the ten groups of lines, when R440 operates. The circuit for energizing the unit relay noted, namely, R400, extends from ground at RA501 by way of RC503, RA535, C563, RA443 and through the winding of R400 to battery. When R400 operates, it prepares, at RA407, a holding circuit for itself and at its armatures RA401, RA402 and RA403 it connects the conductors of the calling line 11 through to the link line 471. In this regard it will be noted that the line 11 is the only subscriber's line which is connected through to the link line noted. More particularly, in the case under consideration, the subgroup relay R430 remains deenergized so that the one of the lines which is connected through to the link line 366 by the group relay R370 and which corresponds to the unit relay R400 is held disconnected from the line 471, whereas the line 11 which also corresponds to R400 is connected through to the link line 471 by way of the link line 361, and the restored armatures RA431, RA432, and RA433 of the subgroup relay R430.

When the relay R450 operates to complete the circuit for energizing the group select relay R370, it also completes a circuit for energizing R710 and the slow-to-release relay R550 in series, this circuit extending from ground at the lower terminal of the winding of R550 by way of this winding, C562, RA451, the negative link line conductor C473, RA702, the repeater winding 782, RA725, RC726 and the winding of R710 to battery. When energized over the above-traced circuit, R550 operates to open, at RA551, a further point in the armature chain commonly included in the operating circuits for the ten auxiliary group relays and, at RA552, a further point in the armature chain commonly included in the operating circuits for the auxiliary unit relays. The relay R710, upon operating, completes a circuit for energizing R740, this circuit extending from ground at RA771 by way of RC773, RA711, RC712 and the winding of R740 to battery. When R740 operates, it completes, at RA741, an obvious circuit for energizing R770, at RA745, an obvious circuit for energizing the slow-to-release relay R750 and, at RA746, an obvious circuit for energizing R760. At RA742 and RC743, the relay R740 completes a holding circuit for itself, which circuit becomes effective upon the operation of R770 and extends from ground at RA742 by way of RC743, the resistor 709, RA711, RC712 and the winding of R740 to battery. The relay R750, upon operating, completes, at RA751, a path, traced hereinafter, for applying dial tone current to the loop extending to the calling subscriber's substation and prepares, at RA752, a priming circuit, traced hereinafter, for partially energizing the line relay R710. At RA753 and RC754, the relay R750 prepares a holding circuit for R760 and a path for applying ground to the control or private conductor C474 of the link line 471. At RA756, the relay R750 applies ground to the tone apparatus start conductor C756', thereby to initiate the operation of this apparatus. The path for applying ground to C756' extends from ground at RA869 by way of C799' and RA756 to C756'.

The relay R770, upon operating, completes, at RA771 and RC772, an obvious holding circuit for R750 and opens, at RA771 and RC773, a point in the above-traced operating circuit for R740. The relay R760, upon operating, prepares, at RA762, a point in the impulsing circuit, traced hereinafter, extending to R960 and the counting relays illustrated in Figs. 10 and 10a, and completes, at RA763 and RA767, a holding circuit for itself, this circuit extending from ground at RA767 by way of RC754, RA753, RA763, and the winding of R760 to battery. At RA769, the relay R760 prepares a circuit for energizing the link release relay R730 when the first ground pulse is applied by the timing apparatus 790 to the pulse lead C718. At RA769', the relay R760 applies ground potential to the timing apparatus start conductor C719, thereby to initiate the operation of the timing apparatus 790. At RA768, the relay R760 completes the above-mentioned holding circuit for the operated group and unit relays R370 and R400, this circuit extending from ground at RC735 by way of RA734, C798, RA806, C797, RA768, to the hold conductor C475 where it divides, one branch extending by way of RA407 and the winding of R400 to battery and the other branch extending by way of the resistor 408, RC372, RC371, and the winding of R370 to battery. At RA761, the relay R760 applies ground to the negative link line conductor C472 for a purpose described more in detail hereinafter with reference to the operation of the line circuit 23 terminating the trunk line 1450. At RA767, the relay R760 completes the path for applying ground to the control conductor C306 of the calling line 11, this path extending by way of RA767, RC754, RA753, the control conductor C474 of the link line 471, RA433, RA403, C364, RC373, and RC374 to the control conductor C306. At RA764 and RC766, the relay R760 removes multiple ground from the all-links-busy conductor C477 and, at RA764 and RC765, it applies ground potential to the link guard conductor C476, thereby to identify the link illustrated as busy in the allotter relay group illustrated in Fig. 6. The application of ground to the guard conductor C476 also results in the completion of a circuit for energizing the slow-to-release relay R650, this circuit extending from ground on the conductor noted by way of RA452, C644, and the winding of R650 to battery. The relay R650, upon operating, prepares, at RA651 and RC652, a holding circuit, traced hereinafter, for R620.

When the relay R760 operates to extend ground to the control conductor C306 of the calling line, this line is not only marked as busy in the finder and connector switches to which it extends but, in addition, a circuit is completed for energizing the cut-off relay R310 and the line lockout relay R320 in series, this circuit extending from ground as extended to C306 by way of the winding of R310 and the winding of R320 to battery. When the cut-off relay operates, it disconnects, at RA311 and RA312, the windings of the line relay R300 from across the talking conductors C304 and C305 of the calling line 11, thereby to clear this line of impedances which might interfere with the transmission of voice frequency and impulsing currents. The lockout relay R320, upon operating, prepares, at RA325, a path for applying ground to the control conductor C306 and, at RA322 and RC324, a holding circuit for itself. When the line relay R300 restores, it opens, at RA302, a point in the above-traced start circuit over which the group relay R510, corresponding to the group of lines including the calling line, was energized. At RA301, the relay R300, upon restoring, opens a point in the above-traced start circuit for the unit relay R530, corresponding to the particular calling line of the selected group. As a result, the group relay R510 and the unit relay R530 are deenergized and restore. When the auxiliary group relay R510 falls back, it opens, at RA511, a point in the above-traced operating circuit for the finder group relay R370, this latter relay now being held energized over its holding circuit as traced above. When the auxiliary unit relay R530 restores, it opens, at RA535, the above-traced operating circuit for the finder unit relay R400 and, at RA531, the above-traced operating circuit for the start relay R604, causing the last-mentioned relay to restore to recomplete, at RA606 and RC609, the circuit for energizing R630. It is pointed out that the speed of operation of the finder switch to seize the calling line in the manner just described is such that the slow-to-release relay R630 remains in its operated position until its energizing circuit is recompleted. The slow-to-release relay noted, namely R630, is so constructed that it only restores to its resting position in the event an assigned one of the links fails to seize the calling line.

When the start relay R604 restores, it opens, at RA606 and RC608, a point in the above-traced operating circuit for R440 and R450, causing these two relays to restore. When R440 restores it opens, at RA443, a further point in the above-traced operating circuit for the finder unit relay R400 and, at RA441, a point in the prepared operating circuit for the subgroup relay R430. When R450 restores, it opens, at RA453, a further point in the operating circuit for the group relay R370 and, at RA451, a point in the circuit, traced above, over which R710 and R550 were energized in series. At RA452, the relay R450 opens a point in the above-traced operating circuit for R650 permitting the last-mentioned relay to restore.

The relay R550, upon restoring, reprepares, at its armatures RA551 and RA552, points in the above-traced circuits by way of which selected ones of the auxiliary group and unit relays illustrated in Fig. 5 are energized, thus conditioning the equipment shown in this figure for use in connection with another call.

The relay R710 does not restore when its operating circuit, as traced above, is interrupted at the armature RA451 of the relay R450, this relay, namely, R710, now being held energized over the completed subscriber's loop circuit. Specifically, this loop circuit extends from ground at RA761 by way of C778, RA861, C779, RA701, C472, RA431 and its associated upper contact, RA401, C362, RC375, RC376, C304, the bridge across C304 and C305 at the calling substation, C305, RC377, RC378, C363, RA402, RA432 and its associated upper contact, C473, RA702 and its associated upper contact, the repeater winding 782, RA725, RC726, and the winding of R710 to battery. It will be noted that with the pick-up relay R860 restored and R760 operated the winding of R715 is short-circuited, the short-circuiting path extending from ground at RA761 by way of C778, RA861, C779, the repeater winding 781, RA722, RC723, the winding of R715 back to ground at RA761. The continued energization of R710 over the subscriber's loop circuit, as traced above, serves to hold this relay, as well as R740, R750 and R760, operated. With these four relays in their respective operated positions, the apparatus provided in the link circuit is conditioned to respond to the first series of impulses dialed at the calling substation.

Before describing the operation of this apparatus, however, and in order more fully to point out certain improved operating features of the finder portion of the link, the operation of the finder switch and its associated common equipment will be considered with reference to its function to seize the subscriber's line 16 when a calling condition is created on this line. In this connection, it is reiterated that each of the five finder unit relays is operative to select either of two lines depending upon the operated or nonoperated condition of the sub-group relay R430. In the case just described wherein the line 11 was included in the first line subgroup comprising the first five lines of the selected group of lines, the subgroup relay R430 was not energized. In the operation of the finder switch to select the lines having unit members ranging from six to zero, however, it is necessary that the subgroup relay R430 be energized during the operation of the finder switch to seize a calling one thereof. More particularly, when the line relay R300' is caused to operate in response to the initiation of a call on the line 16, it completes, at RA302', a start circuit extending by way of RA322', RC323' and the start conductor C306' for energizing the auxiliary group relay R510. At RA301', the relay R300' prepares a circuit for energizing the auxiliary unit relay R530 in series with the auxiliary subgroup relay R500, this circuit being completed in response to the operation of the selected auxiliary relay R510 and extending from ground at the upper terminal of the upper winding of R500 by way of this winding, C304', RA301', RA321', C305', RA516, the winding of R530, the armature chain including RA534, RA552 and RA532, and the resistor 554 to battery. The results occasioned by the operation of the auxiliary group relay R510 and the auxiliary unit relay R530 are similar to those described above. Thus, the group relay R370 provided in the finder portion of the link is energized in response to the operation of R450 over a circuit identical with that traced previously. The circuit for energizing the unit relay R400 in the finder switch is not completed in response to the operation of R440, however, this circuit now being held open at the operated armature RA501 of R500. When R440 operates, it completes, at RA441, the above-mentioned circuit for energizing the subgroup relay R430, this circuit extending from ground at RA504 by way of RC505, C566, RA441 and the winding of R430 to battery. The relay R430, upon operating, prepares, at RA434, a holding circuit for itself, which circuit is completed when ground is applied to the hold conductor C475 through the operation of R760 in the manner pointed out above. At its armatures RA431, RA432 and RA433, the subgroup relay, upon operating, disconnects the conductors of the link line 471 from the conductors of the link line 463 and connects the first-mentioned conductors to the conductors of the link line 464, thus insuring that, upon the subsequent operation of one of the unit relays, the line selected will be in the second subgroup of the group corresponding to the operated finder group relay R370. When R430 operates, it also completes, at RA435, a circuit for energizing the selected finder unit relay R400, which finder unit relay corresponds to the operated auxiliary unit relay R530 embodied in the common relay equipment. The circuit for energizing R400 extends from ground at RA435 by way of RA442, C565, RA535, C563, RA443 and through the winding of R400 to battery. When the unit relay R400 operates, it connects, at its armatures RA404, RA405 and RA406, the conductors of the link line 366 to the conductors of the link line 464, thereby to extend the connection from the calling line 16 through to the link line 471. From this point on, the operation of the apparatus is substantially identical with that described above, it being pointed out that the operating circuit for R500 is interrupted upon the restoration of the line relay R300' following the operation of the cut-off relay R310'. The subgroup relay R430 is held operated over its holding circuit following the operation of R760 embodied in the link circuit.

From the foregoing description, it will be remembered that the subgroup relay R430 is caused to operate to connect the link line 471 to the link line 464 before the selected unit relay R400 is energized. The purpose of this arrangement is to prevent more than one of the lines accessible to the switch from even momentarily being connected to the link circuit control apparatus. To emphasize this point, it is pointed out that, if the selected unit relay and the subgroup relay were simultaneously energized and the armature settings of these two relays were such that the unit relay happened to operate before the subgroup relay, the line 11 would momentarily be connected through to the link line 471, after which the subgroup relay would operate to disconnect the line 11 from the link line and to connect the line 16 thereto. During this interval, however, and if the line 11 happened to be busy, a disturbance would be created on this line to the annoyance of the conversing parties. By the arrangement illustrated, however, wherein the operating circuit for the selected finder unit relay is only completed in response to the operation of the subgroup relay, there is no possibility of any line other than the particular calling line being connected through to the link circuit.

As indicated above, provisions are made for identifying those of the lines having pay stations connected thereto. By way of illustrating the apparatus provided for this purpose, there is shown in association with the line 16 the pay station tone source 368 which is arranged to impress its output voltage through the condenser 367 on the control conductor C306' of the line 16. In ordinary local calls, this pay station tone voltage in no way affects the operation of the apparatus to set up a desired connection. When, however, a connection is forwarded by way of this apparatus and over one of the trunk lines to a toll operator's position in the distant exchange, the presence of this voltage on the control conductor of the line serves to signal the toll operator that the call emanates from a pay station so that she may require the correct deposit to be made before completing the connection desired by the calling party. The manner in which the voltage impressed on the control conductor of the calling line is repeated over a seized trunk line to the operator in the distant exchange is disclosed and claimed in applicant's copending application Serial No. 215,786, filed June 25, 1938.

As pointed out in the introductory portion of the specification, the arrangement of the line circuits individually associated with the two-way trunk lines extending to the finder and connector switches of the various links is different from that of the line circuits individually associated with the subscribers' lines terminating at the links. Thus, it will be apparent that the line circuits 21 and 22, respectively associated with the lines 11 and 16 and described above, are more or less conventional in character. It will further be noted that the arrangement of these circuits is such that, when a call is initiated on one of the lines, the line is only marked as busy following the operation of the assigned link to seize the line and to extend ground potential back to the control conductor thereof. This means, of course, that the calling line is unguarded against seizure by one of the connector switches during the interval when the finder portion of an assigned link is operating to seize the line. While this is of no great inconvenience as regards the subscribers' lines, it is desirable to use a different line circuit arrangement with respect to the line circuits individually associated with the trunk lines, this different arrangement being such that each trunk is marked as busy in the connector switches immediately a calling condition is created thereon. To this end, the improved arrangement for the line circuit 23 terminating the trunk line 1450 is provided, this arrangement preferably being used for each line circuit terminating each of the two-way trunk lines extending to the exchange 10 from the distant exchange 30. In the operation of the line circuit 23 and when a calling condition is created on the line 1450, a loop circuit is completed in the automatic exchange 30 for energizing the line relay R350, this circuit extending from ground at the lower terminal of the lower winding of R350 by way of this winding, RA392, RA331, RC332, the trunk line conductor C344, the bridge across C344 and C345 at the distant automatic exchange, C345, RC335, RA334, RA393 and through the upper winding of R350 to battery. When the line relay R350 operates, it applies, at RA351 and RC352, ground to the control conductor C359 of the trunk line 1450, thereby immediately to mark this trunk line as busy in the connector switches to which it extends. At RA351 and RC353, the relay R350 opens a point in the circuit, traced hereinafter, for energizing the line switching relay R330. At RA354, the relay R350 prepares a circuit, traced hereinafter, for energizing the slow-to-release lockout relay R340. At RA356, the line relay R350 completes a circuit for energizing the auxiliary group select relay R520, which group relay corresponds to the tenth or zero group of lines. This circuit extends from ground at RA356 by way of RA343, C398, the winding of R520, RA522, RA551, the armature chain including RA514 and RA524 and the resistor 553 to battery. At RA355, the line relay R350 prepares a circuit for energizing the one of the unit relays, namely, R530, which corresponds to the particular calling line of the selected group, this circuit being completed upon the subsequent operation of the selected group relay R520 and extending from ground at RA504 by way of RC506, C304″, RA355, RA342, C399, RA526, the winding of R530, RA534, RA552, the armature chain including RA542 and RA532 and the resistor 554 to battery. The resulting operation of the energized group and unit relays R520 and R530, respectively, causes the previously assigned link to operate to find the calling line in a manner identical with that set forth above. Assuming, for example, that the link illustrated is the one assigned to the use of the calling trunk line 1450, the operating circuits for the finder group and unit relays R380 and R400, respectively, are completed in response to the operation of R440 and R450. When the relay R450 operates to cause the operation of R710, R740, R750, R760, and R770, a circuit is completed for energizing the cut-off relay R390 embodied in the line circuit associated with the calling trunk line 1450. More particularly, when R760 operates, it completes a circuit for energizing the upper winding of the cut-off relay noted, this circuit extending from ground at RA761 by way of C778, RA861, C779, RA701, C472, RA431, RA401, C362, RC381, RC382, C357, RA395 and through the upper winding of R390 to battery. The relay R390 operates, when energized over the above-traced circuit to extend, at RA391 and RA392, the calling loop circuit through to the control aparatus embodied in the operated link. At RA397, the relay R390 completes an obvious circuit for energizing the slow-to-release relay R340 and, at RA396, it opens a point in the circuit for energizing the switching relay R330. At RA392 and RA393, the relay R390 disconnects the windings of the line relay R350 from across the line conductors of the trunk line 1450, thereby causing the last-mentioned relay to restore. When R350 restores, it opens, at RA355 and RA356, the operating circuits for the previously operated auxiliary group and unit relays R520 and R530, respectively, thereby to initiate the release of the common equipment in the manner pointed out with particularity above. Simultaneously with the application of ground potential to the negative line conductor C357 of the trunk line 1450, ground is also applied to the control conductor C359 of this line through the operation of the relay R760. Hence, when R390 operates, it completes a holding circuit for itself, this circuit extending from ground on C359 by way of RA394, RA395 and the upper winding of R390 to battery. The cut-off relay is held operated over this holding circuit until such time as the operated link is released to remove ground from the control conductor C359. When R340 operates, it prepares, at RA341, a holding circuit for itself and opens, at RA342 and RA343, additional points in the operating circuits, traced above, for the auxiliary group and unit relays. With R390 and R340 operated, no further operations occur in the line circuit until such time as the connection involving the trunk line 1450 and the operated link is cleared out. The two relays are caused to restore during the release of the connection and when ground is removed from the control conductor C359.

When the trunk line 1450 is taken for use by one of the connector switches to extend a connection by way thereof to the automatic exchange 30, ground potential is applied to the control conductor C359 shortly after the line is seized. When this occurs, the switching relay R330 is energized over a circuit extending from ground on C359 by way of RA351, RC353, RA396 and the winding of R330 to battery. When R330 operates, it shunts, at RA338, the armature RA396, thereby to maintain itself energized independently of R390 and, at RA337, completes an obvious circuit for energizing the lower winding of R390. At RA331 and RA334 and their respective associated contacts RC333 and RC336, the relay R330 switches the connection to the outgoing repeater 20, by way of which the connection is extended to the automatic exchange 30. When R390 operates, it completes, at its armatures RA391 and RA392, the loop circuit to the repeater 20, and disconnects the windings of the line relay R350 from across the line conductors of the trunk. When the subscriber's loop circuit is switched through to the repeater 20, the line and hold relays, not shown but conventionally provided in the repeater, operate to apply multiple ground to C359. The ground potential impressed upon the control conductor C359 in the repeater holds the line circuit 23 and the preceding link operated in a well known manner. At RA394 and RA395, the relay R390 completes a holding circuit for itself, this circuit extending from ground as applied to C359 in the operated repeater 20 and includes the upper winding of R390. At RA397, the relay R390 completes an obvious circuit for energizing the slow-to-release relay R340 and, at RA396, it opens a point in the original energizing circuit for R330. The resulting operation of R340 is without effect. Obviously the three operated relays R330, R340 and R390 are deenergized and restore to normal when ground potential is removed from the control conductor C359 of the trunk line 1450 during the release of the operated repeater 20.

*Operation of the allotter illustrated in Fig. 6*

The arrangement of the allotter or distributor is such that an idle one of the links is selected immediately a previously selected link is taken for use by a calling line. Thus, in the sequence of operations just described, it was assumed that the link illustrated, namely link No. 1, had been previously selected by the allotter relays. It was also pointed out that, during the operation of the finder portion of the link to seize the calling line 11, the relay R760 operated to apply ground to the link guard conductor C476. The application of ground potential to this conductor initiates the operation of the allotter relays to select another idle link, providing an idle link is available. More particularly, when R760 operates, it completes a circuit for energizing the upper winding of R670′ in series with the upper winding of R620, this circuit extending from ground at RA764 by way of RC765, C476, RA671, the upper winding of the second allotter relay R670′ and the upper winding of R620 to battery. When its upper winding is energized R670′ operates to complete, at the x contacts associated with RA672′, a holding circuit for itself, this circuit extending from ground at RA602 by way of the winding of R610, the upper winding of R660, RA661, RA682, RA672' and the lower winding of R670' to battery. With its lower winding energized, R670' completes its operation and opens, at RA673', a point in the holding circuit for R670. The relay R670 now restores to open, at RA672, a further point in its holding circuit and, at RA671, a point in the operating circuit for R670'. Whether or not the second allotter relay R670' corresponding to link No. 2 remains operated depends upon the idle or busy condition of this link. Thus, it will be remembered from the preceding description that if the link is busy, ground is present on the guard conductor C476' corresponding thereto, whereas, if the link is idle, this guard conductor is open-circuited. Assuming the second link to be idle at the time R670' operates, this relay remains in its operated condition until such time as a succeeding call causes the operation of the second link. When this occurs, ground potential is applied to the guard conductor C476' to cause the operation of the third allotter relay, not shown, corresponding to link No. 3. This third allotter relay is energized over a circuit similar to that traced above. In a similar manner the other nine allotter relays are caused successively to operate as the links are successively assigned for use. Thus, when the eighth link become busy a circuit is completed for energizing the ninth allotter relay R680. When R680 operates, it completes, at the x contacts associated with RA681, a holding circuit for itself, this circuit extending from ground at RA602 by way of the winding of R610, the upper winding of R660, RA661, RA692, RA681 and the lower winding of R680 to battery. The relay R680 now fully operates to open, at RA682, a point in the holding circuit for the preceding allotter relay and to prepare, at RA686, a circuit for energizing the upper winding of the tenth allotter relay R690 in series with the upper winding of R620. When the preceding eighth allotter relay restores, it opens a point in the operating circuit for R680. Assuming the ninth link to be idle at the time R680 operates, no circuit is available for energizing the tenth allotter relay R690 so that R680 remains operated until a succeeding call causes the operation of its associated link. When the ninth link is taken for use, ground potential is applied to the guard conductor thereof to cause the operation of R690 in a manner which will be apparent from the preceding description. When R690 operates, it first completes, at RA691, a holding circuit for itself and then fully operates to open, at RA692, a point in the holding circuit for R680. The relay R690, upon operating, also prepares, at RA694, a circuit for energizing the upper winding of the first allotter relay R670 in series with the upper winding of R620. If the tenth link is idle at the time R690 operates, this relay will remain operated until a succeeding call is received which causes the operation of the associated link, at which time the first allotter relay R670 is caused to operate to test the condition of its associated link.

Each time one of the allotter relays operates it prepares a start circuit extending to its corresponding link. For example, when R670' fully operates it prepares, at RA674', a start circuit extending by way of C643' and traced hereinafter for energizing the two relays of the second link which correspond to R440 and R450 of the link illustrated. It is desirable to provide a short time interval between the instant the common equipment is released and the instant this second start circuit is fully prepared in order to avoid any possibility of two links being inadvertently operated to seize the same calling line. The two relays R620 and R650 function to provide this time interval. More particularly, when the operating circuit for the allotter relay R670', for example, is completed, the relay R620 is energized over its upper winding. The relay R650 is operated at this time, so that the relay R620, upon operating, completes, at RA623, its holding circuit. At RA622 and RC624 the relay R620 opens a point in the common portion of the start circuits extending to the various links, and since this relay is held operated until the slow-to-release relay R650 restores following the release of the common equipment shown in Fig. 5, there is no possibility of one of the link start circuits being completed until the common equipment is fully released.

In the event the second link, namely, line No. 2, is busy at the time ground is applied to the guard conductor C476 during the operation of the link illustrated to seize the calling line 11, ground will be present on the guard conductor C476' extending thereto. As a result, when R670' fully operates, a circuit is immediately completed for energizing the third allotter relay, this circuit being similar to that traced previously. The third allotter relay will, therefore, immediately operate to complete its holding circuit and to open the holding circuit of R670', causing the last-named relay to restore. When the third allotter relay operates, it also prepares a circuit for energizing the upper winding of the fourth allotter relay and, if the third link is also busy, this circuit is completed, causing the fourth allotter relay to test the condition of the fourth link. This sequential operation of the allotter relays continues until an idle link is found or all of the links have been tested.

As indicated previously, provisions are made for preventing the allotter relays from continuously and sequentially operating when an all-links-busy condition exists and for preventing any of the busy links from being assigned to a calling line. More particularly the all-links busy relay R600 is normally energized and remains energized so long as any of the links are idle. Thus, with the link illustrated in an idle condition, one circuit is available for holding R600 energized, this circuit extending from ground at RA764 by way of RC766, RA732, C477 and the winding of R600 to battery. The conductor C477 is multipled to conductors corresponding to C477 in each of the other links and, hence, so long as any of the links are idle, a circuit, similar to that traced above, is available for holding R600 energized. When, for example, the relay R760 provided in the link illustrated operates, it opens, at RA764 and RC766, one multiple branch of this circuit and, when the relays corresponding to R760 in the other links are all simultaneously energized, the circuit for energizing R600 is completely interrupted. When R600 restores, it opens, at RA601, a point in the above-traced circuit by way of which the start relay R604 is energized, thus precluding a calling line from inadvertently being assigned one of the busy links. At RA603, the relay R600, upon restoring, opens a point in the common portion of a circuit, traced hereinafter, by way of which the allotter relays are energized and the relay R620 is held energized. At RA602, the relay R600 opens a point in the common portion of the holding circuits for the various allotter relays, causing any operated one of these relays immediately to restore. When RA602 falls back, a point is opened in the circuits over which the slow-to-release relays R610 and R630 are normally held energized, causing these two relays to restore. When R610 restores, it prepares a circuit, traced hereinafter, for energizing the first allotter relay R670 when the all-links-busy condition of the apparatus is subsequently terminated.

It will be noted that the relay R620 is arranged to control the restoration of R600. The purpose of this arrangement is to insure that, when a last remaining idle link is assigned for use, the link will complete its operation to seize a calling line and lock itself operated over the calling subscriber's loop and independently of the common equipment before the all-links-busy relay R600 restores to open the start circuits extending to the link. More particularly, with the start relay R604 operated and R620 restored, the relay R600 is prevented from restoring, even though ground potential is removed from the all-links-busy conductor C477 immediately the last available link is seized. The relay R620 only operates when ground potential is thereafter applied to the guard conductor corresponding to the assigned link, at which time its upper winding is energized in series with the upper winding of the one of the allotter relays corresponding to the assigned link. When R620 operates, it obviously opens, at RA621, a point in the multiple circuit for holding R600 energized and, since the seized link is the last available idle link, causes R600 to restore to perform the functions pointed out with particularity above.

From the preceding description it will be apparent that, when an all-links-busy condition prevails, all of the relays illustrated in Fig. 6, with the exception of R640, are caused to restore. In this regard it is pointed out that when the holding circuits for the allotter relays are opened, the relays are prevented from sequentially operating because the respective upper windings do not provide sufficient energization to enable the relays fully to operate. Hence, the allotter relays all restore when R600 restores. The relay R640 operates in response to the restoration of R630, but its operation is without effect at this time. When the all-links-busy condition is terminated through the clearing out of one of the established connections to release one of the links, ground is again applied to C477 in the released link and R600 reoperates. Upon operating, R600 prepares, at RA601, a circuit for energizing the start relay R604 and prepares, at RA602, a point in the common portion of the holding circuits for the allotter relays. At RA602, a circuit is also completed for energizing the upper winding of R670, this circuit extending from ground at RA602 by way of RA611, RC613, the upper winding of R670 and the upper winding of R620 to battery. When its upper winding is energized over the above-traced circuit, the relay R670 operates to complete, at RA672, the above-traced holding circuit for itself, which circuit extends by way of the winding of R610. The relay R610 now operates to open, at RA611 and RC613, the operating circuit for R670 and to complete, at RA611 and RC612, the operating circuit for R630, this latter circuit extending from ground at RA602 by way of RA611, RC612, RA606, RC609 and the winding of R630 to battery. The relay R630 now operates to open, at RA631, the operating circuit for R640, causing the last-named relay to restore. When R670 operates it prepares, at RA671, the above-traced circuit for energizing the upper winding of R670' in series with the upper winding of R620. In the event the link which has been rendered idle is the first link, namely, that corresponding to R670, no further operation of the allotter apparatus occurs following the complete operation of R670 until another call is received. If, on the other hand, the first link is still busy and one of the other links has been rendered idle, the allotter relays are caused sequentially to operate in the manner described above until the idle link is found, at which time the allotter relay corresponding thereto is locked-operated and no further sequential operation of the allotter relays occurs.

Each time one of the allotter relays operates during the sequential operation of these relays to test the condition of their respective associated links, a circuit is prepared by way of the associated link start conductor, as, for example, C476, for energizing the two relays of the associated link which correspond to R440 and R450 of the link illustrated. It is imperative that these link start circuits be held open during a link testing operation and until an idle link is found, for otherwise, there is a possibility of two links being assigned to the same calling line or of one link being connected to two calling lines. More particularly, if no holding circuit were provided for R620, this relay would restore each time one of the allotter relays was caused to operate and even though the allotter relays were operating in rapid order. This being true and if the start relay R604 were operated, the link start circuits would successively be completed at RA622 and RC624, during the sequential operation of the allotter relays.

To obviate the possibility of the allotter operating in the undesired manner outlined immediately above, two precautions are taken. Thus, when any one of the links is taken for use the slow-to-release relay R650 is caused to operate in the manner previously described. This relay, upon operating, prepares, at RA651 and RC652, a holding circuit for R620. When ground is thereafter applied to the guard conductor of the assigned link to initiate the sequential operation of the allotter relays to search for an idle link, the upper winding of the relay R620 is energized in series with one winding of the first allotter relay to operate. With its upper winding energized, R620 operates to complete at RA623 its prepared holding circuit. The relay R650, due to its slow-to-release characteristic remains operated to maintain R620 energized over its holding circuit for an interval sufficient to permit all of the allotter relays sequentially to operate to test the condition of their respective associated links. With R620 operated, the common portion of the various link start circuits is held open at RA622 and RC624. Shortly after an idle link is found, assuming one to be available, and with the allotter relay corresponding to the idle link operated, the relay R650 restores to open at RA651 and RC652 the holding circuit for R620. The last-mentioned relay now restores to prepare at RA622 and RC624, the start circuit extending to the selected idle link.

The second precaution, referred to above, is provided for the purpose of maintaining the link start circuits open during the sequential operation of the allotter relays following the release of one of the links to terminate an all-links-busy condition. With these circumstances the relay R650 is restored. However, alternative holding circuits are successively and overlappingly completed for the relay R620 during the sequential operation of the allotter relays. Thus, assume that the allotter relay R670 is the first to operate when an idle link becomes available, that the start relay R604 is operated, and further, that the link corresponding to R670 is busy at the time R670 operates. With the first link busy, ground potential is present on the guard conductor C476 and when R620 and R630 operate this ground is extended by way of RA696, RA676, RA603, RA632, RC633, RC653 and RA651 to RA623, thereby to complete the holding circuit for R620. Similarly, if the second link is busy, ground is present on the guard conductor C476', so that when R670' operates and R670 restores a second ground is extended to RA623 to hold R620 operated, this second ground being extended by way of C476', RA675, RA676', RA603, RA632, RC633, RC653 and RA651. It will be noted that the second ground is extended to RA623 simultaneously with the interruption, at RA676, of the above-traced ground extension path extending by way of the first guard conductor C476. Hence, the relay R620 is held operated to hold the link start circuits open during the sequential operation of R670 and R670'. In a similar manner, the holding circuit for R620 is held completed during the sequential operation of the other allotter relays and until the allotter relay corresponding to the idle link operates. Since the guard conductor leading to the idle link is open-circuited, the holding circuit for R620 is interrupted when the allotter relay corresponding to the idle link operates. Thus, R620 is caused to restore to complete the start circuit extending to the idle link.

As indicated in the introductory portion of the specification, one of the features of the present invention is concerned with the novel and exceedingly simple arrangement of the distributor equipment whereby a second link is assigned to the use of a calling line in the event a first assigned link fails to find the line. More particularly, this feature of the invention is concerned with the arrangement of the two relays R630 and R640, the first of which is normally held operated so long as any idle links are available. It will be noted that the circuit for energizing this relay extends from ground at RA602 by way of RA611, RC612, RA606, RC609 and the winding of R630 to battery. When, however, the start relay R604 operates to initiate the operation of one of the links to search for a calling line, the above-traced circuit is interrupted at RA606 and RC609. Due to the slow-to-release characteristic of R630, this relay will stay operated for a time interval which exceeds the interval normally required for a finder switch fully to complete its operation to seize the calling line. In the above-described sequence of operations, for example, the relay R630 remains operated until R650 operates and until ground is applied to the guard conductor C476 to cause the operation of the second allotter relay R670 simultaneously with the operation of R620. When R620 operates and with R650 operated, it completes, at RA623, the above-traced holding circuit for itself. The relay R620, upon operating, completes an alternative circuit for energizing R630, this circuit extending from ground at RA602 by way of RA611, RC612, RA606, RC608, RA622, RC623 and the winding of R630 to battery. When, thereafter, the start relay R604 restores, the circuit over which R630 is normally held energized is recompleted at RA606 and RC609. Thus, it will be apparent that, so long as the links are operating properly, the relay R630 is continuously held energized and in no way affects the normal operation of the allotter relays as set forth above. If, for some reason, however, a link is defective in its operation so that it fails to apply ground potential to the guard conductor C476 to cause the operation of R620 and one of the allotter relays, the relay R630 will be held deenergized for a time interval sufficient for this last-named relay to restore. When R630 restores, it completes, at RA632 and RC634, a circuit for energizing the upper winding of one of the allotter relays in series with the upper winding of R620. Assuming that the tenth link is the link initially assigned to the use of the calling line, the restoration of R630 results in the completion of a circuit for energizing the upper winding of R610, this circuit extending from ground at RA642 by way of RC634, RA632, RA603, RA695, RA684, RA694, the upper winding of R670 and the upper winding of R620 to battery. The relay R670 operates when its upper winding is energized over this circuit to complete its holding circuit and to prepare the circuit for energizing the upper winding of the next succeeding allotter relay R670'. From the preceding description it will be apparent that the operation of R670 results in the sequential operation of the allotter relays until an idle link corresponding to one thereof is found, providing, of course, the link corresponding to R670 is busy at the time this relay is caused to operate. It is pointed out that, had link No. 1 been initially assigned to the use of calling line, the restoration of R630 would result in the completion of a circuit for energizing the upper winding of R670' rather than the upper winding of R630. In the last assumed case, the operating circuit for R670' extends from ground at RA642 by way of RC634, RA632, RA603, RA676, RA696, RA671, the upper winding of R670' and the upper winding of R620 to battery. Similarly, if the second link had been the link initially assigned to the use of the calling line, a circuit would have been completed for energizing the upper winding of the third allotter relay upon the restoration of R630. Again, had the third link been the link initially assigned to the use of the calling line, a circuit would have been completed for energizing the upper winding of the fourth allotter relay, and so on.

When one of the allotter relays operates, it not only prepares a testing circuit extending by way of the upper winding of the next succeeding allotter relay for testing the condition of its associated link but it also prepares a circuit for energizing the upper winding of the next succeeding allotter relay by way of the alternative operating circuit having the common portion controlled by R630. Thus, when R670, for example, fully operates, it opens, at RA675, a point in the above-traced alternative operating circuit for itself as controlled by R630 and prepares, at RA676, a point in the alternative operating circuit for the next succeeding allotter relay R670'. It will be understood, therefore, that, if the common portion of the alternative operating circuits for the allotter relays were continuously held completed following the restoration of R630, the allotter relays would continuously and sequentially operate without regard to the idle or busy condition of their respective associated links. To prevent this undesired mode of operation, the slow-to-operate relay R640 is provided, this relay being energized over an operating circuit controlled by R630 and completed at RA631 immediately R630 restores. The slow-to-operate characteristic of R630 is such that this relay operates immediately following the partial operation of one of the allotter relays in response to its energization over one of the above-traced alternative allotter relay operating circuits. When R640 operates, it opens, at RA642, a point in the common portion of the alternative operating circuits for all of the allotter relays, thereby permitting these relays to function in the manner described above to select an idle link. Thus, the relay R620 is also energized in response to the restoration of R630 and simultaneously with the energization of one of the allotter relays. When R620 operates, it completes its holding circuit and, at RA622 and RC623, it completes the above-traced alternative circuit for energizing R630. When R630 operates, it opens, at RA631, the operating circuit for R640 and, at RA632 and RC634, a further point in the common portion of the above-traced alternative operating circuits for the allotter relays. At RA632 and RC633, the relay R630 prepares the circuits, traced above and including the guard leads extending to the various links, for holding R620 operated during the sequential operation of the allotter relays and until an idle link is found. When the allotter relay corresponding to an idle link operates, it stays operated and R620 restores to open, at RA622 and RC623, the circuit over which R630 is being held energized. At RA622 and RC624, the relay R620, upon restoring, completes the start circuit to the selected idle link, thereby to initiate the operation of this link to seize the calling line. It will be noted that, when the start circuit to the second assigned link is completed, the relay R630 is also conditioned, through its deenergization, to assign a third link to the use of the calling line in the event the second assigned link fails to operate properly.

When an assigned link is defective and fails to operate properly, it is released during the operation of the allotter relays to select a second link for the use of the calling line. Thus, if the link illustrated is assigned to the use of a calling line and fails to return ground over its guard conductor to the allotter, R670' will be caused to operate to initiate the operation of the allotter to select a second link in the manner just described. When R670' operates, it opens the holding circuit for R670, causing the last-named relay to restore to open, at RA674, the previously completed operating circuit for R440 and R450. When these relays restore, the operating circuits for all of the unit and group relays embodied in the link are opened. Under the conditions assumed, the relay R760 embodied in the link for some reason has failed to operate and, hence, no holding circuits are available for maintaining the selected unit, group and subgroup relays operated. As a result, the link circuit is entirely released.

A further improved feature of the allotter pertains to the arrangement whereby more than one of the allotter relays is prevented from inadvertently being locked energized in a link assigning position at the same time. It is for this reason that the relay R660 is provided, which relay has its upper winding included in the common portion of the holding circuits for the various allotter relays. This relay is so constructed that it does not operate unless the holding circuits for two or more of the allotter relays are held completed for a substantial time interval. In the normal operation of the apparatus as described above, only one of these holding circuits is ordinarily maintained completed for any substantial period of time. Thus, it was pointed out that, when each of the allotter relays operates, it functions to open a point in the holding circuit for the preceding allotter relay. If, for any reason, the holding circuits for two of the allotter relays are held completed through the failure of one of the allotter relays fully to operate, the current traversing the upper winding of R660 is materially increased due to the lowered resistance of the circuit including this winding. As a result, R660 operates to complete, at RA662, a holding circuit for itself, this circuit extending from ground at RA602 by way of RA611, RC612, RA662 and the lower winding of R660 to battery. At RA661, the relay R660 opens a point in the common portion of the holding circuits for the two or more operated allotter relays, thereby causing the deenergization of the allotter relays and, also, the slow-to-release relay R610. The operated allotter relays are thus caused immediately to restore. Shortly thereafter, R610 restores to complete, at RA611 and RC613, one of the above-traced alternative operating circuits for R670, this circuit extending from ground at RA602 by way of RA611, RC613, the upper winding of R670 and the upper winding of R620 to battery. The resulting operation of R670 initiates the sequential operation of the allotter relays to select an idle one of the links in the manner described above. It will be noted that, when R610 restores, it opens, at RA611 and RC612, the above-traced circuit for energizing R630 and, also, the holding circuit for R660, causing the last-mentioned relay to restore to again prepare, at RA661, a point in the common portion of the holding circuits for the various allotter relays. When the relay R620 operates, simultaneously with the operation of the first allotter relay R670, it completes, at RA622 and RC623, the above-traced alternative circuit for energizing R630, thereby to hold the last-mentioned relay energized. When R660 restores, it not only prepares the holding circuits for the allotter relays but opens, at RA662, a point in its own holding circuit. When, thereafter, the relay R670 operates, it recompletes its holding circuit and, in so doing, causes the reenergization of R610, which latter relay also reoperates to restore the equipment to the condition which normally prevails.

*Operation of the link circuit apparatus during impulsing*

Continuing now with the operation of the apparatus to set up a connection to the called line 16 in response to the call initiated on the line 11, it is pointed out above that, when R750 operates, a path is completed for conducting dial tone current by way of the receiver provided at the calling substation. The path of this current extends from one side of the dial tone source, not shown, by way of C941', RA941, RC932, RA931, C809, the condenser 839, C789, RA751, RA702, C473, RA432 and its associated upper contact, RA402, C363, RC378, RC377, C305, the receiver at the substation A, C304, RC376, RC375, C362, RA401, RA431 and its associated upper contact, C472, RA701, C779, RA861 and C778 to ground at RA761. The calling subscriber, upon receiving dial tone, is informed that the number corresponding to the called subscriber's telephone, or, in the present assumed case, the number corresponding to the called substation C associated with the line 16 may be dialed. During impulsing, the relay R740 responds to the impulses of each series and repeats these impulses to R960 and the impulse counting relays illustrated in Fig. 10 and 10a. More particularly, when the subscriber's loop circuit is opened at the calling substation at the beginning of the first impulse of the first digit, R710 restores to open, at RA711 and RC712, a point in the previously traced holding circuit for R740. At RA711 and RC713, the relay R710, upon restoring, prepares a priming circuit for itself. When R740 restores, it opens, at RA746, a point in the operating circuit for R760, at RA742 and RC743, a further point in its own holding circuit and, at RA741, the operating circuit for R770. When R770 restores, it completes the above-mentioned priming circuit for the line relay R710, this circuit extending from ground at RA771 by way of RC773, RA711, RC713, RA752, the resistor 708 and the winding of R710 to battery. The energization furnished the line relay R710 over this priming circuit is insufficient to cause the operation thereof but is effective to render the line relay more responsive to impulses transmitted thereto by way of the calling subscriber's line.

When R740 restores, in addition to performing the functions enumerated above, it completes, at RA742 and RC744, an impulsing circuit, traced hereinafter, extending to R960 and the above-mentioned counting relays. When the open circuit period of the first impulse is completed, the line relay R710 again operates to recomplete the operating circuit for R740. When R740 reoperates, it again completes the operating circuit for R770 and interrupts, at RA742 and RC744, the ground pulse as delivered to the relay 960 and the impulse counting relays. At RA742 and RC743, the relay R740 recompletes its holding circuit and, at RA745, it recompletes the multiple holding circuit for the slow-to-release relay R750. Due to its slow-to-release characteristic, the last-named relay does not restore during impulsing. For each succeeding impulse following the first, the mode of operation of the three relays R710, R740 and R770 is a duplicate of that just described, and it will be understood that, during each cycle of operation thereof, the relay R740 restores to deliver a ground pulse to the counting relays.

Considering now the operation of the counting relay network in response to the impulses of the first digit dialed at the calling substation, when R740 restores at the beginning of the first impulse, it completes the impulsing circuit, thereby to energize the slow-to-release relay R960 and the first counting relay R1030 in parallel. This circuit extends from ground at RA742 by way of RC744, RA703, RA762, C791, RA812, RC813, RA864, and C886 to RA937 where it divides, one branch extending by way of the slow-to-release relay R960 to battery and the other branch extending by way of C103, RA1001, RC1002, RA1011, RC1012, RA1021, RC1022 and the winding of R1030 to battery. When energized over the above-traced circuit, R960 operates and, due to its slow-to-release characteristic, remains operated until the impulses comprising the first digit are ended. When the impulse-counting relay R1030 operates, it completes, at RA1032, a path for short-circuiting the relay R1020, this path extending from ground as extended over the impulsing circuit to the right terminal of the winding of R1030 by way of RA1032, the winding of R1020, RA1014, C102, RA921 and C795 back to ground at RA767. At RA1037, the relay R1030 prepares a point in the operating circuit for the second impulse counting relay R1040. At the end of the first pulse, the above-traced short-circuiting path for the winding of R1020 is opened at RA742 and RC744, permitting R1020 to be energized in series with the first counting relay R1030. When R1020 operates, it opens, at RA1021 and RC1022, a point in the above-traced operating circuit for R1030 and prepares, at RA1021 and RC1023, a further point in the operating circuit for the second counting relay R1040. At RA1024, the relay R1020 opens a point in the circuit, traced hereinafter, for energizing the relay R1000.

With the apparatus in this condition and when the second impulse is delivered to the link, the relay R740 again restores to complete the impulsing circuit as now extended to the second counting relay R1040, this circuit being similar to that traced above, but extending by way of RA1021, RC1023, RA1037 and the winding of R1040 to battery rather than through the winding of the first counting relay R1030 to battery. When energized over the above-traced circuit, R1040 operates to complete, at RA1041, a locking circuit for itself, which circuit is substantially similar to that, traced above, for the first counting relay R1030 but extends by way of the winding of R1010 and RA1004 rather than by way of the winding of R1020 and RA1014. Through the completion of this circuit, the winding of R1010 is short-circuited over a path substantially similar to that, traced above, for short-circuiting the winding of R1020. At the end of the second pulse and when R740 reoperates, the short-circuiting path for R1010 is interrupted, permitting this relay to be energized in series with the winding of R1040. The relay R1010 operates, when energized in this circuit and opens, at RA1014, a point in the above traced series circuit over which R1020 and R1030 are held energized, causing the two last-named relays to restore. At RA1011 and RC1012, the relay R1010 opens a point in the operating circuit for the second counting relay R1040 and, at RA1011 and RC1013, it prepares a point in the operating circuit for the third impulse counting relay R1050. This last-named circuit is fully prepared at RA1046 through the operation of the second counting relay R1040 and is substantially similar to that, traced above, over which the first counting relay R1030 was energized.

The impulsing circuit is completed to cause the operation of R1050 when R740 again restores at the beginning of the third impulse of the first series dialed at the calling substation, the circuit in this case extending by way of RA1011, RC1013, RA1046 and the winding of R1050 to battery. When R1050 operates, it completes, at RA1051, a holding circuit which extends by way of RA1051, the winding of R1000, the now restored armature RA1024 of R1020, and over the common portion of the holding circuit for the counting relays as traced above. Through the completion of this holding circuit for R1050, the winding of R1000 is short-circuited in a manner substantially similar to that described above with reference to the relay R1010. At the end of the third pulse when R740 reoperates, this short-circuiting path is interrupted, permitting R1000 to be energized in series with R1050. When R1050 operates, it prepares, at RA1056, a point in the operating circuit for the fourth counting relay R1060, this operating circuit being further prepared at RA1001 and RC1003 upon the operation of R1000. The relay R1000 also functions to open, at RA1001 and RC1002, a point in the operating circuit for R1050, and at RA1004, a point in the circuit over which R1010 and R1040 are being held energized in series, thus causing the two last-mentioned relays to restore.

At the beginning of the fourth impulse dialed at the calling substation and when R740 again restores, the impulsing circuit is again completed to cause the energization of the fourth counting relay R1060, this circuit extending, in this case, by way of RA1001, RC1003, RA1056 and the winding of R1060 to battery. When R1060 operates, it completes, at RA1061, a holding circuit for itself, this circuit being identical to that, traced above, for R1030. Through the completion of this circuit, the winding of the relay R1020 is short-circuited in a manner which will be apparent from the preceding description. At the end of the ground pulse and when R740 reoperates, the short-circuiting path is interrupted, permitting R1020 to be energized over a circuit including the windings of R1020 and R1060 in series. At RA1066, the relay R1060, upon operating, prepares a point in the operating circuit for the fifth impulse counting relay R1070, this circuit further being prepared at RA1021 and RC1023 upon the operation of R1020. At RA1024, the relay R1020, upon operating, opens a point in the series circuit over which R1000 and the counting relay R1050 are being maintained energized, causing the two last-mentioned relays to restore.

At the beginning of the fifth impulse dialed at the calling substation and when R740 again restores, the impulsing circuit is again completed to cause the energization of R1070. When R1070 operates it completes, at RA1071, a holding circuit for itself which extends by way of the winding of R1010 and RA1004 to ground as extended to C102. The completion of this circuit results in the short-circuiting of the winding of R1010. At RA1077, the relay R1070, upon operating, prepares a point in the operating circuit for the sixth impulse counting relay R1030a. When the fifth ground pulse is ended, to interrupt the short-circuiting path for the winding of R1010, this relay is energized in series with the winding of R1070 and operates to open, at RA1011 and RC1012, a point in the operating circuit for R1070 and, further, to prepare, at RA1011 and RC1013, the operating circuit for R1030a. At RA1014, the relay R1010 opens a point in the series circuit over which R1020 and R1060 are being held energized, causing the two last-mentioned relays to restore.

When the sixth impulse is delivered to the link to again cause the restoration of R740, the impulsing circuit is again completed to cause the energization of R1030a, the circuit, in this case, extending by way of RA1001, RC1002, RA1011, RC1013, RA1077 and through the winding of R1030a to battery. When R1030a operates, it completes, at RA1032', a holding circuit for itself which includes the winding of R1000 and, in so doing, short-circuits the winding of the last-mentioned relay. At RA1038', it prepares a point in the operating circuit for the seventh counting relay R1040a. At the end of the ground pulse delivered over the impulsing circuit to the sixth counting relay R1030a, the path short-circuiting R1000 is opened, permitting this relay to be energized in series with the winding of R1030a. Upon operating, R1000 opens, at RA1001 and RC1002, a point in the operating circuit for R1030a and prepares, at RA1001 and RC1003, a further point in the operating circuit for R1040a. At RA1004 and relay R1000 interrupts a point in the series circuit over which R1010 and R1070 are being held energized, causing these two relays to restore. In view of the foregoing description, it is believed that the manner in which the remaining counting relays R1040a, R1050a, R1060a, and R1070a individually operate and restore in response to the seventh, eighth, ninth and tenth impulses dialed at the calling substation will be apparent since the operation and restoration of these four relays is, in all respects, a repetition of the mode of operation of the other counting relays as described above.

*Selecting divided ringing and registering operation of link*

As pointed out in the introductory portion of the specification, certain of the features of the present invention pertain to the arrangement of the link circuit apparatus whereby the first digit dialed at a calling substation is utilized to control the operation of the registering device 973; to select the particular type of ringing to be utilized, that is, bridged or divided ringing; and partially to select the code of the ringing current to be projected over the called line subsequently to be selected. The device 973 is arranged to record the operation of the link, providing the first digit dialed at the calling substation comprises more than one impulse. The purpose of this arrangement is to prevent the recording device 973 from operating in response to an inadvertent operation of the hook switch provided at a calling substation. If a single impulse is inadvertently transmitted to the link from the calling substation through accidental operation of the hook switch provided thereat, or the like, the impulse is absorbed and the registering device 973 is not caused to operate. Thus, if a single impulse is transmitted to the counting relays the first counting relay will operate and lock itself energized in series with R1020. Shortly following the reoperation of R740 at the end of the pulse, the slow-to-release relay R960 restores to complete a circuit for energizing R920, this circuit extending from ground at RA767 by way of C795, C111, RA1025, C101, RA961, RA938, RA947, C114, RA1034, C113 and the winding of R920 to battery. When R920 operates it interrupts at RA921 a point in the previously traced circuit over which R1020 and R1030 are being held energized in series, causing the two last-mentioned relays to restore. When R1020 restores it opens at RA1025 a point in the above traced operating circuit for R920 causing this relay to restore. Thus, the equipment is reconditioned accurately to respond to the first series of impulses to be dialed at the calling substation.

Assuming that the first digit dialed at the calling substation comprises more than one impulse, the relay R1030 will restore following the operation of R1040 and after the second impulse has been delivered to the counting relay network. Upon restoring, it prepares, at RA1031, a circuit for energizing R970 which circuit is completed in the manner described shortly hereinafter.

If the first digit dialed at the calling substation comprises two impulses, the control apparatus embodied in the link functions to select divided ringing as the type of ringing to be used in ringing over the subsequently selected line. This digit does not determine which side of the line will be used in conducting ringing current to the signal device at the calling substation, the last-mentioned function being reserved to the apparatus which responds to the final or code selecting digit dialed at the calling substation. If the first digit dialed at the calling substation is three, the control apparatus embodied in the link functions to select bridged ringing as the type of ringing to be utilized in signaling over the called line and, further, to select a first group of ten ringing codes as the ones from which the particular code to be used will subsequently be selected. On the other hand, if the first digit dialed at the calling substation is four, bridged ringing is also selected as the type of ringing to be used, but ten codes are selected as the ones from which the code to be used will finally be selected. In the present assumed case, wherein the line 16 is the called line, and wherein the signal devices or ringers at the substations on this line are connected between the respective line conductors and ground, divided ringing must necessarily be selected as the type of ringing to be utilized in signaling the desired called substation. Hence, the first digit dialed at the calling substation will necessarily comprise only two impulses and, at the conclusion of this digit, the counting relay R1040 will be in its operated position. At the end of the digit, the relay R740 remains operated for a sufficient interval of time to permit the slow-to-release relay R960 to restore. When R960 restores, it completes, at RA961, a circuit for energizing the relay R880, this circuit extending from ground at RA767 by way of C795, C111, RA1015, C101, RA961, RA938, RA947, RA962, C120, RA1043, C119 and through the winding of R880 to battery. The relay R880, upon operating, completes, at RA883, a circuit for energizing R920, this circuit extending from ground at RA883 by way of C878, RA945 and the winding of R920 to battery. At RA884, the relay R880 short-circuits the winding of R940, the short-circuiting path extending from ground as extended to C119 over the circuit traced above by way of RA884, C885, the winding of R940 and C795 back to ground at RA767. At RA922, the relay R920, upon operating, completes a circuit for energizing the relay R970, this circuit extending from ground at RA767 by way of C795, C111, RA1031, C110, RA922, RA948 and the lower winding of R970 to battery. When R970 operates, it completes, at RA971, a holding circuit for itself, this circuit extending from ground at RA971 by way of the upper winding of R970 and the resistor 975 to battery. At RA972, the relay R970 completes an obvious circuit for energizing the operating magnet 973' of the registering device 973, thereby to cause this device to register the operation of the link. When this operating magnet is energized, it attracts its armature RA974 to short-circuit the upper winding of R970, thereby to cause the last-named relay to restore. The purpose of providing the holding circuit for R970 is to insure that this relay will be maintained energized for a sufficient length of time to permit the full operation of the registering device.

When R920 operates, it opens, at RA921, the previously traced circuit over which R1010 and R1040 are being held energized in series, causing these two relays to restore. When R1040 falls back, it interrupts, at RA1043, a point in the path short-circuiting the winding of R940, permitting this winding to be energized in series with the winding of R880. When energized over this series circuit, R940 operates to open, at RA948, a point in the above-traced operating circuit for the relay R970 permitting the last-mentioned relay to restore, providing the registering device 973 has completed its operation.

At RA941, the relay R940 opens a point in the above-traced path over which dial tone current is conducted to the receiver at the calling substation. At RA942, the relay R940 opens a point in one path traced hereinafter for applying busy-tone current to the loop extending to the calling substation. At RA943, the relay R940 opens a point in the circuit traced hereinafter for energizing the switching-through relay R700. At RA945, the relay R940 interrupts the above-traced operating circuit for R920, causing the last-mentioned relay to restore its armature RA921, thereby to prepare a point in the common portion of the holding circuits for the various impulse counting relays. Since the counting relay R1040 and the relay R1010 have restored prior to the restoration of R920, the preparation of this point in the common portion of the holding circuits is without effect. At RA946, the relay R940 short-circuits the restored armature RA937 of the relay R930, thereby to insure that the impulsing circuit as traced above will be held completed during the dialing of the succeeding digits and after R930 operates. At RA949 the relay R940 opens a point in the circuit, traced hereinafter, for energizing the subgroup relay R1100 embodied in the connector portion of the link during trunk calls, it being pointed out in this connection that through the selection of divided ringing as the type of ringing to be utilized in signalling over a called line, the call is identified as being to one of the subscribers' lines rather than by way of one of the trunk lines to the distant exchange. At RA947 and its associated upper contact, the relay R940 prepares a circuit, traced hereinafter, for energizing a selected one of the group relays embodied in the connector switch of the link.

Following the operation of R940, the apparatus embodied in the link circuit is conditioned to respond to the impulses making up the second or group select digit dialed at the calling substation.

*Selecting bridged ringing*

Before describing the response of the apparatus to the impulses of the second digit, however, and in order to complete the description pertaining to the method by which bridged ringing is selected, it is again pointed out that in the event the first digit dialed at the calling substation comprises three impulses instead of two, the counting relay R1050 will be operated at the end of the digit rather than the counting relay R1040. At the end of the digit, and when R960 restores in the manner pointed out above, a circuit is completed for energizing the bridged ringing relay R900, this circuit extending from ground at RA767, by way of C795, C111, RA1005, C101, RA961, RA938, RA947, C114, RA1053, C121 and the winding of R900 to battery. The relay R900, upon operating, completes, at RA902, a path for short-circuiting the winding of R940, this path extending from ground as extended over the above-traced circuit to C121, by way of RA902, the winding of R940, C795, and back to ground at RA767. At RA901 the relay R900 completes an alternative operating circuit for R920, this circuit extending from ground at RA901 by way of C878, RA945, and the winding of R920 to battery. The relay R920 operates to complete, at RA922, the above-traced circuit for energizing R970, thereby to cause the registering device 973 to register the operation of the link. When R920 operates, it opens, at RA921, a point in the circuit over which the counting relay R1050 and R1000 are held energized, thus causing the two last-mentioned relays to restore. When R1050 restores, it opens, at RA1053, the path short-circuiting the winding of R940, permitting the winding of this relay to be energized in series with the winding of R900. When R940 operates, it performs all of the functions described in detail above with reference to the operation of the apparatus to select divided ringing as the type of ringing to be utilized in signalling over the called line. Following the operation of R940, the apparatus is conditioned to respond to the impulses comprising the second digit dialed at the calling substation.

It will be noted from the foregoing description that the relay R880 is energized and locked up in those instances when divided ringing is to be used in signalling over a called line subsequently to be selected. On the other hand, when bridged ringing is to be utilized, one or the other of the two relays R900 and R910 must be energized and locked up. Assuming that bridged ringing is desired, the one of the two relays R900 and R910 which is operated at the end of the first digit depends upon the number of impulses making up this first digit. The function of the two relays is to determine whether one code of a first set of ten ringing codes will be utilized in signalling over the called line or whether one code of a second set of ten ringing codes will be utilized in ringing over the called line. In the case just described, wherein the relay R900 is caused to operate, the ringing code subsequently to be selected must necessarily be included in the first group of ten codes. In order to enable the code selecting apparatus to select a code from the second group of ten codes to the exclusion of the first group, it is necessary that R910 be operated at the end of the first digit. This last-named relay is only operated in response to the dialing of a first digit at the calling substation comprising four impulses. In this case, and at the end of the digit, the counting relay R1060 will be locked energized in series with the relay R1020, so that when R960 restores at the end of the digit a circuit is completed for energizing R910. This circuit extends from ground at RA767, by way of C795, C111, RA1025, C101, RA961, RA938, RA947, RA962, C120, RA1063, C122, and the winding of R910 to battery. The relay R910, upon operating, completes, at RA915, a path for short-circuiting the winding of R940, and, at RA914, the above-noted alternative circuit for energizing R920. When R920 operates, it completes, at RA922, the above-traced circuit for energizing R970, thereby causing the registering device 973 to register the operation of the link. At RA921, the relay R920 opens the above-traced circuit over which R1020 and the counting relay R1060 are being held energized in series, causing these two relays to restore. When R1060 restores, it opens, at RA1063, a point in the path short-circuiting the winding of R940, permitting the last-named relay to be energized in series with R910. Upon operating, the relay R940 performs the functions pointed out with particularity above. It will thus be apparent that when the digit "4" is dialed as a first digit, the relay R910 is locked up in series with the relay R940. When R910 is operated, the code of the ringing current ultimately selected will be different from that selected when the relay R900 is operated. The manner in which these two relays control the selection of the ringing current code is pointed out with greater particularity hereinafter.

*Operation of connector switch to select the called line*

When the second digit is dialed at the calling substation the link apparatus functions to select for energization the particular group relay in the connector switch which corresponds to the particular group of ten lines including the called line. During the impulses of this digit the relay R960 is energized over the impulsing circuit and remains operated due to its slow-to-release characteristic. The relays embodied in the counting relay network function in the manner described in detail above, and at the conclusion of the digit the one of these relays which corresponds to the number of impulses making up the second digit remains operated. In the present case herein when the called line 16 is included in the first group of ten lines, the second digit dialed at the calling substation will necessarily comprise only a single impulse, so that at the conclusion thereof the counting relay R1030 is locked energized in series with the relay R1020. At the end of the digit, and when R960 restores, a circuit is completed for energizing the group relay R1200, which relay is operative to switch the lines of the first ten line group through to the unit relays of the connector switch. Specifically, the circuit for energizing R1200 extends from ground at RA767, by way of C795, C111, RA1025, C101, RA961, RA938, RA947, and its associated upper contact, C116, RA1035, C115, and through the winding of R1200 to battery. When energized over the above-traced circuit the relay R1200 operates to complete a path for short-circuiting the winding of R930, this path extending from ground at RA767, by way of C795, the winding of R930, C904, RC1205, RC1206, and back to ground as extended to the right terminal of the winding of R1200 over the circuit traced above. The relay R1200, upon operating, connects the conductors of the selected lines through to the armature springs of the five connector unit relays. The relay R1200 also completes a circuit for energizing R920, this circuit extending from ground at RC1204, by way of RC1203, C903, RA944, RA936 and through the winding of R920 to battery. When the relay R920 operates, it opens, at RA921, a point in the circuit over which R1020 and the counting relay R1030 are being held energized in series, causing the two last-mentioned relays to restore. When R1030 restores, it opens, at RA1035, a point in the path short-circuiting the winding of R930, permitting the last-named relay to be energized in series with the operated group relay R1200. Specifically, the circuit over which these two relays are now energized extends from ground at RA767, by way of C795, the winding of R930, C904, RC1205, RC1206, and through the winding of R1200 to battery. It will be noted that when the relay R920 operates it prepares a point in the circuit for energizing R970, but this circuit is now open at the operated armature RA948, so that the operation of R920 does not cause a second operation of the registering device 973.

When R930 operates, it opens, at RA936, a point in the above-traced operating circuit for R920, causing this relay to restore to reprepare the common portion of the holding circuits for the various counting relays. At RA931 and RC932, the relay R930, upon operating, opens a further point in the path for conducting dial tone current to the receiver at the calling substation. At RA931 and RC933, the relay R930 prepares a point in the path, traced hereinafter, for applying busy-tone current to the loop extending to the calling substation. At RA935 the relay R930 opens a point in the path, traced hereinafter, for energizing the subgroup relay R1100 on trunk calls. At RA934, the relay R930 prepares a circuit, traced hereinafter, for energizing the subgroup relay R1100 at the end of the third digit dialed at the calling substation. At RA937, the relay R930 opens a point in the original impulsing circuit by way of which the counting relays were energized during the impulses at the first and second digits. Since at this time, however, R940 is operated, this impulsing circuit is maintained prepared at the operated armature RA946. At RA938 and its associated lower contact, the relay R930 opens a point in the above-traced operating circuit for the connector group relay R1200, and, at RA938 and its associated upper contact, it prepares a point in the circuit, traced hereinafter, for energizing the particular unit relay which is operative to select the called line. Following the operation of R930, the apparatus embodied in the link circuit apparatus is conditioned to respond to the impulses of the third digit of the directory number identifying the called line.

Before describing the operation of the apparatus during the impulses of the third digit dialed at the calling substation, brief reference will be made to the manner in which the other group relays of the connector switch, namely, those associated with the line groups numbered from two to ten, inclusive, are selected and energized. In this connection, it is pointed out that the conductors C134 to C141, inclusive, and C1432 respectively extend to the group relays of the connector switch respectively terminating the lines of the line groups numbered from two to ten, inclusive. In this regard the indicated conductors correspond to the conductor C115 which extends to the first group relay R1200 associated with the first group of ten lines. Through this wiring arrangement, and when any particular counting relay, corresponding to a particular one of the group relays remains energized at the end of the second digit, the group relay in the connector switch which corresponds to the operated counting relay is caused to operate. For example, if the second digit dialed at the calling substation comprises three impulses, the counting relay R1050 will remain operated at the end of the digit and, in its operated condition, holds prepared, at RA1054, the operating circuit for the group relay corresponding to the third group of ten lines. This circuit is completed upon the subsequent restoration of R960 and is substantially similar to that, traced above, for the first group relay R1200. Specifically, the circuit for the third group relay extends from ground at RA767 by way of C795, C111, RA1005, C101, RA961, RA938, RA947 and its associated upper contact, C116, RA1054, C135 and through the winding of the third group relay, not shown, to battery. Similarly, if the second digit comprises eight impulses, the relay R1050a will be locked operated in series with R1010 at the end of the second digit and, in its operated position, holds prepared, at RA1055', the operating circuit for the group relay terminating the lines of the eighth line group. At the end of the digit, and when the slow-to-release relay R960 restores, this operating circuit is completed. Specifically, the operating circuit for the eighth connector group relay extends from ground at RA767 by way of C795, C111, RA1015, C101, RA961, RA938, RA947 and its associated upper contact, RA963, C108, RA1055', C140 and through the winding of the eighth group relay, not shown, to battery. The manner in which any one of the remaining group relays is caused to operate at the end of the second digit, and when the corresponding counting relay remains operated at the end of the digit, will be apparent in view of the three illustrated cases described in detail above. It will be noted that, at the end of the second digit, only the one of the counting relays which corresponds to the number of impulses of the digit remains operated and, hence, only the one of the connector group relays which corresponds to the operated counting relay is caused to operate. The operations which occur in the link circuit following the operation of any selected one of the group relays in the connector switch are identical irrespective of the one of the group relays which is energized. It is for the purpose of insuring this identity of operation that the conductors C903 and C904 are multipled to the corresponding contacts of each of the group relays provided in the connector portion of the link. Briefly to summarize this link circuit operation, when one of the group relays operates, it completes the operating circuit for R920 and short-circuits the winding of R930. When R 920 operates, it opens the holding circuit for the particular one of the counting relays which is operated and, when this counting relay restores, it opens a point in the path short-circuiting R930, permitting this last-named relay to be energized in series with the operated one of the group relays. When R930 operates, it performs the functions previously described.

Following the operation of R930, the link circuit apparatus is conditioned to respond to the impulses of the third digit dialed at the calling substation. The counting relays respond to the impulses of this digit in the exact manner described with particularity above, and the slow-to-release relay R960 is energized and remains energized until the series of impulses making up the digit is ended. The one of the counting relays which remains operated at the end of this digit will, of course, depend upon the number of impulses making up the digit. In the present case, wherein the called line is the sixth line of the first group, this third digit will necessarily comprise six impulses so that, at the conclusion thereof, the counting relay R1030a will be locked energized in series with R1000. As pointed out in a previous portion of the specification, each group of lines terminating at the connector switch is divided into two subgroups, one subgroup having unit numbers ranging from one to five and the second subgroup having unit numbers ranging from six to zero. In order to select a called line in the second subgroup, it is necessary that the subgroup relay R1100 and one of the five unit relays be energized. In this regard, it is pointed out that the subgroup relay should be energized before the unit relay corresponding to the particular called line operates. Otherwise, the wrong line may inadvertently be connected through to the link circuit and, if this wrong line happens to be busy, the desired connection will fail. To insure the operation of the subgroup relay before the operation of a selected one of the unit relays, the arrangement is such that the subgroup relay is energized immediately the sixth counting relay R1030a operates during the operation of the counting relays in response to the impulses of the third digit dialed at the calling substation. The operating circuit for R1100 extends from ground at RA767 by way of C795, C111, RA1037′, C104, RA934, RA955, C907 and the winding of R1100 to battery. When the subgroup relay operates, it completes, at RA1104, a holding circuit for itself, this circuit extending from ground at RA767 by way of C795, RA1104 and the winding of R1100 to battery. At its armatures RA1101, RA1102 and RA1103, the subgroup relay disconnects the conductors of the link line 777 from the conductors of the link line 1123 and connects them to the conductors of the link line 1124, thereby to insure that, upon the subsequent operation of one of the unit relays, the selected called line will be included in the second subgroup of the selected group of lines.

Shortly following the end of the third digit and when R960 restores, a circuit is completed for energizing the particular unit relay which is operative to select the desired called line. In the case under consideration, this unit relay is R1110 and the circuit for energizing this relay extends from ground at RA767 by way of C795, C111, RA1005, C101, RA961, RA938 and its associated upper contact, RA957, RA964, C107, RA1036′, C146, C117 and the winding of R1110 to battery. When R1110 operates, it completes, at RA1117, a path for short-circuiting the winding of R950, this circuit extending from ground at RA767 by way of C795, the winding of R950, C909, RA1117 and back to ground as extended to RA1117. At RA1116, the relay R1110 completes another circuit for energizing R920, this circuit extending from ground at RA1116, by way of C908, RA956 and the winding of R920 to battery. At its armatures RA1114, RA1118 and RA1115, the unit relay R1110 connects the conductors of the called line 16 through to the conductors of the link line 777.

When R920 operates, it opens, at RA921, the circuit over which the relays R1000 and R1030a are being held energized in series, causing these two relays to restore. When R1030a restores, it opens, at RA1036′, the path short-circuiting the winding of R950, permitting the last-named relay to be energized in series with the operated unit relay R1110. The relay R950 now operates to open, at RA956, the above-traced operating circuit for R920, causing the last-named relay to restore to reprepare the common portion of the holding circuits for the counting relays. At RA955 and its associated upper contact, the relay R950 opens a point in the above-traced operating circuit for the subgroup relay R1100 and, at this same armature and its associated lower contact, the relay R950 prepares a circuit, traced hereinafter, for energizing R890. At RA951 and RC952, the relay R950 opens a point in the test circuit, traced hereinafter, extending to the busy relay R870. At RA954, the relay R950 prepares a point in the operating circuit for the switching-through relay R700 and, at RA957 and its associated lower contact, it opens a point in the common portion of the operating circuits for the unit relays embodied in the connector portion of the link. At RA957 and its associated upper contact, the relay R950 prepares a circuit, traced hereinafter, for energizing the relay R810. Following the operation of R950 and with the selected unit relay energized in series therewith, the link circuit apparatus is conditioned to respond to the fourth and final digit dialed at the calling substation, which digit causes the link circuit apparatus to select the particular ringing current code which corresponds to the desired substation on the called line.

Before describing the response of the apparatus to the impulses of this digit and in order more fully to describe the method of selectively energizing the unit relays, it is deemed to be in order briefly to consider the response of the apparatus when third digits are dialed comprising a number of impulses different from six. In this regard, it is pointed out that the conductors C117, C142, C143, C144 and C145 individually extend to the unit relays numbered from one to five, respectively. Similarly, the conductors C146, C147, C148, C149 and C150 also extend to the unit relays numbered from one to five, respectively. By virtue of this arrangement, it is possible to energize any one of the unit relays when a third digit comprising either of two different numbers of impulses is dialed. For example, when a third digit comprises one or six impulses is dialed, the first unit relay R1110 is energized. Similarly, when the third digit comprises two or seven impulses, the second unit relay is energized by way of one of the two conductors C142 and C147. Again, when the third digit comprises three or eight impulses, the third relay is energized by way of one of the two conductors C143 and C148. In any case and as was pointed out above, when the third digit comprises more than five impulses, the subgroup relay R1100 is caused to operate. Considering specifically the case wherein the called line is the fifth line of a selected group so that the third digit comprises five impulses, at the conclusion of the digit, the fifth counting relay R1070 is locked energized in series with R1010. Thereafter, and when R960 restores, a circuit is completed for energizing the fifth unit relay, this circuit extending from ground at RA767 by way of C795, C111, RA1015, C101, RA961, RA938 and its associated upper contact, RA957 and its associated lower contact, C118, RA1075, C145 and the winding of the fifth unit relay R1300 to battery. The resulting operation of the unit relay R1300 causes the link circuit relays to respond in the exact manner described previously with reference to the operation of the unit relay R1110. More particularly, when R1300 operates, it short-circuits, at RA1308, the winding of R950 and completes, at RA1307, a circuit for energizing R920. When R920 operates, it causes the restoration of the operated relays R1070 and R1010. When R1070 restores, it opens, at RA1075, a point in the path short-circuiting the winding of R950, permitting this relay to be energized in series with the operated unit relay R1300. Since the two conductors C908 and C909 are multipled to the corresponding contact springs of each of the five unit relays, it will be understood that the response of the link circuit apparatus is the same irrespective of which of the unit relays is caused to operate. In the case just described, wherein the fifth unit relay R1300 was energized, it is to be noted that no circuit was completed for energizing the subgroup relay R1100. This is true for the reason that the sixth counting relay, which is operative to complete the operating circuit for R1100, does not operate unless a third digit comprising more than five impulses is dialed. It is believed that the manner in which the other unit relays, not shown, are individually energized when third digits comprising the number of impulses corresponding thereto are dialed will readily be apparent from the preceding detailed description with reference to the two unit relays R1110 and R1300.

The testing of the selected called line to determine the idle or busy condition thereof is performed immediately the connector unit relay corresponding to the called line operates to connect the link line through to the selected called line. If the called line 16 is idle at the time it is selected, battery from the cut-off relay embodied in the line circuit associated therewith is present on the control or private conductor C1223 thereof. On the other hand, if the called line 16 is busy in connection with another call at the time it is selected by the connector switch illustrated, ground potential is present on this control conductor. Assuming that the line is busy, when the unit relay R1110 operates a circuit is completed for energizing the busy relay R870, this circuit extending from ground as applied to C1223 in another of the links, by way of RC1208, RC1207, C1209, RA1115, RA1103 and its associated lower contact, C905, RA951, RC952, C848 and the upper winding of R870 to battery. When energized over this circuit, the busy relay operates to complete, at RA872, a holding circuit for itself, this circuit extending from ground at RA767 by way of C795, RA801, RA872, and the lower winding of R870 to battery. Shortly thereafter and when R950 operates, in the manner pointed out above, the operating circuit for R870 is interrupted at RA951 and RC952. When R870 operates, it opens, at RA876', a point in the circuit, traced hereinafter, for energizing the switching-through relay R700 and prepares, at RA871, a point in the path, traced hereinafter, for conducting busy tone current to the loop extending to the calling subscriber's substation. This path is now held open at the restored armature RA811 of the relay R810 and is not completed until after the fourth or code selecting digit is dialed at the calling substation. At RA876, the relay R870, upon operating, opens a point in the operating circuit for the pick-up relay R860 and, at RA877, it prepares a point in the circuit, traced hereinafter, for energizing the reverting call relay R800. Obviously, if the called line is idle at the time the unit relay corresponding thereto operates, no circuit is available for energizing the upper winding of R870 and this relay will not operate. When R950 operates, it opens, at RA951, the operating circuit for R870 to permit ground to be applied to the control conductor of the selected line without causing the operation of the busy relay.

*Selecting the code of the ringing current and ringing the called substation*

Considering now the operation of the link circuit apparatus in response to the impulses making up the fourth and final digit dialed at the calling substation, it is pointed out that the counting relays sequentially operate during the impulses of this digit in a manner identical with that described in detail above. It is the function of the apparatus controlled by these relays during the impulses of the fourth digit to select the particular code of the ringing current which corresponds to the desired called substation and, in the event divided ringing is to be used, to determine over which side of the line the coded ringing current is to be projected. Since the ringing devices individually provided at the substations associated with the selected line 16 are connected between the respective line conductors and ground, divided ringing must be utilized to signal the called substation. More particularly, since the ringing device 1234 provided at the called substation C is connected between the positive line conductor C1221 and ground, the coded ringing current must be projected over the positive side of the line 16. With the arrangement illustrated, this means that the fourth digit dialed at the calling substation must comprise more than five impulses so that, at the conclusion thereof, one of the sixth to tenth counting relays will be operated. Assuming, for example, that the code identifying the called substation C corresponds to the particular code of the ground pulses applied to the ringing interrupter lead C132, the final digit dialed at the calling substation will comprise nine impulses so that, at the conclusion thereof, the counting relay R1060a will be locked energized in series with R1000.

During the operation of the counting relays, and when the sixth relay R1030a operates, a circuit is completed for energizing R890, this circuit extending from ground at RA767 by way of C795, C111, RA1037', C104, RA934, RA955 and its associated lower contact, RA913, C859, and through the winding of R890 to battery. When energized over this circuit the relay R890 operates to complete, at RA896, a holding circuit for itself, this circuit extending from ground at RA767, by way of C795, RA896, and the winding of R890 to battery. At RA894, the relay R890, upon operating, completes a circuit for energizing R840, this circuit extending from ground at RA767 by way of C795, RA894, RA882, the winding of R840 and the resistor 897 to battery. When R840 operates, it rearranges, at RA841 and RA844, the ringing current connections, so that the ringing current will be projected over the positive line conductor C1221 of the selected called line 16. It will be understood that immediately the seventh counting relay R1040a operates to cause the restoration of the sixth counting relay R1030a, the above-traced operating circuit for R890 is opened at RA1037'. This does not affect the condition of R890, however, since this relay is now held operated over its completed holding circuit as traced above.

At the end of the digit, and when R960 restores, a circuit is completed for energizing R810, this circuit extending from ground at RA767 by way of C795, C111, RA1005, C101, RA961, RA938 and its associated upper contact, RA957 and its associated upper contact, C887, and the winding of R810 to battery. When energized over the above-traced circuit, the relay R810 operates to prepare, at RA816, a circuit for energizing the pick-up relay R860. At RA819, the relay R810 applies ground to the ringing apparatus start conductor C129 to initiate the operation of the ringing apparatus and the associated ringing interrupter. At RA815, the relay R810 prepares a circuit for energizing the upper winding of R850 by way of the mask-2 lead C126, and, at RA818, it prepares a circuit for energizing the lower winding of R850 by way of the selected one of the ringing interrupter leads. In this regard it will be noted that no provision is made for restoring the particular one of the counting relays which is operated immediately following the end of the fourth or code selecting digit, it being necessary to hold this relay in its operated condition until the ringing operation is completed.

Assuming that the called line is idle at the time it is selected, the ringing apparatus functions in a well-known manner to apply ground to the pick-up conductor C127 at the beginning of each ringing code cycle. Following the operation of R810, and when ground is applied to C127, a circuit is completed for energizing the upper winding of R860, this circuit extending by way of C127, RA876, RA816, RA868, and the upper winding of R860 to battery. When energized over the above-traced circuit the pick-up relay R860 operates to complete, at RA869′, a holding circuit for itself, this circuit extending from ground at RA767, by way of C795, RA869′, and the lower winding of R860 to battery. At RA868, the relay R860, upon fully operating, opens a point in its operating circuit, as traced above. At RA866, the relay R860 further prepares the circuit for energizing the upper winding of R850 in accordance with the ground pulses applied to the mask-2 lead C126. At RA867, the relay R860 further prepares the above-mentioned circuit for energizing the lower winding of R850 in accordance with the ground pulses applied to the selected ringing interrupter lead C132. At RA861, the relay R860 interrupts the path, traced previously, by way of which ground is applied to the negative line conductor of the calling line for the purpose hereinbefore fully described. The operation of RA861 also results in the interruption of the path short-circuiting the winding of R715, permitting this relay to be energized over the subscriber's loop circuit in series with R710. When R715 operates it prepares, at RA716, a circuit, traced hereinafter, for energizing R720. At RA862 and RA863, the relay R860 prepares paths for applying ringing current to both sides of the selected called line. At RA864, the relay R860 opens a point in the above-traced impulsing circuit extending to R960 and the counting relays, thereby to prevent further impulses dialed at the calling substation from causing any further operation of these relays. At RA869, the relay R860 opens a point in the path for applying ground to the tone generator start conductor C756′, thereby to arrest the operation of this generator, providing none of the other links are operating.

Following the operation of R860 the ringing relay R850 is conditioned to respond to the ground pulses applied to the mask-2 lead C126 and to the selected ringing interrupter lead C132. In this regard it is repeated that the ringing interrupter is so arranged that it operates to divide each ringing code into two halves, each comprising two or more short impulses, and the purpose of the two masking leads C125 and C126 is to convert the short ringing periods comprising the respective halves of a ringing cycle into long continuous ringing periods in a well-known manner. More particularly, with R910 and R890 restored, the first half of each ringing cycle comprises one long ring, because R850 is energized continuously during the first half of each ringing code cycle due to the application of ground to the mask-1 lead C125 by the ringing interrupter. Hence, the coded short ground pulses applied to the selected interrupter lead C132 are without effect during the first half of each ringing code cycle. The short pulses comprising the second half of each ringing code cycle are, however, effective to cause the operation of R850. On the other hand, with the relay R890 operated so that the upper winding of the ringing relay R850 is arranged to be energized by way of the mask-2 lead C126, the second half of each ringing cycle is converted from a series of short rings into one long continuous ring. In this case the ground pulses applied to the mask-1 lead C125 are without effect and, hence, the short rings comprising the first half of each ringing cycle are not masked out. Thus, considering the operation of the apparatus to project ringing current over the called line 16 during the first half of each ringing cycle, the ringing relay R850 is energized each time ground is applied to C132 over a circuit extending by way of C132, RA1063′, C112, RA867, and the lower winding of R850 to battery. During the second half of each ringing code cycle, ground is applied to the mask-2 lead C126 for the duration of the second half of the cycle, thereby completing the circuit for energizing the upper winding of R850, this circuit extending by way of C126, RC893, RA891, RA815, RC837, RA836, RA866 and the upper winding of R850 to battery. Each time the ringing relay R850 operates, it functions to complete, at RA858, an obvious circuit for energizing R820 and also to project ringing current over the positive side of the selected called line to the signal device 1234 at the called substation C. More particularly, the path of this current extends from the ungrounded terminal of the ringing current generator by way of C823′, RA835, RC843, RA841, RC853, RA851, RA862, C777′, RA1101 and its associated lower contact, RA1114, C1212, the contact springs of R1200, C1221 and through the ringing device 1234 to the grounded terminal of the ringing current source. Portions of this ringing current also flow through the other signal devices connected between the positive side of the called line and ground and individually provided at certain of the other substations, if any. Due to the coded nature of the current, however, the called party is informed that his substation is being rung and the parties at the other stations have ringers connected between the positive side of the line and ground are informed that the call is not intended to be answered at their substations. A portion of the ringing current is by-passed by way of RA854, the condenser 839, C789, RA751, and the calling subscriber's loop circuit through the receiver at the calling substation to indicate to the calling partly that the called substation is being rung. The relay R820 operates during each ringing period and, due to its slow-to-release characteristic, remains operated for a short interval after each ringing period is ended. At its armatures RA821 and RA824 and their respective associated contacts RC822 and RC825, the relay R820 disconnects the conductors of the called line from the link line extending to the repeater 780, thereby to prevent the charged condensers at the respective substations on the called line from discharging through R775. At these same armatures and their respective associated contacts RC823 and RC826, the relay R820 completes a path for discharging the condensers on the called line during the intervals between ringing periods.

The call is answered in the usual manner when the receiver at the called substation is removed from its hook. As a result, a loop circuit is completed for energizing R775. This circuit extends from ground at the upper terminal of the impedance element 774 by way of this element, the repeater winding 783, C780, RC822, RA821, RC852, RA851, RA862, C777', RA1101 and its associated lower contact, RA1114, C1212, C1221, the bridge across C1221 and C1222 at the called substation, C1222, C1211, RA1118, RA1102 and its associated lower contact, C788, RA863, RA855, RC856, RA824, RC825, C786, the repeater winding 784 and the winding of R775 to battery. When R775 operates, it opens, at RA778', a point in the circuit, traced hereinafter for energizing the link release relay R730 and completes, at RA776, a circuit for energizing R720, this circuit extending from ground at RA776 by way of RA716 and the winding of R720 to battery. At RA779', the relay R775 completes a circuit for energizing R920, this circuit extending from ground at RA767 by way of C795, C111, RA1005, C101, RA779', C759 and the winding of R920 to battery.

When R720 operates, it reverses battery back over the calling subscriber's loop circuit at its armatures RA721 and RA724 and their respective associated armatures RA722 and RA725. When R920 operates, it opens, at RA921, a point in the holding circuit over which the operated relays R1060a and R1000 are being held energized, causing these two relays to restore. When R1060a restores, it opens, at RA1062', a point in the circuit for energizing the lower winding of R850 in accordance with the ground pulses applied to the interrupter lead C132. When R1000 restores, it opens, at RA1005, a point in the above-traced circuit over which R810 is held energized, causing the last-named relay to restore. At RA815, the relay R810, upon restoring, opens a point in the above-traced circuit for energizing the upper winding of R850 in accordance with the ground pulses applied to the mask-2 lead C126. At RA811, the relay R810 opens a point in the path for applying busy tone current to the loop extending to the calling subscriber's substation. At RA819, the relay R810 removes ground from the ringing apparatus start conductor C129 and, at RA818, it opens a further point in the circuit for energizing the lower winding of R850 in accordance with the ground pulses applied to the ringing interrupter lead C132.

When the relay R1000 restores, it also functions to open, at RA1005, a point in the above-traced operating circuit for R920, causing the last-named relay to restore to reprepare, at RA921, a point in the common portion of the holding circuits for the counting relays. With the apparatus in this condition, an established talking loop extends between the calling and called substations A and C, respectively, and no further operation of the switching apparatus occurs until such time as the connection is released at the calling substation.

As was pointed out above, if the called line is busy at the time it is selected by the connector portion of the link, the busy relay R870 is caused to operate and, upon operating, locks itself energized. With the busy relay energized, the operating circuit for the pick-up relay R860 is held open at RA876 and, with this circuit open, it is impossible for the pick-up relay to be energized for the purpose of projecting ringing current out over the called subscriber's line. Hence, the resulting operation of R810 and R890 following and during the dialing of the code selecting digit is ineffective to cause the ringing operation to be performed. This is true irrespective of the type of ringing selected for use or the code of the ringing current selected since, in any case where R870 operates, the two armatures RA862 and RA863 of the pick-up relay must remain restored to hold the called subscriber's loop circuit open and the two armatures RA866 and RA867 must remain restored to hold open the circuits for energizing the ringing relay R850. When a busy condition prevails, however, and when R810 operates, the above-mentioned path for conducting busy tone current by way of the calling subscriber's loop circuit to the calling substation is completed at RA811. More particularly, the path of this current extends from the ungrounded terminal of the busy tone source, not shown, by way of C847, RA811, RA871, C828, RC933, RA931, C809, the condenser 839, C789, RA751, RA702 and its associated upper contact, C473, RA432 and its associated upper contact, RA402, C363, RC378, RC311, C305, the receiver at the calling substation, C304, RC376, RC375, C362, RA401, RA431, C472, RA701 and its associated upper contact, C779, RA861 and C778 to the grounded terminal of the busy tone source at RA761. The resulting operation of the receiver at the calling substation gives to the calling subscriber an audible indication that the connection can not immediately be established. The method by which the link is released when the calling party hangs up upon receiving busy tone is described in detail hereinafter.

In the event the desired substation on the called line 16 is a substation other than the station C but is one which also includes a ringing device connected between the positive side of the line and ground, a different code must necessarily be selected in order to signal over the called line that the different substation is desired. If it be assumed, for example, that a substation is desired having a ringing code corresponding to the coded ground pulses applied to the ringing interrupter lead C130, the fourth or code selecting digit dialed at the calling substation must necessarily comprise seven impulses rather than nine. In this case, the three relays R890, R810 and R860 are caused to operate in the exact manner set forth above, it being pointed out, however, that the relay R810 is held energized over a circuit controlled by the relay R1020 rather than the relay R1000, this circuit being identical with that traced previously but extending by way of RA1025 rather than RA1005. At the end of the digit, the counting relay R1040a will remain energized and, with this relay operated, the ringing relay R850 is arranged to be energized in accordance with the coded ground pulses applied to C130, during the first half of each ringing cycle, rather than in accordance with the coded ground pulses applied to C132. Specifically, the circuit for energizing the lower winding of R850 extends from ground as applied to C130 by the ringing interrupter by way of RA1043', C112, RA867 and the lower winding of R850 to battery. The path for energizing the upper winding of R850 during the masking period of each ringing cycle is identical with that traced above. The operation of the apparatus when a code selecting digit comprising eight or ten impulses is dialed is in all respects similar to that just described, differing therefrom only in the one of the counting relays which is locked energized at the end of the code selecting digit.

The operation of the apparatus, when a code selecting digit of six impulses is dialed, is somewhat different from that set forth above. In this case, the counting relay R1030a remains operated at the end of the code selecting digit. Immediately the sixth counting relay R1030a operates, it completes the above-traced operating circuit for R890, which latter relay operates and completes its holding circuit in the manner described above. Upon operating, the relay R890 also completes, at RA894, the previously traced operating circuit for R840. When R840 operates, it arranges the ringing current connection so that the coded ringing current will be projected over the positive side of the called line. Shortly following the end of the digit and when R960 restores, a circuit substantially similar to that traced above is completed for energizing R810, this circuit extending from ground at RA767 by way of C795, C111, RA1005, C101, RA961, RA938 and its associated upper contact, RA957 and its associated upper contact, C887 and through the winding of R810 to battery. When the relay R810 operates, it performs the identical functions described previously, among which are the preparation of the operating circuit for the pick-up relay R860 and the closing of ground to the motor start lead C129 to initiate the operation of the ringing apparatus. When R860 operates at the beginning of the first ringing code cycle, it prepares, at RA866, the circuit, traced previously, for energizing the upper winding of R850 in accordance with the ground pulses applied to the mask-2 lead C126 during the operation of the ringing interrupter. At RA867, the pick-up relay R860 prepares a circuit for energizing the lower winding of R850 in accordance with the ground pulses applied to the mask-1 conductor C125 by the ringing interrupter. Specifically, the last-mentioned circuit extends from ground as applied to C125 by the ringing interrupter by way of RA911, C879, RA895, C105, RA1034', C112, RA867 and the lower winding of R850 to battery. By virtue of this circuit arrangement, the ringing relay R860 is energized for one long interval during each half of each ringing code cycle and, thus, two long dashes of ringing current are projected over the positive side of the called line and through the signal devices connected between this side of the line and ground during each code cycle.

As was pointed out in a preceding portion of the specification, if a prefix or first digit of two is dialed followed by a code selecting digit comprising from one to five impulses, divided ringing will be utilized in signaling over the called line, and the selected coded ringing current will be projected over the negative side of the called line rather than over the positive side of the line in the manner set forth immediately above. For example, if the substation B on the called line 16 is desired by the calling party, the code corresponding to this substation must necessarily be one of the codes corresponding to a code selecting digit of from one to five impulses. Assuming that the code corresponding to this substation is selected when a fourth or code selecting digit comprising two impulses is dialed at the calling substation, the second counting relay R1040 will be locked energized in series with R1010 at the conclusion of the digit. In this case, it is to be noted that the relay R890 is not operated since this relay is only energized when a code selecting digit comprising more than five impulses is dialed. At the end of the digit and when R960 restores, it completes the above-traced operating circuit for R810 causing the last-named relay to operate. When R810 operates, it performs the functions described in detail above. At the beginning of the first ringing cycle, when ground is applied to the pick-up lead C127, the relay R860 operates to prepare, at RA866, a circuit for energizing the upper winding of R850 in accordance with the ground pulses applied to the mask-1 conductor C125. At RA867, the relay R860 prepares a circuit for energizing the lower winding of R850 in accordance with the ground pulses applied to the interrupter lead C152 by the ringing interrupter. During the first half of each code cycle, the upper winding of R850 is energized continuously over a circuit extending from ground as applied to the mask-1 conductor C125 by way of RA911, C879, RC892, RA891, RA815, RC837, RA836, RA866, and the upper winding of R850 to battery. During the second half of each code cycle, the lower winding of R850 is repeatedly energized in accordance with the ground pulses applied to the ringing interrupter lead C152 by the ringing interrupter. In this case, the circuit for energizing the lower winding of R850 extends from ground as applied to C152 by way of RA1042, C109, RA818, RA867, and the lower winding of R860 to battery.

Each time the relay R850 operates, ringing current is projected over the negative side of the called line. Specifically, the path of this current extends from the ungrounded terminal of the ringing generator, not shown, by way of C823', RA835, RC845, RA844, RC857, RA855, RA863, C788, RA1102 and its associated lower contact, RA1118, C1211, C1222 and through the ringing device 1235 to the grounded terminal of the ringing current generator. Portions of the ringing current are by-passed through the signal device connected between the negative side of the line and ground and individually provided at substations other than the station B. Also, a portion of this current is conducted by way of the circuit, traced previously, for causing the receiver at the calling substation to generate ring-back tone. From this point on, the operation of the apparatus is substantially similar to that described above with reference to the dialing of a code selecting digit comprising nine impulses. In this connection, it is pointed out that the restored condition of the two relays R840 and R890 in no way affects the operation and subsequent restoration of R920, the restoration of R1010 and R1040, and the restoration of R810 when the call is answered at the called substation.

Further to illustrate the operation of the apparatus when a code selecting digit of less than six impulses is dialed, and in a connection where divided ringing is utilized in signaling over the called line, it will be assumed that a substation is desired having a code corresponding to a code selecting digit of three impulses. In this case, the third counting relay R1050 will be locked energized in series with R1000 at the end of the third digit, and the only point in the operation which differs from that set forth immediately above pertains to the circuit for energizing the lower winding of R850 during the second half of each code cycle. In this case and with R1050 operated, the lower winding of R850 is energized in accordance with the ground pulses applied to the interrupter lead C153. Specifically, the circuit for energizing this winding extends from ground as applied to C153 by the ringing interrupter, by way of RA1052, C112, RA867 and the lower winding of R850 to battery. Aside from this difference, the apparatus functions in the exact manner set forth above in the description with reference to a code selecting digit comprising two impulses.

As pointed out in the introductory portion of the specification one of the features of the present invention pertains to the arrangement of the apparatus, whereby it is impossible inadvertently to connect the ringing current generator to ground when ringing over a subscriber's line of the ground return type wherein the earth is utilized as one line conductor. The purpose of this arrangement is to permit facilities for divided ringing to be provided while eliminating any possibility of the ringing current generator being short circuited due to the inadvertent dialing of a code selecting digit designating ground as the side of a selected grounded line to be utilized in transmitting ringing current to the signal device at the called substation. For example, if the lines terminating at the contact springs of the group relay R1200 were of the ground return type and the line conductor formed by ground were arranged to be connected to the positive link line conductor C1212 upon the operation of R1200, it would be possible by dialing a prefix digit of two and a code selecting digit of from six to zero to cause the ringing current generator to be short circuited during each ringing interval. Not only would the call utilizing the link illustrated fail, but if the ringing generator were also being utilized in ringing over called lines selected by other links these calls would fail as well.

In order to obviate the possibility outlined in the preceding paragraph, there may be provided under the control of those of the group relays having contact springs terminating ground return lines, circuits, completed upon operation of such group relays, for preventing the relay R840 from thereafter being energized even though a code selecting digit ranging from six to zero is dialed. Such a circuit is shown, for purposes of illustration, as being controlled by the group relay R1200. It will be remembered that so long as R840 is restored, ringing current can only be projected over the negative link line conductors C1211 or C1213 to the negative side of a selected called line. Hence, if the group relay R1200 were used to terminate ground return lines the metallic conductors thereof would be connected to the contact springs of the relay arranged to be connected to the link line conductors C1211 and C1213. Moreover, and in view of the arrangement to be described immediately below, if part of the lines terminating at this relay were ground return lines and the others were two conductor metallic lines, divided ringing could not be used in signaling the substations on the two-conductor metallic lines.

The above-mentioned circuit for precluding the operation of the relay R840 is completed immediately R1200 operates at the end of the second digit dialed at a calling substation and before the unit and code selecting digits are dialed. Specifically, this circuit is for the purpose of extending ground potential to the upper winding of R840, thereby to prevent this relay from drawing energizing current through the resistor 897 from the exchange battery. It extends from ground at RA767 by way of C795, RC1202, RC1201, and C898 to the upper terminal of the winding of R840 and thence through the resistor 897 to battery. If, with this circuit provided, a prefix digit of two, corresponding to divided ringing, is followed by a code selecting digit of more than five impulses, on a call to one of the grounded lines, the relay R840 will be short-circuited and will not operate. Hence, it will be seen that it is not possible with such a circuit arrangement to short circuit the ringing current source. Obviously, this circuit will only be employed in connection with those of the group relays terminating grounded lines.

Since ground return and two conductor metallic lines may extend to the same exchange and the metallic lines may be arranged for either bridged or divided ringing, it is necessary to make provisions for handling all alternatives. If the ringers individually provided at the substations associated with a particular line are bridged across the line in the manner diagrammatically illustrated for the substation E, bridged ringing must necessarily be utilized in signaling over the line. As was pointed out above, bridged ringing is selected when the first or prefix digit dialed at the calling substation comprises three or four impulses. Briefly to summarize, if a digit comprising three impulses is dialed, bridged ringing is selected as the type of ringing to be utilized and the code of the ringing current to be projected over the subsequently selected called line is narrowed down to the selection of one of ten possible codes. On the other hand, if a digit of four impulses is dialed, bridged ringing is selected and the code of the ringing current ultimately to be projected over the subsequently selected line is narrowed down to one of a second group of ten different codes. For example, if the line 12 is selected by the connector portion of the link illustrated, the substation E is desired by the calling party, and the code of the ringing current corresponding to this substation is one of the first group of ten codes, the first digit dialed at the calling substation will consist of three impulses so that, at the end of the digit, the relay R900 will be energized in response to the restoration of R960. Further, this relay, following its operation, is locked energized in series with R940 and, through its operation, selects the first ten codes as including the code corresponding to the called substation. It only remains, therefore, for the particular code of this group to be selected during the operation of the apparatus in response to the impulses of the fourth and final digit. Assuming, for example, that the code corresponding to the called substation E is the fourth code of the first group of ten codes, the code selecting digit will comprise four impulses so that, at the conclusion thereof, the counting relay R1060 will be locked energized in series with R1020. At the end of the digit and when R960 restores, the operating circuit for R810 is completed in the manner described above. Thereafter and when a ringing code is started by the interrupter, ground is applied to the pick-up lead C127 to cause the operation of the pick-up relay R860. When R860 operates, it prepares, at RA866, the above-traced circuit for energizing the upper winding of R850 in accordance with the ground pulses applied to the mask-1 lead C125. At RA867, the pick-up relay prepares a circuit for energizing the lower winding of R850 in accordance with the ground pulses applied to the ringing interrupter lead C154. During the succeeding operation of the interrupter, the upper winding of the relay R850 is energized over the mask-1 lead during the first half of each code cycle in the exact manner described above. During the second half of each code cycle, the lower winding of R850 is repeatedly energized over a circuit extending from ground as applied to C154 by the code interrupter, by way of RA1062, C109, RA818, RA867 and the lower winding of R850 to battery. Each time R850 operates, ringing current is projected out over the called line to energize the ringing device bridged across the conductors of the line. More particularly, the path of the ringing current extends from the ungrounded terminal of the ringing current generator by way of C823', RA835, RC845, RA844, RC857, RA855, RA863, C788, RA1102 and its associated upper contact, the negative side of the called line, the bridged ringing device connected across the conductors of the line, the positive side of the called line, RA1101 and its associated upper contact, C777', RA862, RA851, RC853, RA841, RC842, and RA831 to the grounded terminal of the ringing generator at RC832. Portions of this current flow through the ringing devices bridged across the called line at the other substations connected thereto. Ring-back tone current is conducted through the receiver at the calling substation over the circuit traced previously. The operations which occur when the called party answers the call are identical with those described above with reference to the divided type of ringing.

The operation of the apparatus to project coded ringing current over a selected line arranged for bridged ringing is substantially similar to that just described in any case where the code of the ringing current is one of the first group of ten codes. In this connection, it is pointed out that each of the counting relays is, when operated, operative to select a code different from that corresponding to any of the other counting relays. Hence, by dialing the proper code selecting digit, any one of the ten codes may be selected. If the code corresponding to the called substation is one of the second group of ten codes, the only manner in which the operation of the apparatus departs from that set forth above is that the relay R910 is energized at the end of the prefix or first dialed digit, rather than the relay R900. With R910 operated and when the two relays R810 and R860 are subsequently caused to operate, no circuit is provided for energizing the upper winding of the ringing relay R850, this circuit now being interrupted at the operated armature RA911 of the relay R910. The lower winding of R850, on the other hand, is arranged to be energized in accordance with the ground pulses applied to a selected one of the interrupter leads during both halves of each code cycle. Thus, if the fifth counting relay R1070 is operated at the end of the code selecting digit which follows a prefix digit of four, the circuit for repeatedly energizing the lower winding of R850 extends from ground as applied to C155 by the ringing interrupter, by way of RA1072, C112, RA867 and the lower winding of R850 to battery. Since, in this case, neither the first nor the second halves of the ringing codes is masked out through the continuous energization of the upper winding of R850, this relay functions fully to code the ringing current projected over the selected called line.

Release of the connection

The release of a connection as established between the substations A and C in the manner previously described is primarily under the control of the calling party. Thus, if the called party hangs up before the connection is cleared out at the calling substation, the relay R775 restores to interrupt at RA776 the circuit over which R720 is being held energized. At RA778', the relay R775 reprepares the circuit for energizing the link release relay R730. When R720 restores, it reverses battery back over the loop extending to the calling subscriber's substation. Following the above-described relay operations, nothing further occurs until the call is cleared out at the calling substation. When the calling party hangs up, the loop circuit over which R710 and R715 are being held energized is interrupted, causing these two relays to restore. When R710 restores, it opens, at RA711 and RC712, a point in the holding circuit for R740. When R740 falls back, it opens, at RA745, the multiple holding circuit for R750 and, at RA741, the circuit over which R770 is being held operated. At RA746, the relay R740 opens a point in the operating circuit for R760. A short time interval after the restoration of R740, the relay R750 restores to open, at RA753 and RC754, the holding circuit for R760. At RA753 and RC754, the relay R750 also removes ground from the control conductor C474. When R760 restores, it removes, at RA767, ground from the hold conductor C795 and, at RA764 and RC765, ground from the guard conductor C476. At RA764 and RC766, the relay R760 applies multiple ground to the conductor C477 extending to the all-links-busy relay R600. At RA768, the relay R760 removes ground from the finder switch hold conductor C475. When ground potential is removed from the last-mentioned conductor, a point is opened in the holding circuits for the subgroup relay R430, the operated one of the unit relays in the finder switch and the operated one of the group relays in the finder switch, and when ground is removed from C474 the operating circuits are opened for the cut-off and lockout relays associated with the calling line. Thus, all of these relays are caused to restore. In the present assumed case wherein the line 11 is the calling line, the removal of ground from C474 and C475 results only in the restoration of the unit relay R400, the group relay R370 and the cut-off and lockout relays R310 and R320, respectively. Had the calling line been included in a subgroup requiring the operation of the subgroup relay R430, this relay would also have been deenergized upon the removal of ground from C475. When ground is removed from the hold conductor C795, a point is opened in the holding circuits for the relays R860, R870, R880, R890, R900, R910, R930, R940, R950, the subgroup relay 1100 and any operated ones of the group and unit relays provided in the connector portion of the link. Thus, any operated ones of the enumerated relays are caused to restore. In this regard, it is pointed out that the ones of the relays R890, R900, and R910 which remain operated when release of the established connection is initiated will depend upon the nature of the ringing utilized in signaling the desired called substation and also upon the code of the selected ringing current. Following the restoration of the operated ones of the relays enumerated above, the link is entirely released and is in readiness for further use. In this connection, it will be appreciated that through the removal of ground from the guard conductor C476, the link is identified in the allotter as being idle and in readiness to be assigned to another call.

The manner in which the link is released when the calling subscriber is the first to hang up is almost identical with that set forth above. In this case, however, the relay R775 is held operated over the loop extending to the called substation and the relay R720 is held operated over its holding circuit until the operated ones of the connector group and unit relays restore to interrupt this loop. When the loop is interrupted, the relay R775 restores to open, at RA776, the circuit over which R720 is being held energized and, when R720 restores, the connection is completely released.

The manner in which a connection is released following the selection of a line which is found to be busy is also substantially similar to the release of the apparatus as described above. In this case, the pick-up relay R860 is not operated and the busy relay R870 is held operated over a holding circuit which extends from ground on the hold conductor C795. This busy relay is, therefore, caused to restore following the restoration of R760 to remove ground from the hold conductor noted. In addition, when a selected called line is found busy, no provision is made for restoring the particular one of the three relays R1000, R1010 and R1020 which remains locked up in series with a selected one of the counting relays at the end of the code selecting digit, until the connection is cleared out. When, however, during the release of the connection, the relay R760 restores to remove ground from the hold conductor C795, a point is opened in the common portion of the holding circuits for all of the counting relays, causing any operated one of these relays and the series connected one of the three relays R1000, R1010 and R1020 to restore.

*Reverting calls*

If a party wishes to converse with a subscriber having a substation connected to the line to which the calling substation is connected, he initiates the call in the usual manner and dials the regular directory number of the called subscriber's substation. The first three digits, namely, the prefix and the line selecting digits, of this number will necessarily correspond to the first three digits of the directory number identifying the calling subscriber's substation. If, for example, the call is initiated at the substation A and the link illustrated is assigned to the use of the calling line, the connector portion of this link operates in a manner similar to that described above to select the calling line 11. At the end of the third digit, the busy relay R870 is caused to operate, since the calling line is marked as busy over the control conductor extending through the finder portion of the link. At the end of the fourth or code selecting digit, busy tone is returned over the loop to the calling subscriber in the manner described previously. Upon receiving busy tone, the calling party hangs up, thereby to open the loop circuit over which the line relay R710 is energized. When R710 restores, it opens, at RA711 and RC712, the above-traced holding circuit for R740. The relay R740, upon restoring, opens, at RA741, the operating circuit for R770 and, at RA745, the operating circuit for R750. When R770 restores, it opens, at RA771 and RC772, the remaining holding circuit for the slow-to-release relay R750. The relay R750, upon restoring, interrupts, at RA756, a point in the path for applying ground to the tone generator start conductor C756' and completes, at RA753 and RC755, a circuit for energizing the reverting call relay R800. The relay R750, upon restoring, also opens, at RA753 and RC754, a point in the previously traced holding circuit for R760. The relay R760 does not restore, however, since an alternative holding circuit is now available for holding this relay operated, this circuit extending from ground at RA742 by way of RC744, RA703, RA762, C791, RA812, RC814, RA873, RA874, C849, RC953, RA951', C905, RA1103 and its associated upper contact, RA1113, C1217, a set of springs of the operated group relay R1200, C306 as multipled between the finder and connector switches, RC374, RC373, C364, RA403, RA433 and its associated upper contact, C474, RA763 and through the winding of R760 to battery. The circuit for energizing the reverting call relay R800 extends from ground as extended to C474 over the above-traced path, by way of RA753, RC755, C796, RA877 and the winding of R800 to battery. The relay R800, upon operating, completes, at RA807, a holding circuit for itself, this circuit extending from ground at RC735 by way of RA734, C798, RA807, RA817, and the winding of R800 to battery. At RA803, the relay R800 completes a multiple holding circuit for R760, this circuit extending from ground at RC804 by way of RA803, C794, RA763 and the winding of R760 to battery. At RA806, the relay R800 opens a point in the common portion of the holding circuits for the group and unit relays in the operated finder switch, causing the operated ones of these relays to restore, thereby to release the finder portion of the link. Ground is still retained on the guard conductor C476 of the link to prevent the link from being assigned by the allotter to the use of another calling line. Ground potential is also maintained on the control conductor C306 of the calling line to hold operated the lockout relay R320 and the cut-off relay R310, this ground potential being extended by way of the still operated connector portion of the link. At RA802, the reverting call relay R800 prepares a circuit, traced hereinafter, for energizing R830 in accordance with the ground pulses applied to the reverting call signal conductor C128. At RA801, the relay R800 interrupts a point in the previously traced holding circuit for the busy relay R870, causing the last-named relay to restore. Upon restoring, R870 interrupts, at RA871, a point in the above-traced path by way of which busy tone current is conducted over the calling subscriber's loop to the calling substation. At RA874 and RC873', the busy relay completes an alternative path for maintaining ground potential on the control conductor of the calling line to hold operated the line circuit associated therewith. More particularly, this path extends from ground at RA764 by way of RC765, RC706, RA705, C792, RC873', RA874, C849, RC953, RA951, C905 and through the operated connector switch to the control conductor C306 of the calling line. At RA877, the relay R870, upon restoring, interrupts a point in the above-traced operating circuit for the reverting call relay R800. At RA876, the relay R870 finally prepares the circuit for energizing the upper winding of the pick-up relay R860 the first time ground potential is thereafter applied to the pick-up conductor C127 by the ringing interrupter. When the pick-up relay operates, it initiates the ringing operation in the manner described in detail in a previous portion of the specification, it being pointed out that ringing current is only projected by way of the connector portion of the link to the calling line since the finder portion of the link is now restored. At RA865, the pick-up relay finally prepares the circuit for energizing R830 in accordance with the ground pulses applied to the reverting call signal conductor C128. As pointed out above, such ground pulses are only applied to the conductor noted for very short intervals between ringing code cycles. When ground is applied to this conductor, however, the relay R830 is momentarily energized over a circuit which may be fully traced as extending from ground on C128 by way of RA881, RA865, RA802 and the winding of R830 to battery. Each time R830 operates, it reverses the ringing connections at its armatures RA831 and RA835 and completes, at RA836, a circuit for energizing R850, so that ringing current is projected over the side of the line opposite that over which ringing current is conducted during the ringing cycle. The circuit for energizing R850 extends from ground on C128 by way of RA881, RA865, RA802, RC838, RA836, RA866 and the upper winding of R850 to battery. If, for example, the desired called substation has associated therewith a ringer which is connected between the negative line conductor C305 of the line and ground, the relay R830 will function to project ringing current over the positive line conductor C304 during a portion of the interval between the ringing code cycles, the path of this current extending from the ungrounded terminal of the ringing generator by way of C823', RC834, RA831, RC842, RA841, RC853, RA851, RA862, C777' and over the positive side of the calling line. On the other hand, if the called substation has associated therewith a ringer connected between the positive line conductor C304 and ground, the relay R840 will be in its operated position during the ringing operation, so that ringing current is normally projected out over the positive side of the line. When, however, R830 operates, it causes ringing current to be conducted over the negative side of the line, the path of the current in this case being from the ungrounded terminal of the ringing current source by way of C823', RC834, RA831, RC846, RA844, RC857, RA855, RA863, C788 and out over the negative side of the calling line. These short spurts of ringing current which are projected over the side of the line opposite that over which ringing current is conducted during the code cycles, cause all of the ringers on the opposite side of the line to be momentarily energized. The resulting operation of the ringers indicates that a ringing operation is being performed. The purpose of providing this arrangement is to permit the calling party to be informed that the called substation is being rung even though the ringer at the called substation is connected to the opposite side of the line from that at the called substation. Obviously, in those instances where a reverting call is made on a line arranged for bridged ringing, the reverting call signal is not required since, during the ringing operation, all of the ringing devices bridged across the line are energized and operate. It is for this reason that the operating circuit for R830 is under the control of the relay R880, which latter relay is only operated when divided ringing is to be utilized in ringing over a selected line. In this connection, it will be recalled from the preceding description that, in the case where bridged ringing is to be used, the relay R880 remains deenergized and one of the two relays R900 and R910 is caused to operate. With R880 restored, the above-traced operating circuit for the reverting call signal relay R830 is held open at RA881.

During a portion of the interval between succeeding code cycles, the two relays R820 and R850 are restored and, with the pick-up relay R860 operated, a loop circuit is prepared to the repeater 780. When the call is answered at the called substation, this loop circuit is completed, in the usual manner, to cause the operation of R775. When R775 operates, it completes, at RA779', the previously traced operating circuit for R920. The relay R920, upon operating, opens, at RA921, a point in the holding circuit for the operated counting relay and the one of the three relays R1000, R1010 and R1020 connected in series therewith. When the operated one of the three last-mentioned relays restores, it interrupts the operating circuits for R810 and R920, causing these two relays to restore. When the relay R810 restores, it opens, at RA817, the holding circuit for R800. When the last-named relay falls back, it opens, at RA803 and RC804, the holding circuit for R760 which restores and removes ground from the link guard conductor C476, thereby to mark the link as idle in the allotter. When R760 restores, it also removes ground from the hold conductor C795, thereby to initiate the release of the connector portion of the link in the exact manner described previously. At RA764 and RC765, the relay R760, upon restoring, removes ground from the control conductor C306 of the calling line, thereby opening the circuit over which the lockout relay R320 and the cut-off relay R310 are being held energized. When the cut-off relay restores, it reconnects, at its armatures RA311 and RA312, the windings of the line relay R300 across the conductors of the line 11. Since this line is now occupied with a call, a bridge exists across the talking conductors thereof so that a loop circuit is recompleted for causing the energization of the line relay. When R300 operates, it completes, at RA302, a holding circuit for the still operated lockout relay R320, this circuit extending from ground at RA302 by way of RA322, RC324 and the winding of R320 to battery. The lockout relay thus remains operated to hold open the start circuits extending to the common equipment illustrated in Fig. 5 until such time as the connection is cleared out at the calling and called substations on the line 11. When this occurs, the line relay R300 restores to interrupt, at RA302, the above-traced holding circuit for R320, and R320 restores, after an interval, to reprepare the start circuits extending to the common equipment. Following the restoration of R320, the line circuit associated with the line 11 is restored to normal. It is pointed out that, with the line relay R300 and the lockout relay R320 operated, busying ground potential is maintained on the control conductor C306 of the line 11 to prevent this line from being seized by one of the connector switches on another call. The path for applying ground potential to C306 extends from ground at RA325 by way of RA303 to the control conductor noted and is interrupted when the line and lockout relays restore.

*Trunk calls and trunk preselection*

As pointed out above, with the arrangement illustrated, trunk lines forming a ten-line group are terminated at the contact springs controlled by the tenth group relay of each connector switch. The arrangement is such that an idle trunk is selected immediately a previously selected trunk is taken for use and so long as any of the trunks are idle. In order to cause the connector portion of the link to select and establish a connection to a preselected idle trunk, a single digit of ten impulses is dialed at the call originating substation. For example, if the link illustrated is assigned by the allotter to the use of the line 11 upon the initiation of a trunk call at the substation A, when the first digit is dialed at the calling substation, the counting relays illustrated in Figs. 10 and 10a are caused to operate in the manner set forth previously. At the end of the digit, the tenth counting relay R1070a is in its operated position, being held energized in series with the relay R1020. When R960 restores shortly following the end of the digit, a circuit is completed for energizing the group relay R1400 corresponding to the tenth group of lines terminating at the connector portion of the link. The circuit for energizing this relay extends from ground at RA767 by way of C795, C111, RA1025, C101, RA961, RA938 and its associated lower contact, RA947 and its associated lower contact, RA962, C120, RA1073', C1432 and through the winding of R1400 to battery. When energized over the above-traced circuit, the relay R1400 operates to complete a path for short-circuiting the winding of R930, the short-circuiting path extending from ground at RA767 by way of C795, the winding of R930, C904, RC1408 and RC1407 back to ground as extended to C1432 over the energizing circuit for R1400. The relay R1400 also completes a path for applying ground potential to the two conductors C1433 and C1434, this path extending from ground at RA767 by way of C795, C111, RA1025, C101, RA961, RA949, C123, RA1076' to C1431 where it divides, one branch extending by way of RC1404 and RC1403 to the conductor C1433, and the other branch extending by way of RC1405 and RC1406 to C1434. The application of ground to the two leads noted results in the operation of the one of the unit relays which corresponds to the idle link that has been previously selected. More particularly, if it be assumed that the first trunk line 1450 is idle, the trunk selecting relay R1120 corresponding thereto will be in its restored position so that, when R1400 operates, a circuit is completed for energizing R1110, this circuit extending from ground as applied to C1433 by way of RA1122, C117, and the winding of R1110 to battery. When R1110 operates, it completes a path for short-circuiting the winding of R950, this circuit extending from ground at RA767 by way of the hold conductor C795, the winding of R950, C909 and RA1117 back to ground as extended to C117 over the conductor C1433. The relay R1110 also completes a circuit for energizing the relay R920, this circuit being traced previously. When the relay R920 operates, it opens, at RA921, a point in the circuit over which the two relays R1020 and R1070a are being held energized, causing these two relays to restore. When the relay R1070a restores, it opens, at RA1076' and RA1073', a point in each of the paths over which the windings of R930 and R950 are short-circuited, permitting the relay R930 to be energized in series with the group relay R1400 and the relay R950 to be energized in series with the unit relay R1110. The group and unit relays noted remain operated and the two relays R930 and R950 operate when energized in this manner. Upon operating, the relay R950 opens, at RA956, a point in the operating circuit for R920, causing this relay to restore to reprepare the holding circuits for the counting relays. When the relay R950 operates, it also completes, at RA954, a circuit for energizing the switching relay R700, this circuit extending from ground at RA767 by way of RC754, RA753, C474, C794, RA803, RC805, RA876', C808, RA954, RA943, C799 and the winding of R700 to battery.

The relay R700, upon operating, attracts its armatures RA701 and RA702 to connect the link line conductors C472 and C473 to the link line conductors C777' and C788, whereby the conductors of the calling line are connected directly through to the conductors of the seized trunk line. At the two armatures noted and their respective associated upper contacts, the relay R700 interrupts the loop circuit over which the two relays R710 and R715 are being held energized. At RA707, the relay R700 opens a point in the operating circuit for the link release relay R730. At RA703, the relay R700 opens a point in the impulsing circuit extending to the counting relays and traced above. It will be noted that, immediately the relay R950 operates, ground is applied to the control or private conductor C359 of the selected trunk line 1450 over a path extending from ground at RA764 by way of RC765, RC706, RA705, C792, RC873', RA874, C849, RC953, RA951, C905, RA1103 and its associated upper contact, RA1113, C1217, RC1410 and RC1409 to the control conductor noted. When R700 operates, ground is retained on this control conductor but over a slightly different path, this path extending by way of RA704 and RA705 rather than by way of RC706 and RA705.

From the preceding description with reference to the trunk line circuit illustrated in Fig. 3 and associated with the line 1450, it will be recalled that, when this trunk line is seized, the repeater 20, associated therewith, returns ground over the control conductor of the trunk line. This ground potential on the control conductor of the seized trunk line serves to hold the relays R700 and R760 operated independently of the line relays R710 and R715 and the other relays under the direct control of these two line relays. With R760 operated, ground is maintained on the hold conductors C795 and C475 and the control conductor C474, whereby the link is held in its operated condition and the calling line is held marked as busy. Ground is also retained on the link guard lead C476 to maintain the link marked as busy in the allotter.

When the loop circuit is interrupted, the two relays R710 and R715 restore. The relay R710, upon restoring, opens, at RA711, the holding circuit for R740. When R740 restores, it opens, at RA741, the operating circuit for R770 and, at RA745, the operating circuit for R750. When the relay R770 restores, it opens, at RA771, the holding circuit for R750, permitting the last-named relay to restore. Following the above-described sequence of relay operations, the link remains operated until such time as the connection is cleared out, at which time the repeater associated with the outgoing trunk line is released and removes ground from the control conductor of the trunk line, thereby to initiate the release of the operated link. Since a clear metallic circuit is completed through the operated link, it will be understood that further impulses may be dialed at the calling substation and repeated by the repeater 20 to the automatic switching equipment in the distant exchange, thus causing this equipment to establish a connection to the desired called line.

When the connection is cleared out, the repeater 20, associated with the seized trunk line, functions to remove ground from the control conductor C359 and, in so doing, interrupts the circuits over which the two relays R700 and R760 are held operated. When R700 restores, it reprepares the calling subscriber's loop circuit. When R760 restores, it removes ground potential from the hold conductors C795 and C475 and also from the control conductor C474 and the link guard conductor C476. When ground potential is removed from the conductors noted, the operated relays of the link are caused to restore in the exact manner pointed out above, the calling line is marked as idle and the link is marked as idle in the allotter.

Figure 11:
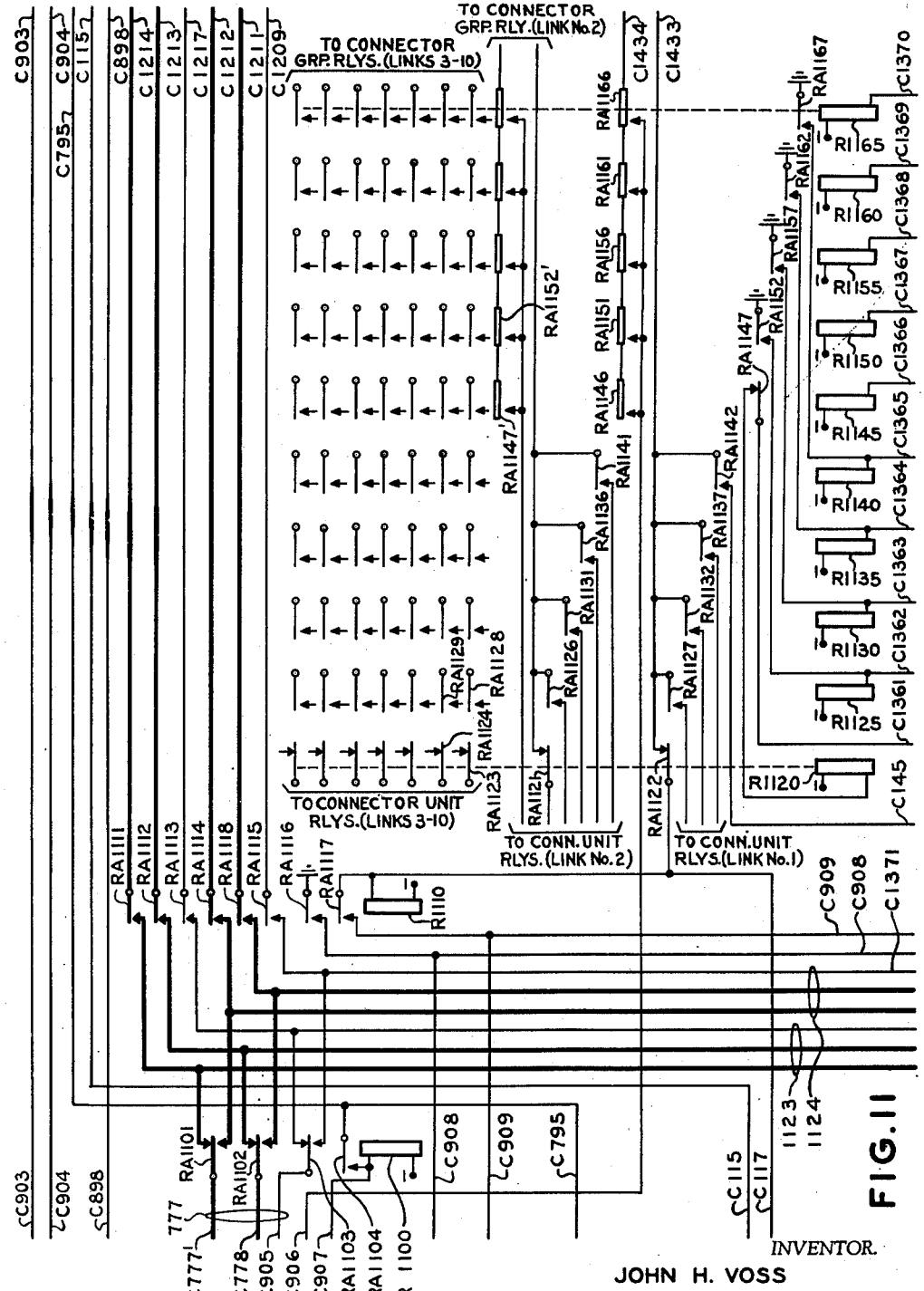
Figure 12:
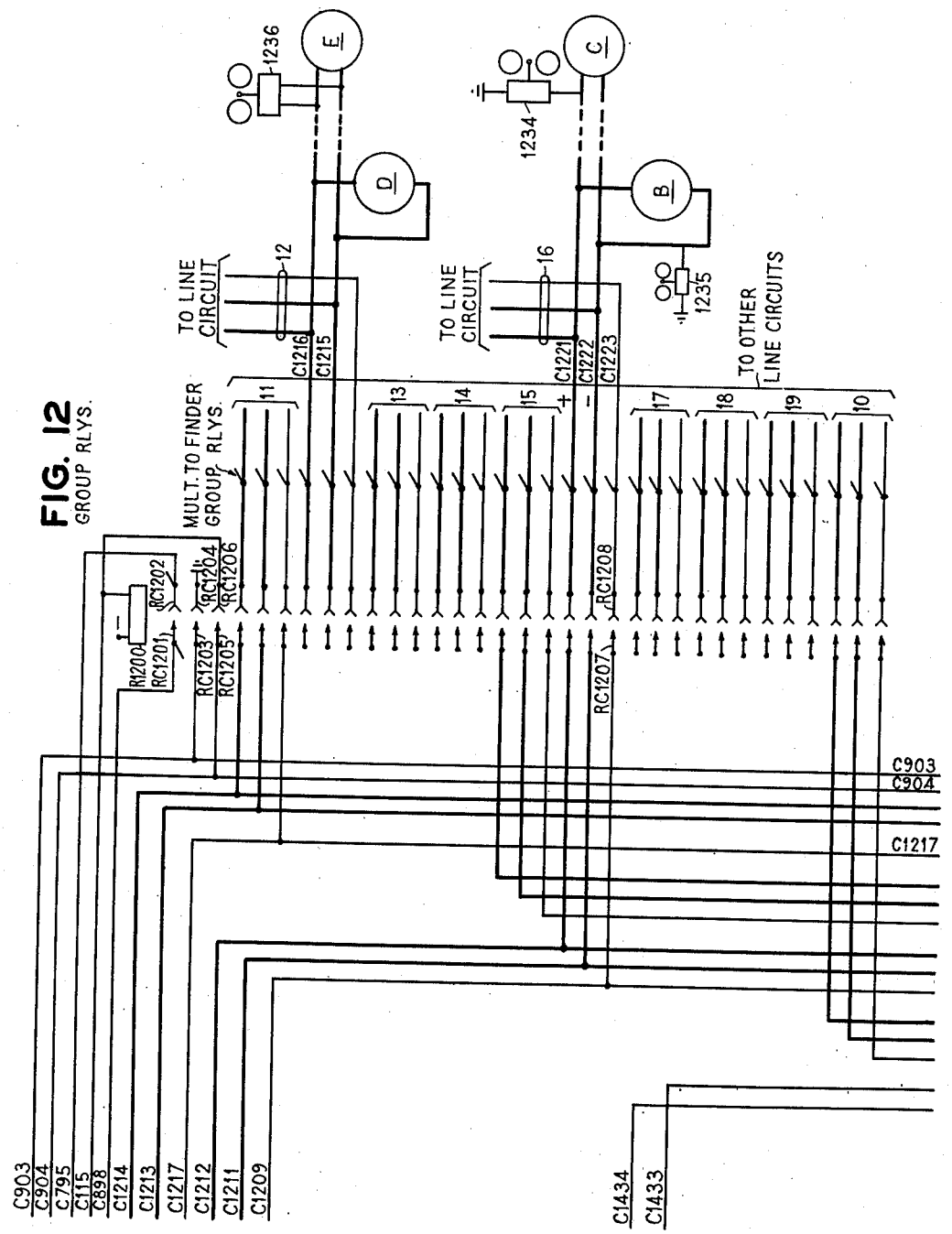
Figure 13:
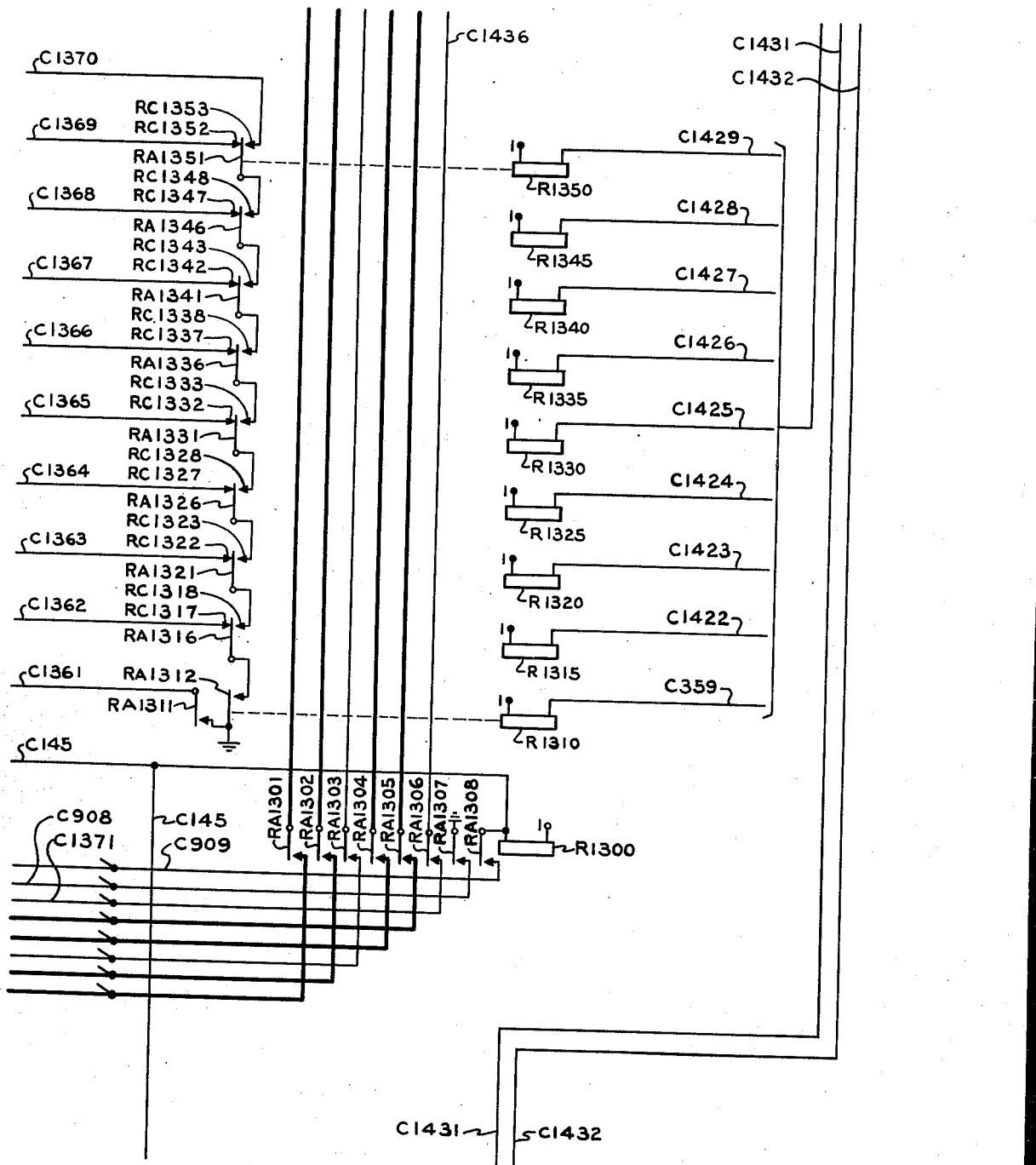
Figure 14:
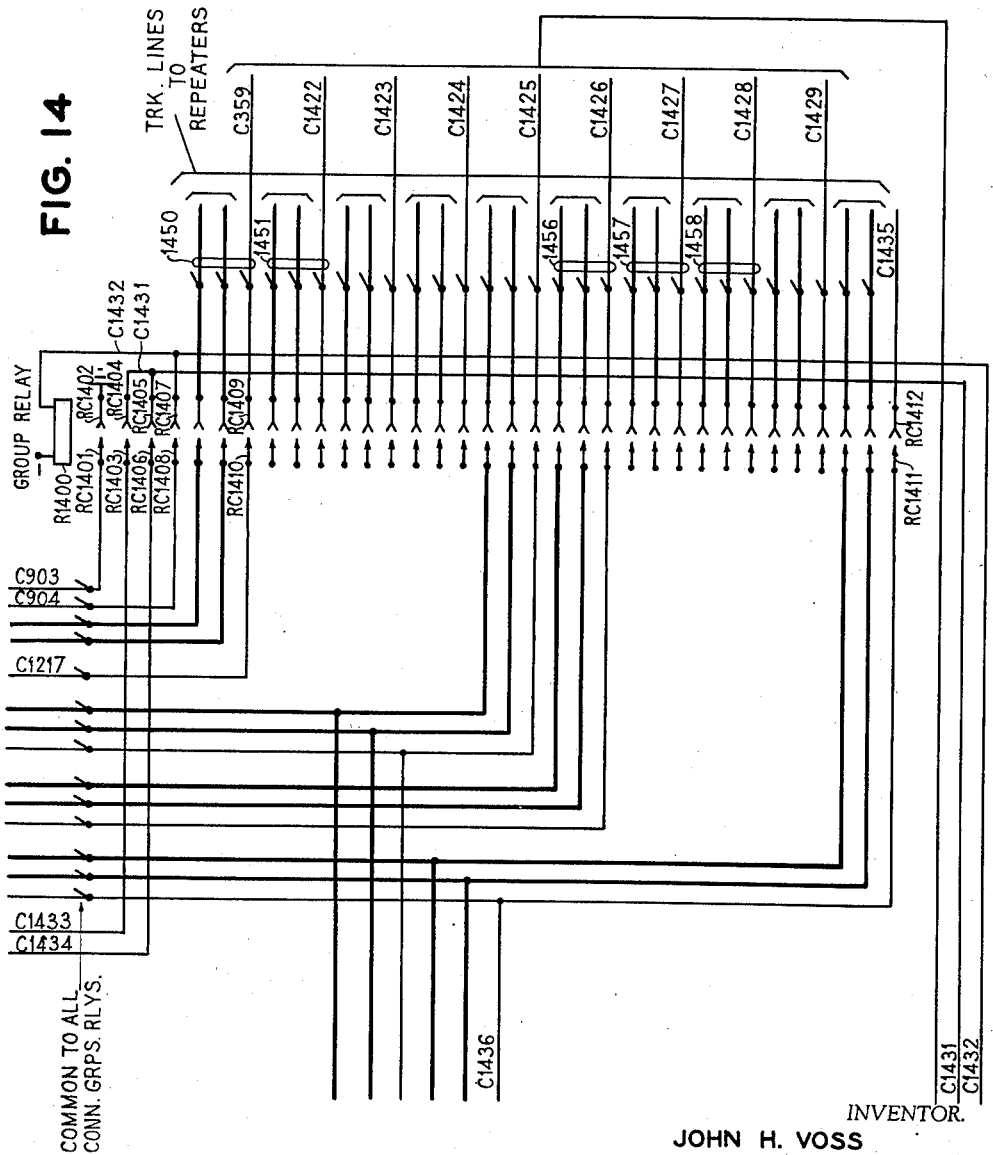

Considering now the operation of the apparatus, illustrated in Figs. 11 and 13, to select an idle trunk immediately a previously selected trunk is taken for use, when, in the above-described sequence of operations, ground is applied to the control conductor C359 of the seized trunk line 1450, a circuit is completed for energizing R1310. The relay R1310, upon operating, completes, at RA1311, a circuit for energizing the trunk select relay R1120 corresponding to the first trunk line, this circuit extending from ground at RA1311 by way of C1361, RA1147 and the winding of R1120 to battery. The relay R1120, upon operating, opens, at RA1122, a point in the above-traced operating circuit for the first unit relay R1110. In a similar manner, the relay R1120 opens, at its armatures RA1121, RA1123, RA1124, etc., points in the operating circuits for the first unit relays individually provided in the connector switches of the other nine links. Assuming the second trunk line of the group to be idle, the relay R1310, upon operating, completes a circuit for energizing the trunk select relay R1125 corresponding to the second trunk, this circuit extending from ground at RA1312 by way of RA1316, RC1317, C1362 and the winding of R1125 to battery. When the relay R1125 operates, it prepares, at RA1127, a point in the operating circuit for the second unit relay, not shown, provided in the link. Similarly, at RA1126, RA1128, RA1129, etc., the relay R1125 prepares points in the operating circuits for the respective second unit relays provided in the connector switches of each of the other links. With the two relays R1120 and R1125 operated, and when another trunk call is routed by way of a second link to the distant exchange, the second unit relay provided in the second link is caused to operate when ground is applied to the conductor of the second link corresponding to C1433 in response to the operation of the tenth group relay of the second link. When this second trunk is taken for use, ground is applied to the control conductor C1422 thereof to complete a circuit for energizing the relay R1315. The last-named relay, upon operating, interrupts, at RA1316 and RC1317, the circuit over which R1125 is held energized, permitting R1125 to restore, and completes, at RA1316 and RC1318, a circuit for energizing the third trunk select relay R1130. When R1130 operates, it prepares, at its armatures RA1131, RA1132, etc., the operating circuits for the third unit relays respectively provided in the connector switches of the other links so that, when a third trunk call is initiated, the third trunk line will be taken for use. In a similar manner, when the third trunk line is seized and ground is applied to the control conductor thereof, the relay R1320 operates to interrupt the circuit for R1130 and to complete the circuit for R1135, causing R1135 to operate to prepare the operating circuits for the fourth unit relays respectively provided in the connector switches of the various links. Again, when the first four trunk lines are simultaneously busy, the relay R1325 is energized from ground as applied to the control conductor C1424 and, upon operating, interrupts the circuit for R1135 and completes the operating circuit for R1140, which latter relay, upon operating, prepares the operating circuits for the fifth unit relays provided in the various connector switches. From the foregoing description, it will be apparent that the relay R1120 is maintained energized following the seizure of the first trunk line and so long as not more than five of the trunk lines are busy at the same time. Each of the relays R1125, R1130, R1135, R1140, R1145, R1150, R1155, and R1160, on the other hand, restores when the succeeding one thereof is caused to operate. When any one of the last-named group of relays restores, it opens points in the operating circuits for the respective unit relays corresponding thereto.

It will be recalled from the previous description pertaining to the illustrated connector switch that only five unit relays are provided therein, each of which is operative to select either of two lines, depending upon the operated or non-operated condition of the associated subgroup relay. The trunk selecting arrangement is such that the subgroup relay, such, for example, as the relay R1100, is energized before a selected one of the unit relays in the corresponding connector switch when a trunk call is initiated at a time when more than five of the available trunks are busy. Thus, when the fifth trunk is taken for use, its associated control relay R1330 operates to complete, at RA1331 and RC1333, the operating circuit for the sixth trunk select relay R1145. When the relay R1145 operates, it opens, at RA1147, the circuit over which the first trunk select relay R1120 is being held energized. At RA1146, RA1147′, etc., the relay R1745 prepares the respective operating circuits for the subgroup relays individually provided in the various connector switches. When the relay R1120 restores, it reprepares, at its armatures RA1121, RA1122, RA1123, etc., the operating circuits for the first unit relays individually provided in the connector switches. With the apparatus in this condition and when a trunk call is initiated, ground is applied to each of the two conductors C1433 and C1434 in the manner pointed out previously. The application of ground potential to C1433 results in the completion of the operating circuit for the first unit relay in the operated link and the application of ground to C1434 results in the completion of the operating circuit for the subgroup relay in the operated link. For example, if the link illustrated is the link involved in the trunk call, the subgroup relay R1100 is energized over a circuit extending from ground on C1434 by way of RA1146, C906, RA935, C907 and the winding of R1100 to battery. With the subgroup relay R1100 and the first unit relay R1110 operated, the calling line is caused to be connected through to the sixth trunk line.

When the sixth trunk line is seized and ground is applied to the control conductor C1426 thereof, the relay R1335 operates to interrupt, at RA1336 and RC1337, the operating circuit for R1145 and to complete, at RA1336 and RC1338, the operating circuit for R1150. When R1145 restores, it recompletes the above-traced operating circuit for the trunk select relay R1120, which relay, upon operating, again opens points in the operating circuits for the first unit relays provided in the respective connector switches. When R1150 operates, it prepares, at its armatures RA1151, RA1152', etc., alternative circuits for energizing the subgroup relays respectively provided in the connector switches and, at RA1152, it completes an obvious circuit for energizing the second trunk select relay R1125. When R1125 operates, it prepares, at its armatures RA1126, RA1127, RA1128, RA1129, etc., the operating circuits for the second unit relays provided in the respective connector switches. With the apparatus in this condition and when a seventh trunk call is initiated, the second connector unit relay and the connector subgroup relay of the seized link will operate to cause the call to be routed by way of the seventh trunk line.

The method of selecting the eighth, ninth, and tenth trunk lines when all of the preceding lines of the group are busy is substantially similar to the operation as described above. Thus, when the seventh trunk line is seized, R1340 operates to cause the restoration of R1150 and the operation of R1155. When R1150 restores, it opens, at RA1152, the operating circuit for R1125, permitting the last-named relay to restore. When R1125 restores, it opens, at its associated armatures, points in the operating circuits for the respective second unit relays provided in the various links. On the other hand, when R1155 operates, it completes, at RA1157, an obvious operating circuit for energizing R1130 and, when R1130 operates, it prepares, at its operated armatures, points in the respective operating circuits for the third unit relays individually provided in the various connector switches. Again, when the eighth trunk line becomes busy, R1155 is caused to restore and R1160 is caused to operate. When R1155 restores, it opens the operating circuit for R1130 and, when R1160 operates, it completes the operating circuit for R1135. With R1130 restored, the operating circuits for the respective third unit relays are interrupted, and with R1135 operated the operating circuits for the respective fourth unit relays are prepared. In any case, where any one of the five trunk select relays R1145, R1150, R1155, R1160 and R1165 is operated, circuits are prepared for energizing the respective subgroup relays individually provided in the various connector switches.

The arrangement of the trunk selecting apparatus is such that, if a number of the trunks are busy and one of the trunks becomes idle, the trunk selecting apparatus operates to assign this one trunk for use in the next succeeding trunk call. For example, if the first five trunk lines are busy, such that the five relays R1310, R1315, R1320, R1325 and R1330 are operated, the trunk selecting apparatus is conditioned to cause the next trunk call to be routed by way of the sixth trunk. If, for example, the third trunk line becomes idle when this condition prevails, it will be substituted for the sixth trunk as the one to be used in the said next trunk call. Thus, when ground is removed from the control conductor of the third trunk line, the relay R1320 restores to open, at RA1321 and RC1323, the circuit over which the sixth trunk select relay R1145 is being held energized and to complete, at RA1321 and RC1322, the operating circuit for R1130. When R1145 restores, it recompletes, at RA1147, the above-traced circuit for R1120 and opens, at its armatures RA1146, RA1147', etc., the prepared operating circuit for the respective subgroup relays. When R1130 operates, it reprepares, at its armatures RA1131, RA1132, etc., the respective operating circuits for the various third unit relays. Again, if it be assumed that the sixth trunk line becomes idle, when the first eight trunk lines are busy, the relay R1335 will restore to open, at RA1336 and RC1338, the circuit over which R1155 is being held energized and to complete, at RA1336 and RC1337, the operating circuit for R1145. When R1155 restores, it opens, at RA1157, the operating circuit for the third trunk select relay R1130, permitting the last-named relay to restore and, when R1145 operates, it interrupts, at RA1147, the operating circuit for R1120 and prepares, at RA1146, RA1147', etc., circuits for energizing the respective subgroup relays individually provided in the several links. When R1130 restores, it opens, at RA1131, RA1132, etc., the prepared operating circuits for the respective third unit relays and, when R1120 restores, it reprepares, at RA1121, RA1122, etc., the operating circuits for the respective first unit relays.

In the event a sufficient number of links are provided in the exchange simultaneously to handle more than ten calls, and a trunk call is initiated when all ten of the available trunk lines are busy, busy tone will be returned to the calling subscriber and none of the ten busy trunks will be switched through to the calling line. When an all-trunks-busy condition exists, the two relays R1140 and R1165 will be in their respective operated positions so that circuits are prepared for energizing the respective subgroup relays provided in the connector switches of the various links and also for energizing the respective fifth unit relays provided in the connector switches of the various links. If it be assumed, for example, that a trunk call is initiated at the substation A, when an all-trunks-busy condition exists, and that the link illustrated is assigned to the use of the calling line, when the trunk select digit of ten impulses is dialed at the calling substation, the counting relays respond in the manner described above so that, at the end of the digit, the tenth counting relay R1070a is locked energized in series with R1020. When R960 restores, shortly following the conclusion of the digit, and R1400 operates, ground is applied to the two conductors C1433 and C1434 in the manner described previously and, since the two relays R1140 and R1165 are operated, circuits are completed for energizing the subgroup relay R1100 and the fifth unit relay R1300. When the two relays R1100 and R1300, operate, a circuit is completed for energizing the busy relay R870, this circuit extending from ground as applied to the control conductor C1435 of the tenth trunk line in the repeater associated with this line, by way of RC1412, RC1411, C1436, RA1306, C1371, RA1103 and its associated lower contact C905, RA951, RC952, C848 and the upper winding of R870 to battery. When R1100 operates, it also completes, at RA1104, its holding circuit as traced above. The unit relay R1300, upon operating, completes, at RA1308, a path extending by way of C909 for short-circuiting the winding of R950. In this connection it will be recalled that, when the group relay R1400 operates, it completes a path for short-circuiting the winding of R930. At RA1307, the unit relay R1300 completes the above-traced circuit extending by way of C908 for energizing R920. The resulting operation of R920 causes the operated relays R1020 and R1070a to restore in the manner described previously. When these two last-named relays restore, the relays R930 and R950 are energized in series with the group and unit relays R1400 and R1300, respectively.

The busy relay R870 operates before the operation of R950 and completes, at RA872, its holding circuit, as traced previously. At RA876', the busy relay opens a point in the above-traced circuit for energizing the switching through relay R700, thereby to prevent this relay from being energized upon the subsequent operation of R950. At RA871, the relay R870 prepares a path for conducting busy tone current by way of the loop extending to the calling subscriber's substation, this path being completed upon the subsequent operation of R930 and extending from one side of the busy tone source, not shown, by way of C847, RA942, C829, RA871, C828, RC933, RA931, C809, the condenser 839, C789, RA751, the negative side of the loop extending to the calling substation, the receiver at the calling substation, the positive side of the loop extending to the calling substation, C779, RA861, and C778 to the grounded terminal of the busy tone source at RA761. Following the operation of the two relays R930 and R950, no further operations occur in the link until the partially established connection is cleared out at the calling substation. The mode of releasing the link when the calling subscriber hangs up is identical with that described above.

Although in the arrangement illustrated only one group of ten trunk lines is provided, it will be understood that additional groups of trunks may be provided if required. For example, the respective ninth finder and connector group relays, not shown, may be used to terminate two-way trunks forming a second ten-line trunk group, this second trunk group having associated therewith trunk preselecting apparatus identical in arrangement with that shown in Figs. 11 and 13. In this case the two conductors C151 and C152 extending to the contact springs of the ninth counting relay would be utilized in the same manner as the respective corresponding conductors C1431 and C1432, in the operation of the connector switch illustrated to select a trunk in the ninth group. From the preceding description it will be understood that if the ninth connector group relays were used to terminate a group of trunks, an idle trunk in this group would be selected by dialing the single digit nine at a calling substation.

If desired, any of the connector group relays may be used to terminate a group of lines consisting partially of trunk lines and partially of subscribers' lines. For example, the lines terminating at the connector group relay R1400 may comprise four subscribers' lines identified by the unit numbers ranging from one to four and six trunk lines identified by the unit numbers ranging from five to zero. This would necessitate a slight modification of the trunk preselecting apparatus, such modification being designed to confine this apparatus to the trunk lines of the six-line group. Assuming this modification is made, the mode of operation of the connector switch to seize a preselected idle one of the six trunks is in all respects identical with that set forth above. To select a desired one of the four subscribers' lines, a calling subscriber must necessarily dial the regular four digit directory number of the desired substation on the called line. At the end of the first digit the link circuit control apparatus operates to cause the energization of R940 in series with one of the three relays R880, R900 and R910 in the manner described above. When R940 operates it opens, at RA949, a point in the circuits, traced above, for energizing the connector subgroup and unit relays by way of the circuits controlled by the trunk preselecting relays, thus insuring the operation of the correct unit relay which is operative to select the desired called line. At the end of the second or line group select digit the relay R1400 is energized over a circuit slightly different from that utilized on a trunk call and traced above. Thus, with R1070a and R1020 operated at the end of the second digit and when R960 restores, a circuit is completed for energizing R1400 which extends from ground at RA767 by way of C795, C111, RA1025, C101, RA961, RA938, RA947 and its associated upper contact, RA963, C108, RA1074', C1432 and the winding of R1400 to battery. Following the operation of R1400, the operation of the connector switch to perform the remaining functions required to set up and release a connection to the desired called substation is identical with that described previously.

*Time controlled link release*

If, for any reason, one of the finder-connector links is assigned to the use of a calling line or a line having a calling condition created thereon by a short circuit, or the like, and a connection is not established to another line by way of the seized link within a predetermined time interval, the timing apparatus 790 functions to cause the link to be released for further use and the calling line to be locked out of service until the calling condition is removed therefrom. Thus, considering again the operation of the link illustrated to establish a connection between the substations A and C on a call initiated at the substation A, when the finder switch operates to switch the calling line through to the connector portion of the link, the relay R760 is energized and, upon operating, applies, at RA769', ground to the timing apparatus start conductor C719, thereby to initiate the operation of this apparatus provided it is not already operating. At RA769, the relay R760 prepares a circuit for energizing the link release relay R730 when ground is applied to the first pulse lead C718 by the timing apparatus 790. With the apparatus in this condition and if a connection is ultimately established to a desired subscriber's substation or a trunk line, the operating circuit for R730 is interrupted to render the timing apparatus 790 ineffective to cause the link to be released. Thus, when the relay R775 operates in response to the completion of a talking connection to a called subscriber's substation, it opens, at RA778', a point in the operating circuit for R730. If the call is a trunk call, the relay R700 operates in response to the seizure of an idle trunk and, upon operating, opens, at RA707, a point in the operating circuit for R730. If, however, the desired connection is not obtained and the calling condition created on the line is not terminated, the link release relay R730 will be energized when ground is applied to C718, the energizing circuit for this relay extending by way of RC738, RA737, RA778', RA769, RA707 and the winding of R730 to battery. Upon operating, the relay R730 completes a holding circuit for itself, this circuit extending from ground, at RA736, by way of RA737, RA778', RA769, RA707 and the winding of R730 to battery. At RA733 and RA734, ground as applied to C717 by the timing apparatus is impressed on the hold conductor C475 for the purpose of maintaining the operated relays of the finder switch energized, and ground as derived from RC735 is disconnected from the conductor C475. If, with R730 operated, the desired connection is established, the holding circuit for this relay is interrupted at RA778' or RA707, depending upon whether the call is to another subscriber's line or to a trunk line. When R730 restores, it reconnects RA734 to RC735 so that the operated relays of the finder switch are held energized over a circuit extending from ground at the last-named contact rather than from the conductor C717. If, on the other hand, the desired connection is not obtained and the calling condition is maintained on the subscriber's line, the timing apparatus, after a predetermined time interval, removes ground potential from C717, thereby to interrupt the circuits over which the operated relays in the finder switch are being held energized. When the group and unit relays provided in this switch restore, ground is removed from the control conductor C364 of the line, and the loop circuit by way of which the two relays R710 and R715 are held energized is interrupted. When the relay R710 restores, it initiates the release of the link in the manner described in detail in a previous portion of the specification. During the release of the link, the holding circuit for the link release relay R730 is interrupted when R760 restores. When ground is removed from the control conductor C306 of the calling line 11, the cut-off relay R310 restores to reconnect the windings of the line relay R300 across the talking conductors of the line, causing this line relay to reoperate. When R300 operates, it completes, at RA302, the previously-traced holding circuit for R320. With R300 and R320 operated, the start circuits extending to the common equipment are held open at the operated armatures RA321 and RA322 of the lockout relay and ground is maintained on the control conductor C306, to prevent the calling line from being seized by one of the connector switches. The line circuit is restored to normal only when the calling condition is removed from the line, at which time the relays R300 and R320 are caused sequentially to restore in the order named and in the manner pointed out with particularity above.

While there has been described what is at present considered to be the preferred embodiment of the invention, it will be understood that various modifications may be made therein, and it is contemplated to cover in the appended claims all such modifications as fall within the true spirit and scope of the invention.

I claim:

1. In a telephone system, a group of lines, a switch having access to said lines and operative to select a line therefrom, a group of unit relays and a subgroup relay in said switch, each of said unit relays being operative to select either of two lines of said group depending upon the operated or non-operated condition of said subgroup relay, means for causing the operation of said subgroup relay during the operation of said switch to select one of said group of lines, and means comprising said subgroup relay for causing the operation of the unit relay which is operative to select said one line.

2. In a telephone system, a group of lines, said lines being divided into two subgroups, a switch having access to said lines and operative to select a line therefrom, a group of unit relays and a subgroup relay in said switch, each of said unit relays being operative to select either of two lines of said group depending upon the operated or non-operated condition of said subgroup relay, means for causing the operation of said subgroup relay during the operation of said switch to select one of said group of lines only in the event said one line is included in one of said subgroups, means operative in case said one line is in said one subgroup and including said subgroup relay for causing the operation of the one unit relay which is operative to select said one line, and means independent of said subgroup relay for causing the operation of said one unit relay without causing the operation of said subgroup relay in case said one line is in the other of said subgroups.

3. In a telephone system, a group of lines, said lines being divided into two subgroups, the lines in each subgroup being consecutively numbered, a switch having access to the lines of said group and operative to select a line therefrom, a group of unit relays and a subgroup relay in said switch, each of said unit relays being operative to select either of two lines of said group depending upon the operated or non-operated condition of said subgroup relay, the two lines corresponding to each unit relay being included in different ones of said two subgroups, a group of auxiliary relays individually corresponding to said unit relays, means operative during the operation of said switch to select one of said lines for causing the operation of the one of said auxiliary relays which corresponds to said one line, means responsive to the operation of said one auxiliary relay for causing the operation of said subgroup relay, and means comprising said subgroup relay for causing the operation of the unit relay which is operative to select said one line.

4. In a telephone system, a group of lines, said lines being divided into two subgroups, the lines in each subgroup being consecutively numbered, a switch having access to the lines of said group and operative to select a line therefrom, a group of unit relays and a subgroup relay in said switch, each of said unit relays being operative to select either of two lines of said group depending upon the operated or non-operated condition of said subgroup relay, the two lines corresponding to each unit relay being included in different ones of said two subgroups, a group of auxiliary relays individually corresponding to said unit relays, means operative during the operation of said switch to select one of said lines for causing the operation of the one of said auxiliary relays which corresponds to said one line, means responsive to the operation of said one auxiliary relay for causing the operation of said subgroup relay only in the event said one line is included in one of said subgroups, means operative in case said one line is included in said one subgroup and including said subgroup relay for causing the operation of the one unit relay which is operative to select said one line, and means independent of said subgroup relay for causing the operation of said one unit relay without causing the operation of said subgroup relay in the event said one line is in the other of said subgroups.

5. In a telephone system, a group of lines, a switch having access to said lines and operative to select a line therefrom, a group of unit relays and a subgroup relay in said switch, each of said unit relays being operative to select either of two lines of said group depending upon the operated or non-operated condition of said subgroup relay, an operating circuit for each of said unit relays, means for causing the operation of said subgroup relay during the operation of said switch to select one of said lines and for preparing the operating circuit for the particular unit relay which is operative to select said one line, and means controlled by said subgroup relay for completing said prepared operating circuit.

6. In a telephone system, a group of lines, said lines being divided into two subgroups, a switch having access to said lines and operative to select a line therefrom, a group of unit relays and a subgroup relay in said switch, each of said unit relays being operative to select either of two lines of said group depending upon the operated or non-operated condition of said subgroup relay, a pair of operating circuits for each of said unit relays, means for causing the operation of said subgroup relay during the operation of said switch to select one of said lines only in the event said one line is included in one of said subgroups, said last-named means being operative to prepare one of the operating circuits for the one unit relay which is operative to select said one line, said subgroup relay being operative to complete said prepared operating circuit following the operation of said last-named means, and means independent of said subgroup relay for completing the other operating circuit for said one unit relay in the event said one line is in the other of said subgroups.

7. In a telephone system, a group of lines, a switch having access to said lines and operative to select a line therefrom, a group of unit relays and a subgroup relay in said switch, each of said unit relays being operative to select either of two lines of said group depending upon the operated or non-operated condition of said subgroup relay, an operating circuit for each of said unit relays, a group of auxiliary relays individually corresponding to said unit relays, means operative during the operation of said switch to select one of said lines for causing the operation of the one of said auxiliary relays which corresponds to the one of said lines to be selected, means responsive to the operation of said one auxiliary relay for causing the operation of said subgroup relay and for preparing the operating circuit for the one unit relay which is operative to select said one line, and means controlled by said subgroup unit relay for completing said prepared circuit.

8. In a telephone system, a group of lines, said lines being divided into two subgroups, a switch having access to said lines and operative to select a line therefrom, a group of unit relays and a subgroup relay in said switch, each of said unit relays being operative to select either of two lines of said group depending upon the operated or non-operated condition of said subgroup relay, a pair of operating circuits for each of said unit relays, a group of auxiliary relays individually corresponding to said unit relays, means operative during the operation of said switch to select one of said lines for causing the operation of the one of said auxiliary relays which corresponds to the one of said lines to be selected, means responsive to the operation of said one auxiliary relay for causing the operation of said subgroup relay only in the event said one line is included in one of said subgroups, said last-named means being operative to prepare one of the operating circuits for the one unit relay which is operative to select said one line, said subgroup relay being operative to complete said prepared operating circuit following the operation of said last-named means, and means controlled by said one auxiliary relay for completing the other operating circuit for said one unit relay in the event said one line is in the other of said subgroups.

9. In a telephone system, a group of lines, said lines being divided into two subgroups and the lines in each subgroup being consecutively numbered, a switch having access to said lines and operative to select a line therefrom, a group of unit relays and a subgroup relay in said switch, each of said unit relays being operative to select either of two lines in said group of lines depending upon the operated or non-operated condition of said subgroup relay, the two lines corresponding to each unit relay being included in different ones of said two subgroups, an operating circuit for each of said unit relays, a group of auxiliary relays individually corresponding to said unit relays, means operative during the operation of said switch to select one of said lines for causing the operation of the one of said auxiliary relays which corresponds to the one of said lines to be selected, means responsive to the operation of said one auxiliary relay for causing the operation of said subgroup relay and for preparing the operating circuit for the one unit relay which is operative to select said one line, and contacts controlled by said subgroup relay for completing said prepared circuit.

10. In a telephone system, a group of lines, said lines being divided into two subgroups and the lines in each subgroup being consecutively numbered, a switch having access to said lines and operative to select a line therefrom, a group of unit relays and a subgroup relay in said switch, each of said unit relays being operative to select either of two lines in said group of lines depending upon the operated or non-operated condition of said subgroup relay, the two lines corresponding to each unit relay being included in different ones of said two subgroups, a pair of operating circuits for each of said unit relays, a group of auxiliary relays individually corresponding to said unit relays, means operative during the operation of said switch to select one of said lines for causing the operation of the one of said auxiliary relays which corresponds to the one of said lines to be selected, means responsive to the operation of said one auxiliary relay for causing the operation of said subgroup relay only in the event said one line is included in one of said subgroups, said last-named means being operative to prepare one of the operating circuits for the one unit relay which is operative to select said one line, said subgroup relay being operative to complete said prepared operating circuit following the operation of said last-named means, and contacts controlled by said one auxiliary relay for completing the other operating circuit for said one unit relay in the event said one line is in the other of said subgroups.

11. In a telephone system, a group of lines, said lines being divided into two subgroups, a switch having access to said lines and operative to select a line therefrom, a group of unit relays and a subgroup relay in said switch, each of said unit relays being operative to select either of two lines of said group depending upon the operated or non-operated condition of said subgroup relay, a pair of operating circuits for each of said unit relays, a plurality of auxiliary relays individually corresponding to said unit relays, means operative during the operation of said switch to select one of said lines and including one of said auxiliary relays for completing one of the operating circuits for the one unit relay which is operative to select said one line, said last-named means only being operative in the event said one line is included in one of said subgroups, and means including said one auxiliary relay for causing the operation of said subgroup relay and for completing the other operating circuit for said one unit relay, said last-named means only being operative in the event said one line is included in the other of said subgroups.

12. In a telephone system, a group of lines, said lines being divided into two subgroups, a switch having access to said lines and operative to select a line therefrom, a group of unit relays and a subgroup relay in said switch, each of said unit relays being operative to select either of two lines of said group depending upon the operated or non-operated condition of said subgroup relay, a pair of operating circuits for each of said unit relays, a plurality of auxiliary relays individually corresponding to said unit relays, means operative during the operation of said switch to select one of said lines and including one of said auxiliary relays for completing one of the operating circuits for the one unit relay which is operative to select said one line, said last-named means only being operative in the event said one line is included in one of said subgroups, a relay operative to open a point in said one operating circuit in the event said one line is included in the other of said subgroups, means including said last-named relay for causing the operation of said subgroup relay in the event said one line is included in the other of said subgroups, and means controlled by said subgroup relay for completing the other operating circuit for said one unit relay.

13. In a telephone system, a group of lines, a finder switch having access to said lines, a group of unit relays and a subgroup relay in said switch, each of said unit relays being operative to select either of two lines of said group depending upon the operated or non-operated condition of said subgroup relay, means responsive to the creation of a calling condition on one of said lines for causing the operation of said subgroup relay, and means controlled by said subgroup relay for causing the operation of the one unit relay which is operative to select said one line.

14. In a telephone system, a group of lines, said lines being divided into two subgroups, a finder switch having access to said lines, a group of unit relays and a subgroup relay in said switch, each of said unit relays being operative to select either of two lines of said group depending upon the operated or non-operated condition of said subgroup relay, means responsive to the creation of a calling condition on one of said lines for causing the operation of said subgroup relay only in the event said one line is included in one of said subgroups, means operative in the event said one line is included in said one subgroup and controlled by said subgroup relay for causing the operation of the one unit relay which is operative to select said one line, and means independent of said subgroup relay and responsive to the creation of a calling condition on said one line for causing the operation of said one unit relay without causing the operation of said subgroup relay in the event said one line is included in the other of said subgroups.

15. In a telephone system, a group of lines, a finder switch having access to said lines, a group of unit relays and a subgroup relay in said switch, each of said unit relays being operative to select either of two lines of said subgroup depending upon the operated or non-operated condition of said subgroup relay, a group of auxiliary relays individually corresponding to said unit relays, means responsive to the creation of a calling condition on one of said lines for causing the operation of the one of said auxiliary relays which corresponds to said one line, means responsive to the operation of said one auxiliary relay for causing the operation of said subgroup relay, and means controlled by said subgroup relay for causing the operation of the one unit relay which is operative to select said one line.

16. In a telephone system, a group of lines, said lines being divided into subgroups, a finder switch having access to said lines, a group of unit relays and a subgroup relay in said switch, each of said unit relays being operative to select either of two lines of said group depending upon the operated or non-operated condition of said subgroup relay, a group of auxiliary relays individually corresponding to said unit relays, means responsive to the creation of a calling condition on one of said lines for causing the operation of the one of said auxiliary relays which corresponds to said one line, means responsive to the operation of said one auxiliary relay for causing the operation of said subgroup relay, said last-named means only being operative in the event said one line is included in one of said subgroups, means controlled by said subgroup relay for causing the operation of the one unit relay which is operative to select said one line, and means responsive to the operation of said one auxiliary relay for causing the operation of said one unit relay without causing the operation of said subgroup relay in the event said one line is included in the other of said subgroups.

17. In a telephone system, a group of lines, a finder switch having access to said lines, a group of unit relays and a subgroup relay in said switch, each of said unit relays being operative to select either of two lines of said group depending upon the operated or non-operated condition of said subgroup relay, an operating circuit for each of said unit relays, means responsive to the creation of a calling condition on one of said lines for causing the operation of said subgroup relay and for preparing the operating circuit for the unit relay which is operative to select said one line, and means controlled by said subgroup relay for completing said prepared operating circuit.

18. In a telephone system, a group of lines, said lines being divided into subgroups, a finder switch having access to said lines, a group of unit relays and a subgroup relay in said switch, each of said unit relays being operative to select either of two lines of said group depending upon the operated or non-operated condition of said subgroup relay, a pair of operating circuits for each of said unit relays, means responsive to the creation of a calling condition on one of said lines for causing the operation of said subgroup relay and for preparing one of the operating circuits for the one unit relay which is operative to select said one line, said last-named means only being operative in the event said one line is included in one of said subgroups, means controlled by said subgroup relay for completing said one operating circuit, and means responsive to the creation of a calling condition on said one line for completing the other operating circuit for said one unit relay without causing the operation of said subgroup relay, said last-named means only being operative in the event said one line is included in the other of said subgroups.

19. In a telephone system, a group of lines, said lines being divided into two subgroups and the lines in each subgroup being identified by consecutive unit numbers, a finder switch having access to said lines, a group of unit relays and a subgroup relay included in said switch, each of said unit relays being operative to select either of two lines of said group depending upon the operated or non-operated condition of said subgroup relay, the two lines corresponding to each unit relay being included in different ones of said two subgroups, a group of auxiliary relays individually corresponding to said unit relays, means responsive to the creation of a calling condition on one of said lines for causing the operation of one of said auxiliary relays, means responsive to the operation of said one auxiliary relay for causing the operation of said subgroup relay and the one of said unit relays which is operative to select said one line in the event said one line is in one of said sub-groups, said last-named means also being operative to cause the operation of said one unit relay without causing the operation of said subgroup relay in the event said one line is included in the other of said subgroups.

20. In a telephone system, a plurality of lines, a group of finder switches having access to said lines, a group of allotter relays individually corresponding to said switches and arranged to operate to a position for assigning idle ones of said switches to the use of lines having a calling condition created thereon, and means independent of said allotter relays for preventing two of said relays from being held in a switch assigning position at the same time for a prolonged time interval.

21. In a telephone system, a plurality of lines, a group of finder switches having access to said lines, a group of allotter relays individually corresponding to said switches, locking circuits individually provided for said relays, said relays being arranged to assign idle ones of said switches to the use of lines having a calling condition created thereon when their respective locking circuits are completed, and means independent of said allotter relays for preventing two of said locking circuits from being held completed at the same time for a prolonged time interval.

22. In a telephone system, a plurality of lines, a group of finder switches having access to said lines, a group of allotter relays individually corresponding to said switches, said relays being connected and arranged sequentially to operate to select idle ones of said switches and said locking circuits being so arranged that the locking circuit for each relay is opened in response to the operation of the next succeeding relay, and means for preventing two of said locking circuits from being held completed at the same time for a time interval substantially greater than the interval required for one of said relays to operate and the preceding relay to restore.

23. In a telephone system, a plurality of lines, a group of finder switches having access to said lines, a group of allotter relays individually corresponding to said switches, operating circuits individually provided for said relays, said operating circuits being so connected and arranged that they are sequentially completed to cause the sequential operation of said relays to select idle ones of said switches, said locking circuits including a common branch, a pair of additional relays, one of said additional relays having a winding included in said common branch and being operative when two of said locking circuits are held completed for a prolonged time interval, means responsive to the operation of said one additional relay for opening a point in all of said locking circuits, and means including the other of said additional relays for completing the operating circuit for one of said allotter relays following the operation of said one additional relay.

24. In a telephone system, a plurality of lines, a group of finder switches having access to said lines, a group of allotter relays individually corresponding to said switches, said relays being arranged to select idle ones of said switches, means responsive to the creation of a calling condition on one of said lines for conditioning a selected one of said switches to seize said one line, an additional relay conditioned to operate from one position to a second position in response to the operation of said last-named means, said additional relay having an operating characteristic such that the time required for its operation to said second position following the operation of said last-named means exceeds the time normally required for said one finder switch to seize said one line, and means including one of said allotter relays operative in response to the operation of said additional relay to said second position for assigning a second finder switch to the use of said one line.

25. In a telephone system, a plurality of lines, a group of finder switches having access to said lines, a group of allotter relays individually corresponding to said switches, said relays being arranged to select idle ones of said switches, means responsive to the creation of a calling condition on one of said lines for conditioning a selected one of said switches to seize said one line, an additional relay conditioned to operate from one position to a second position in response to the operation of said last-named means, said additional relay having an operating characteristic such that the time required for its operation to said second position following the operation of said last-named means exceeds the time normally required for said one finder switch to seize said one line, means including one of said allotter relays operative in response to the operation of said additional relay to said second position for assigning a second finder switch to the use of said one line, and means responsive to the operation of said one switch to seize said one line for preventing said additional relay from operating to its second position.

26. In a telephone system, a plurality of lines, a group of finder switches having access to said lines, a group of allotter relays individually corresponding to said switches, said relays being arranged to select idle ones of said switches, means responsive to the creation of a calling condition on one of said lines for conditioning a selected one of said switches to seize said one line, an additional relay conditioned to operate from one position to a second position in response to the operation of said last-named means, said additional relay having an operating characteristic such that the time required for its operation to said second position following the operation of said last-named means exceeds the time normally required for said one finder switch to seize said one line, said allotter relays being so connected and arranged that they are capable of sequentially operating in response to the operation of said additional relay to its second position and independently of the idle or busy condition of their respective associated switches, means including one of said allotter relays operative in response to the operation of said additional relay for assigning a second finder switch to the use of said one line, and means for preventing the allotter relays other than said one relay from operating in response to the operation of said additional relay to its second position.

27. In a telephone system, a plurality of lines, a group of finder switches having access to said lines, a group of allotter relays individually corresponding to said switches, said relays being arranged to select idle ones of said switches, means responsive to the creation of a calling condition on one of said lines for conditioning a selected one of said switches to seize said one line, an additional relay conditioned to operate from one position to a second position in response to the operation of said last-named means, said additional relay having an operating characteristic such that the time required for its operation to said second position following the operation of said last-named means exceeds the time normally required for said one finder switch to seize said one line, said allotter relays being so connected and arranged that they are capable of sequentially operating in response to the operation of said additional relay to its second position and independently of the idle or busy condition of their respective associated switches, means including one of said allotter relays operative in response to the operation of said additional relay for assigning a second finder switch to the use of said one line, means for preventing the allotter relays other than said one relay from operating in response to the operation of said additional relay to its second position, and means responsive to the operation of said one switch to seize said one line for preventing said additional relay from operating to its second position.

28. In a telephone system, a plurality of lines, a group of finder switches having access to said lines, a group of allotter relays individually corresponding to said switches, said relays being arranged to select idle ones of said switches, means responsive to the creation of a calling condition on one of said lines for conditioning a selected one of said switches to seize said one line, an additional relay, a normally closed circuit for energizing said additional relay, said circuit being interrupted in response to the operation of said last-named means, said additional relay having a slow-to-release characteristic such that the time interval required for the restoration thereof exceeds the time normally required for said one finder switch to seize said one line, and means including one of said allotter relays operative in response to the restoration of said additional relay for assigning a second finder switch to the use of said one line.

29. In a telephone system, a plurality of lines, a group of finder switches having access to said lines, a group of allotter relays individually corresponding to said switches, said relays being arranged to select idle ones of said switches, means responsive to the creation of a calling condition on one of said lines for conditioning a selected one of said switches to seize said one line, an additional relay, a normally closed circuit for energizing said relay, said circuit being interrupted in response to the operation of said last-named means, said additional relay having a slow-to-release characteristic such that the time interval required for the restoration thereof exceeds the time normally required for said one finder switch to seize said one line, means including one of said allotter relays operative in response to the restoration of said additional relay for assigning a second finder switch to the use of said one line, and means responsive to the operation of said one finder switch to seize said one line for recompleting said circuit, thereby to prevent the restoration of said additional relay.

30. In a telephone system, an exchange, a line extending to said exchange and including at least one talking conductor, a control conductor associated with said line, a line circuit associated with said line and including line and cut-off relays, said line relay being operative immediately a calling condition is created on said line, means responsive to the operation of said line relay for applying a line busying potential to said control conductor, said cut-off relay being operative in response to the application of a predetermined potential to one talking conductor of said line, and means responsive to the operation of said cut-off relay for causing the restoration of said line relay.

31. In a telephone system, an exchange, a line extending to said exchange and including at least one talking conductor, a control conductor associated with said line, a line circuit associated with said line and including line and cut-off relays, said line relay being operative immediately a calling condition is created on said line, means responsive to the operation of said line relay for applying a line busying potential to said control conductor, said cut-off relay being operative in response to the application of a predetermined potential to one talking conductor of said line, means responsive to the operation of said cut-off relay for causing the restoration of said line relay, and a locking circuit for said cut-off relay, said locking circuit including said control conductor and being arranged to be completed in response to the operation of said cut-off relay.

32. In a telephone system, an exchange, a line extending to said exchange and including at least one talking conductor, a control conductor associated with said line, a line circuit associated with said line and including line and cut-off relays, said line relay being operative immediately a calling condition is created on said line, means responsive to the operation of said line relay for applying a line busying potential to said control conductor, said cut-off relay being operative in response to the application of a predetermined potential to one talking conductor of said line, means responsive to the operation of said cut-off relay for causing the restoration of said line relay, a finder-selector link including a finder switch arranged to operate to seize said line when said calling condition is created thereon, said link including a link line conductor adapted to be connected to said one talking conductor by said finder switch, and means included in said link and responsive to the seizure of said line for applying said predetermined potential to said link line conductor.

33. In a telephone system, an exchange, a line extending to said exchange and including at least one talking conductor, a control conductor associated with said line, a line circuit associated with said line and including line and cut-off relays, said line relay being operative immediately a calling condition is created on said line, means responsive to the operation of said line relay for applying a line busying potential to said control conductor, said cut-off relay being operative in response to the application of a predetermined potential to one talking conductor of said line, means responsive to the operation of said cut-off relay for causing the restoration of said line relay, a finder-selector link including a finder switch arranged to operate to seize said line when said calling condition is created thereon, said link including a link line conductor adapted to be connected to said one talking conductor by said finder switch, means included in said link and responsive to the seizure of said line for applying said predetermined potential to said link line conductor, a locking circuit for said cut-off relay, means included in said link for preparing said circuit, and means responsive to the operation of said cut-off relay for completing said circuit.

34. In a telephone system, a pair of lines each including a talking conductor, a control conductor associated with each of said lines, a cut-off relay associated with one of said lines and arranged to be energized by way of a circuit including one talking conductor of the associated line, a cut-off relay associated with the other of said lines and arranged to be energized by way of a circuit including the control conductor of the associated line, an automatic switch having access to each of said lines, and means included in said switch and operative in response to the seizure of either of said lines by said switch for completing said first-named circuit in the event said one line is responsible for the seizure of said switch and for completing said second-named circuit in the event said other line is responsible for the seizure of said switch.

35. In a telephone system, an exchange, a pair of lines extending to said exchange and each including at least one talking conductor, control conductors individually associated with said lines, cut-off relays individually associated with said lines, one of said cut-off relays being arranged to operate in response to the application of a predetermined potential to the control conductor of the associated line, the other of said cut-off relays being arranged to operate in response to the application of a predetermined potential to one talking conductor of its associated line, a finder-selector link including a finder switch having access to each of said lines, said link including a link line conductor adapted to be connected to said one talking conductor and a control conductor adapted to be connected to the control conductor associated with either of said lines, and means included in said link and responsive to the seizure of either of said lines by said link for applying said first-named predetermined potential to said link control conductor and said second-named predetermined potential to said link line conductor, whereby either of said cut-off relays is caused to operate when the associated line is seized by said link.

36. In a telephone system, an exchange, a pair of lines extending to said exchange and each including at least one talking conductor, control conductors individually associated with said lines, cut-off relays individually associated with said lines, one of said cut-off relays being arranged to operate in response to the application of a predetermined potential to the control conductor of the associated line, the other of said cut-off relays being arranged to operate in response to the application of a predetermined potential to one talking conductor of its associated line, a finder-selector link including a finder switch having access to each of said lines, said link including a link line conductor adapted to be connected to said one talking conductor and a control conductor adapted to be connected to the control conductor associated with either of said lines, line relays individually associated with said lines and each operative to initiate the operation of said link to seize the associated line, the line relay associated with said other cut-off relay also being operative to apply a line busying potential to the control conductor of its associated line, means included in said link and responsive to the seizure of either of said lines by said link for applying said first-named predetermined potential to said link control conductor and said second-named predetermined potential to said link line conductor, whereby either of said cut-off relays is caused to operate when the associated line is seized by said link, and means individually responsive to the operation of said cut-off relays for causing the restoration of their respective associated line relays.

37. In a telephone system, a plurality of subscribers' lines of the multi-party type, apparatus for providing ringing current of a plurality of different codes, an automatic switch having access to said lines and operative to select a desired line from said plurality of lines, said switch including means operative in response to the impulses of each of a plurality of series of impulses transmitted to said switch, means operative in response to the operation of said first-named means during one series of impulses transmitted to said switch for registering the operation of said switch, and means also operative in response to the operation of said first-named means during said one series of impulses for at least partially selecting the code of the ringing current to be projected over a selected one of said lines.

38. In a telephone system, a plurality of subscribers' lines of the multi-party type, certain of said lines being arranged for one type of selective ringing and others of said lines being arranged for a different type of selective ringing, an automatic switch having access to said lines and operative to select a desired line from said plurality of lines, said switch including means operative in response to the impulses of each of a plurality of series of impulses transmitted to said switch, means operative in response to the operation of said first-named means during one series of impulses transmitted to said switch for registering the operation of said switch, and means also operative in response to the operation of said first-named means during said one series of impulses for determining the type of selective ringing to be utilized in ringing over a selected one of said lines.

39. In a telephone system, a plurality of subscribers' lines of the multi-party type, certain of said lines being arranged for bridged ringing and others of said lines being arranged for divided ringing, an automatic switch having access to said lines and operative to select a desired line from said plurality of lines, said switch including means operative in response to the impulses of each of a plurality of series of impulses transmitted to said switch, means operative in response to the operation of said first-named means during one series of impulses transmitted to said switch for registering the operation of said switch, and means also operative in response to the operation of said first-named means during said one series of impulses for determining whether bridged or divided ringing will subsequently be utilized in ringing over a selected one of said lines.

40. In a telephone system, a plurality of subscribers' lines of the multi-party type, certain of said lines being arranged for bridged ringing and others of said lines being arranged for divided ringing, apparatus for providing ringing current of a plurality of different codes, an automatic switch having access to said lines and operative to select a desired line from said plurality of lines, said switch including means operative in response to the impulses of each of a plurality of series of impulses transmitted to said switch, means operative in response to the operation of said first-named means during one series of impulses transmitted to said switch for registering the operation of said switch, means operative in response to the operation of said first-named means during said one series of impulses for determining whether bridged or divided ringing will subsequently be utilized in ringing over a selected one of said lines, and means also operative in response to the operation of said first-named means during said one series of impulses for partially selecting the code of the ringing current to be projected over the selected line.

41. In a telephone system, a plurality of subscribers' lines of the multi-party type, certain of said lines being arranged for bridged ringing and others of said lines being arranged for divided ringing, apparatus for providing ringing current of a plurality of different codes, an automatic switch having access to said lines and operative to select a desired line from said plurality of lines, said switch including means operative in response to the impulses of each of a plurality of series of impulses transmitted to said switch, means operative in response to the operation of said first-named means during one series of impulses transmitted to said switch for registering the operation of said switch, means operative in response to the operation of said first-named means during said one series of impulses for determining whether bridged or divided ringing will subsequently be utilized in ringing over a selected one of said lines, means operative in response to the operation of said first-named means during said one series of impulses for partially selecting the code of the ringing current to be projected over the selected line, and means for preventing the operation of said last-named means in the event divided ringing is selected for ringing over the selected line.

42. In a telephone system, a plurality of subscribers' lines of the multi-party type, certain of said lines being arranged for bridged ringing and others of said lines being arranged for divided ringing, an automatic switch having access to said lines and operative to select a desired line from said plurality of lines, said switch including means operative in response to impulses transmitted to said switch, said impulses being divided into a plurality of digits including at least two line selecting digits, and means operative in response to the operation of said first-named means during the impulses of a digit preceding all line selecting digits for determining whether bridged or divided ringing will be utilized in ringing over a selected one of said lines.

43. In a telephone system, a plurality of subscribers' lines of the multi-party type, certain of said lines being arranged for bridged ringing and others of said lines being arranged for divided ringing, an automatic switch having access to said lines and operative to select a desired line from said plurality of lines, said switch including means operative in response to impulses transmitted to said switch, said impulses being divided into a plurality of digits including at least two line selecting digits, means operative in response to the operation of said first-named means during the impulses of a digit preceding all line selecting digits and only in the event said preceding digit comprises a predetermined number of impulses for selecting bridged ringing as the type of ringing to be utilized in ringing over a selected line, and means operative in response to the operation of said first-named means during the impulses of said preceding digit and only in the event said preceding digit comprises a different predetermined number of impulses for selecting divided ringing as the type of ringing to be utilized in ringing over the selected line.

44. In a telephone system, a plurality of subscribers' lines of the multi-party type, an automatic switch operative to select a desired line from said plurality of lines, apparatus for projecting ringing current of any one of a plurality of different codes over a selected one of said lines, said switch including means operative in response to impulses transmitted to said switch, said impulses being divided into a plurality of digits including at least two line selecting digits, and means operative in response to the operation of said first-named means during the impulses of a digit preceding all line selecting digits for at least partially selecting the code of the ringing current to be projected over a selected line.

45. In a telephone system, a plurality of subscribers' lines of the multi-party type, certain of said lines being arranged for bridged ringing and others of said lines being arranged for divided ringing, an automatic switch operative to select a desired line from said plurality of lines, apparatus for projecting ringing current of any one of a plurality of different codes over a selected one of said lines, said switch including means operative in response to impulses transmitted to said switch, said impulses being divided into a plurality of digits including at least two line selecting digits, means operative in response to the operation of said first-named means during a digit preceding all line selecting digits for determining whether bridged or divided ringing will be utilized in ringing over a selected one of said lines, and means also operative in response to the operation of said first-named means during said preceding digit for at least partially selecting the code of the ringing current to be projected over a selected one of said lines.

46. In a telephone system, a plurality of subscribers' lines of the multi-party type, certain of said lines being arranged for bridged ringing and others of said lines being arranged for divided ringing, an automatic switch operative to select a desired line from said plurality of lines, apparatus for projecting ringing current of any one of a plurality of different codes over a selected one of said lines, said switch including means operative in response to impulses transmitter to said switch, said impulses being divided into a plurality of digits including at least two line selecting digits, means operative in response to the operation of said first-named means during a digit preceding said line selecting digits for determining whether bridged or divided ringing will be utilized in ringing over a selected one of said lines, means also operative in response to the operation of said first-named means during said preceding digit for at least partially selecting the code of the ringing current to be projected over a selected one of said lines, and means for preventing the operation of said last-named means in the event divided ringing is selected for ringing over the selected line.

47. In a telephone system, a plurality of subscribers' lines of the multi-party type, certain of said lines being arranged for bridged ringing and others of said lines being arranged for divided ringing, an automatic switch operative to select a desired line from said plurality of lines, apparatus for projecting ringing current of any one of a plurality of different codes over a selected one of said lines, said switch including means operative in response to impulses transmitted to said switch, said impulses being divided into a plurality of digits including at least two line selecting digits, means operative in response to the operation of said first-named means during the impulses of a digit preceding all line selecting digits and only in the event said preceding digit comprises a predetermined number of impulses for selecting divided ringing as the type of ringing to be utilized in ringing over a selected one of said lines, means operative in response to the operation of said first-named means and only in the event said preceding digit comprises a different predetermined number of impulses for selecting bridged ringing as the type of ringing to be utilized in ringing over the selected line, and means operative in response to the operation of said first-named means during the impulses of said preceding digit for at least partially selecting the code of the ringing current to be projected over the selected line.

48. In a telephone system, a plurality of subscribers' lines of the multi-party type, certain of said lines being arranged for bridged ringing and others of said lines being arranged for divided ringing, an automatic switch operative to select a desired line from said plurality of lines, apparatus for projecting ringing current of any one of a plurality of different codes over a selected one of said lines, said switch including means operative in response to impulses transmitted to said switch, said impulses being divided into a plurality of digits including at least two line selecting digits, means operative in response to the operation of said first-named means during the impulses of a digit preceding all line selecting digits and only in the event said preceding digit comprises a predetermined number of impulses for selecting divided ringing as the type of ringing to be utilized in ringing over a selected one of said lines, means operative in response to the operation of said first-named means and only in the event said preceding digit comprises a number of impulses greater than said predetermined number of impulses for selecting bridged ringing as the type of ringing to be utilized in ringing over the selected line, and means operative only in the event the number of impulses in said preceding digit is greater than said predetermined number for at least partially selecting the code of the ringing current to be projected over the selected line.

49. In a telephone system, a group of trunk lines, an automatic switch having access to said lines, said switch including means operative in response to each of a plurality of series of impulses transmitted to said switch, means responsive to the operation of said first-named means during one series of impulses transmitted to said switch for registering the operation of said switch, and means responsive to the operation of said first-named means during said one series of impulses for causing said switch to select one of said lines.

50. In a telephone system, a group of trunk lines, a plurality of automatic switches having access to said lines, means automatically operative to select an idle one of said lines each time another of said lines is made busy, at least one of said switches including a group of unit relays and a subgroup relay, each of said unit relays being operative to select either of two of said lines depending upon the operated or non-operated condition of said subgroup relay, and means responsive to a call to one of said lines for causing the operation of said subgroup relay and one of said unit relays.

51. In a telephone ssytem, a group of trunk lines, a plurality of automatic switches having access to said lines, means automatically operative to select an idle one of said lines each time another of said lines is made busy, at least one of said switches including a group of unit relays and a subgroup relay, each of said unit relays being operative to select either of two of said lines depending upon the operated or non-operated condition of said subgroup relay, means responsive to a call to one of said lines for causing the operation of one of said unit relays without causing the operation of said subgroup relay, and means responsive to a call to one of said lines when certain of said lines are busy for causing the operation of said subgroup relay and one of said unit relays.

52. In a telephone system, a group of trunk lines, a plurality of automatic switches having access to said lines, means automatically operative to select an idle one of said lines each time another of said lines is made busy, at least one of said switches including a group of unit relays and a subgroup relay, each of said unit relays being operative to select either of two of said lines depending upon the operated or non-operated condition of said subgroup relay, means responsive to a call to one of said lines for causing the operation of one of said unit relays without causing the operation of said subgroup relay, and means responsive to a call to one of said lines when at least half of said group of lines are busy for causing the operation of said subgroup relay and one of said unit relays.

53. In a telephone system, a group of trunk lines, said lines being divided into two subgroups, a plurality of automatic switches having access to said lines, said lines being arranged to be marked as busy when taken for use by said switches, means automatically operative to select said lines for use in a definite order, said means being so arranged that an idle line is selected immediately a previously selected line is made busy, at least one of said switches including a group of unit relays and a subgroup relay, each of said unit relays being operative to select either of two of said lines depending upon the operated or non-operated condition of said subgroup relay, means responsive to a call to one of said lines for causing the operation of one of said unit relays without causing the operation of said subgroup relay when at least one of the lines of one of said subgroups is idle, and means responsive to a call to one of said lines when all of the lines of said one subgroup are busy for causing the operation of said subgroup relay and one of said unit relays.

54. In a telephone system, a group of trunk lines, a plurality of automatic switches having access to said lines, said lines being arranged to be marked as busy when taken for use by said switches, a group of relays individually corresponding to said lines, each of said relays being connected and arranged to operate when the corresponding line is marked as busy, means controlled by said relays for selecting said lines for use in a definite order, said means being so arranged that an idle line is selected in response to the operation of the one of said relays which corresponds to a previously selected line, at least one of said switches including a group of unit relays and a subgroup relay, each of said unit relays being operative to select either of two of said lines depending upon the operated or non-operated condition of said subgroup relay, and means responsive to a call to one of said lines for causing the operation of said subgroup relay and the one of said unit relays which is operative to select a previously selected idle one of said lines.

55. In a telephone system, a group of trunk lines a plurality of automatic switches having access to said lines, said lines being arranged to be marked as busy when taken for use by said switches, a group of relays individually corresponding to said lines, each of said relays being connected and arranged to operate when the corresponding line is marked as busy, means controlled by said relays for selecting said lines for use in a definite order, said means being so arranged that an idle line is selected in response to the operation of the one of said relays which corresponds to a previously selected line, at least one of said switches including a group of unit relays and a subgroup relay, each of said unit relays being operative to select either of two of said lines depending upon the operated or non-operated condition of said subgroup relay, means responsive to a call to one of said lines for causing the operation of the one of said unit relays which is operative to select a previously selected idle one of said lines without causing the operation of said subgroup relay, and means responsive to a call to one of said lines when certain of said lines are busy for causing the operation of said subgroup relay and the one of said unit relays which is operative to select a previously selected idle one of said lines.

56. In a telephone system, a group of trunk lines, a plurality of automatic switches having access to said lines, said lines being arranged to be marked as busy when taken for use by said switches, a group of relays individually corresponding to said lines, each of said relays being connected and arranged to operate when the corresponding line is marked as busy, means controlled by said relays for selecting said lines for use in a definite order, said means being so arranged that an idle line is selected in response to the operation of the one of said relays which corresponds to a previously selected line, at least one of said switches including a group of unit relays and a subgroup relay, each of said unit relays being operative to select either of two of said lines depending upon the operated or non-operated condition of said subgroup relay, means responsive to a call to one of said lines for causing the operation of the one of said unit relays which is operative to select a previously selected idle one of said lines without causing the operation of said subgroup relay, and means responsive to a call to one of said lines when at least half of said lines are busy for causing the operation of said subgroup relay and the one of said unit relays which is operative to select a previously selected idle one of said lines.

57. In a telephone system, a group of trunk lines, said lines being divided into two subgroups, a plurality of automatic switches having access to said lines, said lines being arranged to be marked as busy when taken for use by said switches, a group of relays individually corresponding to said lines, each of said relays being connected and arranged to operate when the corresponding line is marked as busy, means controlled by said relays for selecting said lines for use in a definite order, said means being so arranged that an idle line is selected in response to the operation of the one of said relays which corresponds to a previously selected line, at least one of said switches including a group of unit relays and a subgroup relay, each of said unit relays being operative to select either of two of said lines depending upon the operated or non-operated condition of said subgroup relay, means responsive to a call to one of said lines for causing the operation of the one of said unit relays which is operative to select a previously selected one of said lines included in one of said subgroups without causing the operation of said subgroup relay, and means responsive to a call to one of said lines when all of the lines of said one subgroup are busy for causing the operation of said subgroup relay and the one of said unit relays which is operative to select a previously selected line included in the other of said subgroups.

58. In a telephone system, a plurality of lines, a group of finder switches having access to said lines, a group of allotter relays individually corresponding to said switches, said relays being arranged sequentially to operate to select idle ones of said switches, start circuits controlled by said allotter relays and individually extending to said switches, means responsive to the creation of a calling condition on one of said lines for completing one of said start circuits thereby to condition one of said switches to seize said one line, means in said one switch and responsive to the operation of said last-named means for initiating the sequential operation of said allotter relays, said relays being arranged successively to prepare said start circuits during the sequential operation thereof, a control relay operative substantially simultaneously with the operation of each of said allotter relays, a holding circuit for said control relay, a slow-to-release relay, means responsive to the operation of said slow-to-release relay for preparing said holding circuit, said holding circuit being completed in response to the operation of said control relay, an operating circuit for said slow-to-release relay, means operative when said one switch is conditioned for operation for completing said operating circuit, and means responsive to the operation of the first of said allotter relays to operate for interrupting said operating circuit.

59. In a telephone system, a plurality of subscribers' lines, certain of said lines being of the multi-party type, said multi-party lines individually including two metallic conductors and being arranged for divided ringing, at least one of said lines being of the ground return type, apparatus for projecting ringing current over either conductor of a selected one of said lines, an automatic switch having access to said lines and operative to select a desired line therefrom, said switch including impulse responsive means for causing said switch to select one of said lines, means controlled by said impulse responsive means for selecting one conductor of a selected line for conducting ringing current in ringing over the selected line, and means for preventing said last-named means from selecting the ground return side of a selected line of the ground return type for conducting ringing current in ringing over the selected line.

60. In a telephone system, a plurality of subscribers' lines, certain of said lines being of the multi-party type, said multi-party lines individually including two metallic conductors and being arranged for divided ringing, at least one of said lines being of the ground return type, a ringing current source including a grounded output terminal and an ungrounded output terminal adapted to be connected to either conductor of a selected one of said lines to project ringing current over said one line, an automatic switch having access to said lines and operative to select a desired line therefrom, said switch including impulse responsive means for causing said switch to select one of said lines, means controlled by said impulse responsive means for selecting one conductor of a selected line for conducting ringing current in ringing over the selected line, and means for preventing said last-named means from selecting the ground return side of a selected line of the ground return type for conducting ringing current in ringing over the selected line, thereby to prevent said ringing current source from being short-circuited.

61. In a telephone system, a plurality of subscribers' lines, certain of said lines being of the multi-party type, said multi-party lines individually including two metallic conductors and being arranged for divided ringing, a group of said lines being of the ground return type, a ringing current source including a grounded output terminal and an ungrounded output terminal adapted to be connected to either conductor of a selected one of said lines to project ringing current over said one line, an automatic switch having access to said lines and operative to select a desired line therefrom, a group relay in said switch and operative to select said group of ground return lines, a group of impulse counting relays, means controlled by said counting relays for causing the operation of said group relay, means controlled by said counting relays for selecting a desired one of said ground return lines, means controlled by said counting relays for selecting one conductor of a selected line for connection to the ungrounded output terminal of said source to ring over the selected line, and means controlled by said group relay for preventing said last-named means from selecting the ground return side of the selected ground return line for connection to the ungrounded output terminal of said source, thereby to prevent said source from being short-circuited during the ringing operation.

62. In a telephone system, a plurality of subscribers' lines of the multi-party type, certain of said lines being arranged for bridged ringing and others of said lines being arranged for divided ringing, an automatic switch operative to select a desired line from said plurality of lines, said switch including means operative in response to impulses transmitted to said switch, said impulses being divided into a plurality of digits including at least two line selecting digits, means operative in response to the operation of said first named means during the impulses of a digit preceding all line selecting digits for determining whether bridged or divided ringing will be utilized in ringing over a selected one of said lines, and means operative in response to the operation of said first named means during the impulses of a digit preceding all line selecting digits for registering the operation of said switch.

63. In a telephone system, a plurality of subscribers' lines of the multi-party type, certain of said lines being arranged for bridged ringing and others of said lines being arranged for divided ringing, an automatic switch operative to select a desired line from said plurality of lines, said switch including means operative in response to impulses transmitted to said switch, said impulses being divided into a plurality of digits including at least two line selecting digits, means operative in response to the operation of said first named means during the impulses of a digit preceding all line selecting digits and only in the event said preceding digit comprises a predetermined number of impulses for selecting bridged ringing as the type of ringing to be utilized in ringing over a selected line, means operative in response to the operation of said first named means during the impulses of said preceding digit and only in the event said preceding digit comprises a different predetermined number of impulses for selecting divided ringing as the type of ringing to be utilized in ringing over the selected line, and means operative in response to the operation of said first named means during the impulses of a digit preceding all line selecting digits for registering the operation of said switch.

64. In a telephone system, a plurality of subscribers' lines of the multi-party type, an automatic switch operative to select a desired line from said plurality of lines, apparatus for projecting ringing current of any one of a plurality of different codes over a selected one of said lines, said switch including means operative in response to impulses transmitted to said switch, said impulses being divided into a plurality of digits including at least two line selecting digits, means operative in response to the operation of said first named means during the impulses of a digit preceding all line selecting digits for at least partially selecting the code of the ringing current to be projected over a selected line, and means operative in response to the operation of said first named means during the impulses of a digit preceding all line selecting digits for registering the operation of said switch.

65. In a telephone system, a plurality of subscribers' lines of the multi-party type, certain of said lines being arranged for bridged ringing and others of said lines being arranged for divided ringing, an automatic switch operative to select a desired line from said plurality of lines, apparatus for projecting ringing current of any one of a plurality of different codes over a selected one of said lines, said switch including means operative in response to impulses transmitted to said switch, said impulses being divided into a plurality of digits including at least two line selecting digits, means operative in response to the operation of said first named means during a digit preceding all line selecting digits for selecting either bridged or divided ringing to be utilized in ringing over a selected one of said lines, means also operative in response to the operation of said first named means during said preceding digit for at least partially selecting the code of the ringing current to be projected over a selected one of said lines, and means operative in response to the operation of said first named means during the impulses of a digit preceding all line selecting digits for registering the operation of said switch.

66. In a telephone system, a plurality of subscribers' lines of the multi-party type, certain of said lines being arranged for bridged ringing and others of said lines being arranged for divided ringing, an automatic switch operative to select a desired line from said plurality of lines, apparatus for projecting ringing current of any one of a plurality of different codes over a selected one of said lines, said switch including means operative in response to impulses transmitted to said switch, said impulses being divided into a plurality of digits including at least two line selecting digits, means operative in response to the operation of said first named means during a digit preceding said line selecting digits for selecting either bridged or divided ringing to be utilized in ringing over a selected one of said lines, means also operative in response to the operation of said first named means during said preceding digit for at least partially selecting the code of the ringing current to be projected over a selected one of said lines, means for preventing the operation of said last named means in the event divided ringing is selected as the type of ringing to be utilized in ringing over the selected line, and means operative in response to the operation of said first named means during the impulses of a digit preceding all line selecting digits for registering the operation of said switch.

67. In a telephone system, a plurality of subscribers' lines of the multi-party type, certain of said lines being arranged for bridged ringing and others of said lines being arranged for divided ringing, an automatic switch operative to select a desired line from said plurality of lines, apparatus for projecting ringing current of any one of a plurality of different codes over a selected one of said lines, said switch including means operative in response to impulses transmitted to said switch, said impulses being divided into a plurality of digits including at least two line selecting digits, means operative in response to the operation of said first named means during the impulses of a digit preceding all line selecting digits and only in the event said preceding digit comprises a predetermined number of impulses for selecting divided ringing as the type of ringing to be utilized in ringing over a selected one of said lines, means operative in response to the operation of said first named means during said preceding digit and only in the event said preceding digit comprises a different predetermined number of impulses for selecting bridged ringing as the type of ringing to be utilized in ringing over the selected line, means operative in response to the operation of said first named means during the impulses of said preceding digit for at least partially selecting the code of the ringing current to be projected over the selected line, and means operative in response to the operation of said first named means during the impulses of a digit preceding all line selecting digits for registering the operation of said switch.

68. In a telephone system, a plurality of subscribers' lines of the multi-party type, certain of said lines being arranged for bridged ringing and others of said lines being arranged for divided ringing, an automatic switch operative to select a desired line from said plurality of lines, apparatus for projecting ringing current of any one of a plurality of different codes over a selected one of said lines, said switch including means operative in response to impulses transmitted to said switch, said impulses being divided into a plurality of digits including at least two line selecting digits, means operative in response to the operation of said first named means during the impulses of a digit preceding all line selecting digits and only in the event said preceding digit comprises a predetermined number of impulses for selecting divided ringing as the type of ringing to be utilized in ringing over a selected one of said lines, means operative in response to the operation of said first named means during said preceding digit and only in the event said preceding digit comprises a number of impulses greater than said predetermined number of impulses for selecting bridged ringing as the type of ringing to be utilized in ringing over the selected line, means operative in response to the operation of said first named means during said preceding digit and only in the event the number of impulses in said preceding digit is greater than said predetermined number for at least partially selecting the code of the ringing current to be projected over the selected line, and means operative in response to the operation of said first named means during the impulses of a digit preceding all line selecting digits for registering the operation of said switch.

69. In a telephone system, a plurality of subscribers' lines of the multi-party type, certain of said lines being arranged for bridged ringing and other of said lines being arranged for divided ringing, an automatic switch operative to select a desired line from said plurality of lines, said switch including means operative in response to impulses transmitted to said switch, said impulses being divided into a plurality of digits including at least two line selecting digits, means operative in response to the operation of said first named means during the impulses of a digit preceding all line selecting digits for selecting either bridged or divided ringing to be utilized in ringing over a selected one of said lines, and means operative in response to the operation of said first named means during the impulses of a digit following all line selecting digits for determining the side of the selected line over which ringing current is to be projected in the event the selected line is arranged for divided ringing.

70. In a telephone system, a plurality of subscribers' lines of the multi-party type, certain of said lines being arranged for bridged ringing and others of said lines being arranged for divided ringing, an automatic switch operative to select a desired line from said plurality of lines, said switch including means operative in response to impulses transmitted to said switch, said impulses being divided into a plurality of digits including at least two line selecting digits, means operative in response to the operation of said first named means during the impulses of a digit preceding all line selecting digits and only in the event said preceding digit comprises a predetermined number of impulses for selecting bridged ringing as the type of ringing to be utilized in ringing over a selected line, means operative in response to the operation of said first named means during the impulses of said preceding digit and only in the event said preceding digit comprises a different predetermined number of impulses for selecting divided ringing as the type of ringing to be utilized in ringing over the selected line, and means operative in response to the operation of said first named means during the impulses of a digit following all line selecting digits for determining the side of the selected line over which ringing current is to be projected in the event the selected line is arranged for divided ringing.

71. In a telephone system, a plurality of subscribers' lines of the multi-party type, an automatic switch operative to select a desired line from said plurality of lines, apparatus for projecting ringing current of any one of a plurality of different codes over a selected one of said lines, said switch including means operative in response to impulses transmitted to said switch, said impulses being divided into a plurality of digits including at least two line selecting digits, means operative in response to the operation of said first named means during the impulses of a digit preceding all line selecting digits for at least partially selecting the code of the ringing current to be projected over a selected line, and means operative in response to the operation of said first named means during the impulses of a digit following all line selecting digits for finally selecting the code of the ringing current to be projected over the selected line.

72. In a telephone system, a plurality of subscribers' lines of the multi-party type, certain of said lines being arranged for bridged ringing and other of said lines being arranged for divided ringing, an automatic switch operative to select a desired line from said plurality of lines, apparatus for projecting ringing current of any one of a plurality of different codes over a selected one of said lines, said switch including means operative in response to impulses transmitted to said switch, said impulses being divided into a plurality of digits including at least two line selecting digits, means operative in response to the operation of said first named means during a digit preceding all line selecting digits for selecting either bridged or divided ringing to be utilized in ringing over a selected one of said lines, means also operative in response to the operation of said first named means during said preceding digit for at least partially selecting the code of the ringing current to be projected over a selected one of said lines, and means operative in response to the operation of said first named means during the impulses of a digit following all line selecting digits for finally selecting the code of the ringing current to be projected over the selected line and for determining the side of the selected line over which the ringing current is to be projected in the event the selected line is arranged for divided ringing.

73. In a telephone system, a plurality of subscribers' lines of the multi-party type, certain of said lines being arranged for bridged ringing and other of said lines being arranged for divided ringing, an automatic switch operative to select a desired line from said plurality of lines, said switch including means operative in response to impulses transmitted to said switch, said impulses being divided into a plurality of digits including at least two line selecting digits, means operative in response to the operation of said first named means during the impulses of a digit preceding all line selecting digits for selecting either bridged or divided ringing to be utilized in ringing over a selected one of said lines, means operative in response to the operation of said first named means during the impulses of a digit preceding all line selecting digits for registering the operation of said switch, and means operative in response to the operation of said first named means during the impulses of a digit following all line selecting digits for determining the side of the selected line over which ringing current is to be projected in the event the selected line is arranged for divided ringing.

74. In a telephone system, a plurality of subscribers' lines of the multi-party type, certain of said lines being arranged for bridged ringing and others of said lines being arranged for divided ringing, an automatic switch operative to select a desired line from said plurality of lines, said switch including means operative in response to impulses transmitted to said switch, said impulses being divided into a plurality of digits including at least two line selecting digits, means operative in response to the operation of said first named means during the impulses of a digit preceding all line selecting digits and only in the event said preceding digit comprises a predetermined number of impulses for selecting bridged ringing as the type of ringing to be utilized in ringing over the selected line, means operative in response to the operation of said first named means during the impulses of said preceding digit and only in the event said preceding digit comprises a different predetermined number of impulses for selecting divided ringing as the type of ringing to be utilized in ringing over the selected line, means operative in response to the operation of said first named means during the impulses of a digit preceding all line selecting digits for registering the operation of said switch, and means operative in response to the operation of said first named means during the impulses of a digit following all line selecting digits for determining the side of the selected line over which ringing current is to be projected in the event the selected line is arranged for divided ringing.

75. In a telephone system, a plurality of subscribers' lines of the multi-party type, an automatic switch operative to select a desired line from said plurality of lines, apparatus for projecting ringing current of any one of a plurality of different codes over a selected one of said lines, said switch including means operative in response to impulses transmitted to said switch, said impulses being divided into a plurality of digits including at least two line selecting digits, means operative in response to the operation of said first named means during the impulses of a digit preceding all line selecting digits for at least partially selecting the code of the ringing current to be projected over a selected line, means operative in response to the operation of said first named means during the impulses of a digit preceding all line selecting digits for registering the operation of said switch, and means operative in response to the operation of said first named means during the impulses of a digit following all line selecting digits for finally selecting the code of the ringing current to be projected over the selected line.

76. In a telephone system, a plurality of subscribers' lines of the multi-party type, certain of said lines being arranged for divided ringing, an automatic switch operative to select a desired line from said plurality of lines, apparatus for projecting ringing current of any one of a plurality of different codes over a selected one of said lines, said switch including means operative in response to impulses transmitted to said switch, said impulses being divided into a plurality of digits including at least two line selecting digits, means operative in response to the operation of said first named means during the impulses of a digit preceding all line selecting digits for at least partially selecting the code of the ringing current to be projected over a selected line, means operative in response to the operation of said first named means during the impulses of a digit preceding all line selecting digits for registering the operation of said switch, and means operative in response to the operation of said first named means during the impulses of a digit following all line selecting digits for finally selecting the code of the ringing current to be projected over the selected line and for determining the side of the selected line over which the ringing current is to be projected in the event the selected line is arranged for divided ringing.

77. In a telephone system, a plurality of subscribers' lines of the multi-party type, an automatic switch operative to select a desired line from said plurality of lines, apparatus for projecting ringing current having any one of different station selecting characteristics over a selected one of said lines, said switch including means operative in response to impulses transmitted to said switch, said impulses being divided into a plurality of digits including at least two line selecting digits, and means operative in response to the operation of said first named means during the impulses of a digit preceding all line selecting digits for at least partially selecting the character of the ringing current to be projected over the selected line.

78. In a telephone system, a plurality of subscribers' lines of the multi-party type, an automatic switch operative to select a desired line from said plurality of lines, apparatus for projecting ringing current having any one of different station selecting characteristics over a selected one of said lines, said switch including means operative in response to impulses transmitted to said switch, said impulses being divided into a plurality of digits including at least two line selecting digits, means operative in response to the operation of said first named means during the impulses of a digit preceding all line selecting digits for at least partially selecting the character of the ringing current to be projected over the selected line, and means also responsive to the operation of said first named means during the impulses of a digit preceding all line selecting digits for registering the operation of said switch.

79. In a telephone system, a plurality of subscribers' lines of the multi-party type, an automatic switch operative to select a desired line from said plurality of lines, apparatus for projecting ringing current having any one of different station selecting characteristics over a selected one of said lines, said switch including means operative in response to impulses transmitted to said switch, said impulses being divided into a plurality of digits including at least two line selecting digits, means operative in response to the operation of said first named means during the impulses of a digit preceding all line selecting digits for partially selecting the character of the ringing current to be projected over the selected line, means also responsive to the operation of said first named means during the impulses of a digit preceding all line selecting digits for registering the operation of said switch, and means responsive to the operation of said first named means during the impulses of a digit following all line selecting digits for finally selecting the character of the ringing current to be projected over the selected line.

80. In a telephone system, a plurality of subscribers' lines of the multi-party type, an automatic switch operative to select a desired line from said plurality of lines, apparatus for projecting ringing current having any one of different station selecting characteristics over a selected one of said lines, said switch including means operative in response to impulses transmitted to said switch, said impulses being divided into a plurality of digits including at least two line selecting digits, means operative in response to the operation of said first named means during the impulses of a digit preceding all line selecting digits for partially selecting the character of the ringing current to be projected over the selected line, and means responsive to the operation of said first named means during the impulses of a digit following all line selecting digits for finally selecting the character of the ringing current to be projected over the selected line.

81. In a telephone system, a plurality of subscribers' lines of the multi-party type, an automatic switch operative to select a desired line from said plurality of lines and including a group of impulse counting relays, said relays being connected and arranged sequentially to operate in response to succeeding impulses of each series of impulses transmitted to said switch, apparatus for projecting ringing current having any one of a plurality of different station selecting characteristics over a selected one of said lines, a device operative to register the operation of said switch, a pair of relays individually operative to select different groups of different ringing current station selecting characteristics, means controlled by one of said impulse counting relays for causing the operation of one of said pair of relays at the end of one series of impulses transmitted to said switch in the event said one impulse series comprises a predetermined number of impulses, means controlled by another of said impulse counting relays for causing the operation of the other of said pair of relays at the end of said one impulse series in the event said one impulse series comprises a different predetermined number of impulses, and means responsive to the operation of either of said pair of relays for causing the operation of said register device.

82. In a telephone system, a plurality of subscribers' lines of the multi-party type, an automatic switch operative to select a desired line from said plurality of lines and including a group of impulse counting relays, said relays being connected and arranged sequentially to operate in response to succeeding impulses of each series of impulses transmitted to said switch, apparatus for projecting ringing current having any one of a plurality of different station selecting characteristics over a selected one of said lines, a device operative to register the operation of said switch, a pair of relays individually operative to select different groups of different ringing current station selecting characteristics, means operative to cause the operation of one of said pair of relays at the end of one series of impulses transmitted to said switch in the event a predetermined one of said impulse counting relays is operated at the end of said one impulse series, means operative to cause the operation of the other of said pair of relays at the end of said one impulse series in the event a different one of said impulse counting relays is operated at the end of said one impulse series, means responsive to the operation of either of said pair of relays for releasing the one of said impulse counting relays which is operated at the end of said one impulse series, thereby to condition said impulse counting relays to respond to a succeeding series of impulses transmitted to said switch, and means responsive to the operation of either of said pair of relays for causing the operation of said register device.

83. In a telephone system, a plurality of subscribers' lines of the multi-party type, certain of said lines being arranged for one type of selective ringing and others of said lines being arranged for a different type of selective ringing, an automatic switch operative to select a desired line from said plurality of lines and including a group of impulse counting relays, said relays being connected and arranged sequentially to operate in response to succeeding impulses of each series of impulses transmitted to said switch, a device operative to register the operation of said switch, a first relay operative to select said one type of selective ringing for use in ringing over a selected line, a second relay operative to select said different type of selective ringing for use in ringing over a selected line, means controlled by one of said counting relays for causing the operation of said first relay at the end of one series of impulses transmitted to said switch in the event said one impulse series comprises a predetermined number of impulses, means controlled by another of said impulse counting relays for causing the operation of said second relay at the end of said one impulse series in the event said one impulse series comprises a different predetermined number of impulses, and means responsive to the operation of either of said first and second relays for causing the operation of said register device.

84. In a telephone system, a plurality of subscribers' lines of the multi-party type, certain of said lines being arranged for one type of selective ringing and others of said lines being arranged for a different type of selective ringing, an automatic switch operative to select a desired line from said plurality of lines and including a group of impulse counting relays, said relays being connected and arranged sequentially to operate in response to succeeding impulses of each series of impulses transmitted to said switch, a device operative to register the operation of said switch, a first relay operative to select said one type of selective ringing for use in ringing over a selected line, a second relay operative to select said different type of selective ringing for use in ringing over a selected line, means operative to cause the operation of said first relay at the end of one series of impulses transmitted to said switch in the event a predetermined one of said impulse counting relays is operated at the end of said one impulse series, means operative to cause the operation of said second relay at the end of said one impulse series in the event a different one of said impulse counting relays is operated at the end of said one impulse series, means responsive to the operation of either of said first and second relays for releasing the one of said impulse counting relays which is operated at the end of said one impulse series, thereby to condition said impulse counting relays to respond to a succeeding series of impulses transmitted to said switch, and means responsive to the operation of either of said first and second relays for causing the operation of said register device.

85. In a telephone system, a plurality of subscribers' lines of the multi-party type, certain of said lines being arranged for one type of selective ringing and others of said lines being arranged for a different type of selective ringing, an automatic switch operative to select a desired line from said plurality of lines and including a group of impulse counting relays, said relays being connected and arranged sequentially to operate in response to succeeding impulses of each series of impulses transmitted to said switch, apparatus for projecting ringing current having any one of a plurality of station selecting characteristics over a selected one of said lines, a device operative to register the operation of said switch, a first relay operative to select said one type of selective ringing for use in ringing over a selected line, a pair of relays each operative to select said different type of selective ringing for use in ringing over a selected line and individually operative to select different groups of different ringing current station selecting characteristics, means controlled by one of said impulse counting relays for causing the operation of said first relay at the end of one series of impulses transmitted to said switch in the event said one impulse series comprises a first predetermined number of impulses, means controlled by a second of said impulse counting relays for causing the operation of one of said pair of relays at the end of said one impulse series in the event said one impulse series comprises a second predetermined number of impulses, means controlled by a third of said impulse counting relays for causing the operation of the other of said pair of relays at the end of said one impulse series in the event said one impulse series comprises a third predetermined number of impulses, and means responsive to the operation of any one of said first and said pair of relays for causing the operation of said register device.

86. In a telephone system, a plurality of subscribers' lines of the multi-party type, certain of said lines being arranged for one type of selective ringing and others of said lines being arranged for a different type of selective ringing, an automatic switch operative to select a desired line from said plurality of lines and including a group of impulse counting relays, said relays being connected and arranged sequentially to operate in response to succeeding impulses of each series of impulses transmitted to said switch, apparatus for projecting ringing current having any one of a plurality of station selecting characteristics over a selected one of said lines, a device operative to register the operation of said switch, a first relay operative to select said one type of selective ringing for use in ringing over a selected line, a pair of relays each operative to select said different type of selective ringing for use in ringing over a selected line and individually operative to select different groups of different ringing current station selecting characteristics, means operative to cause the operation of said first relay at the end of one series of impulses transmitted to said switch in the event a predetermined one of said impulse counting relays is operated at the end of said one impulse series, means operative to cause the operation of one of said pair of relays at the end of said one impulse series in the event a second of said impulse counting relays is operated at the end of said one impulse series, means operative to cause the operation of the other of said pair of relays at the end of said one impulse series in the event a third of said impulse counting relays is operated at the end of said one impulse series, means responsive to the operation of any one of said first and said pair of relays for releasing the one of said impulse counting relays which is operated at the end of said one impulse series, thereby to condition said impulse counting relays to respond to a succeeding series of impulses transmitted to said switch, and means responsive to the operation of any one of said first and said pair of relays for causing the operation of said register device.

87. In a telephone system, a plurality of lines divided into groups, certain of said lines being subscribers' lines of the multi-party type, an automatic switch having access to said lines and including a plurality of group relays individually corresponding to said groups of lines and a plurality of unit relays individually corresponding to the lines of each group, operating circuits for said relays, apparatus for projecting ringing current having any one of different station selecting characteristics over a selected one of said lines, said switch including means operative in response to impulses transmitted to said switch, said impulses being divided into digits including at least two line selecting digits, means controlled by said first named means and operative at the end of a digit preceding all line selecting digits for at least partially selecting the character of the ringing current to be projected over the selected line and for preparing the operating circuit for at least one of said group relays, means controlled by said first named means and operative at the end of the impulses of the first of said line selecting digits for completing one of said prepared operating circuits, means controlled by said first named means and operative at the end of the second of said line selecting digits for completing the operating circuit for one of said unit relays, and means controlled by said first named means and operative at the end of a single predetermined digit for completing the operating circuit for one of said group relays and the operating circuit for one of said unit relays.

88. In a telephone system, a plurality of lines divided into groups, certain of said lines being subscribers' lines of the multi-party type, an automatic switch having access to said lines and including a plurality of group relays individually corresponding to said groups of lines and a plurality of unit relays individually corresponding to the lines of each group, operating circuits for said relays, apparatus for projecting ringing current having any one of different station selecting characteristics over a selected one of said lines, said switch including means operative in response to impulses transmitted to said switch, said impulses being divided into digits including at least two line selecting digits, means controlled by said first named means and operative at the end of a digit preceding all line selecting digits for at least partially selecting the character of the ringing current to be projected over the selected line and for preparing the operating circuit for at least one of said group relays, means controlled by said first named means and operative at the end of the impulses of the first of said line selecting digits for completing one of said prepared operating circuits, and means controlled by said first named means and operative at the end of the second of said line selecting digits for completing the operating circuit for one of said unit relays.

89. In a telephone system, a plurality of lines divided into groups, certain of said lines being subscribers' lines of the multi-party type, an automatic switch having access to said lines and including a plurality of group relays individually corresponding to said groups of lines and a plurality of unit relays individually corresponding to the lines of each group, operating circuits for said relays, apparatus for projecting ringing current having any one of different station selecting characteristics over a selected one of said lines, said switch including means operative in response to impulses transmitted to said switch, said impulses being divided into digits including at least two line selecting digits, means controlled by said first named means and operative at the end of a digit preceding all line selecting digits for at least partially selecting the character of the ringing current to be projected over the selected line, and means controlled by said first named means and operative at the end of a single predetermined digit for completing the operating circuit for one of said group relays and the operating circuit for one of said unit relays.

90. In a telephone system, a plurality of lines divided into groups, certain of said lines being subscribers' lines of the multi-party type, an automatic switch having access to said lines and including a plurality of group relays individually corresponding to said groups of lines, apparatus for projecting ringing current having any one of different station selecting characteristics over a selected one of said lines, said switch including means operative in response to impulses transmitted to said switch, said impulses being divided into digits including at least two line selecting digits, means controlled by said first named means and operative at the end of a digit preceding all line selecting digits for at least partially selecting the character of the ringing current to be projected over the selected line and for preparing the operating circuit for at least one of said group relays, and means controlled by said first named means and operative at the end of the impulses of the first of said line selecting digits for completing one of said prepared operating circuits.

91. In a telephone system, a plurality of lines divided into groups and including multi-party subscribers' lines, certain of said subscribers' lines being arranged for one type of selective ringing and others thereof being arranged for a different type of selective ringing, an automatic switch having access to said lines and including a plurality of group relays individually corresponding to said groups of lines and a plurality of unit relays individually corresponding to the lines of each group, operating circuits for said relays, said switch including means operative in response to impulses transmitted to said switch, said impulses being divided into digits including at least two line selecting digits, means controlled by said first named means and operative at the end of a digit preceding all line selecting digits for selecting the type of ringing to be utilized in ringing over a selected line and for preparing the operating circuit for at least one of said group relays, means controlled by said first named means and operative at the end of the impulses of the first of said line selecting digits for completing one of said prepared operating circuits, means controlled by said first named means and operative at the end of the second of said line selecting digits for completing the operating circuit for one of said unit relays, and means controlled by said first named means and operative at the end of a single predetermined digit for completing the operating circuit for one of said group relays and the operating circuit for one of said unit relays.

92. In a telephone system, a plurality of lines divided into groups and including multi-party subscribers' lines, certain of said subscribers' lines being arranged for one type of selective ringing and others thereof being arranged for a different type of selective ringing, an automatic switch having access to said lines and including a plurality of group relays individually corresponding to said groups of lines and a plurality of unit relays individually corresponding to the lines of each group, operating circuits for said relays, said switch including means operative in response to impulses transmitted to said switch, said impulses being divided into digits including at least two line selecting digits, means controlled by said first named means and operative at the end of a digit preceding all line selecting digits for selecting the type of ringing to be utilized in ringing over a selected line and for preparing the operating circuit for at least one of said group relays, means controlled by said first named means and operative at the end of the impulses of the first of said line selecting digits for completing one of said prepared operating circuits, and means controlled by said first named means and operative at the end of the second of said line selecting digits for completing the operating circuit for one of said unit relays.

93. In a telephone system, a plurality of lines divided into groups and including multi-party subscribers' lines, certain of said lines being arranged for one type of selective ringing and others thereof being arranged for a different type of selective ringing, an automatic switch having access to said lines and including a plurality of group relays individually corresponding to said groups of lines and a plurality of unit relays individually corresponding to the lines of each group, operating circuits for said relays, said switch including means operative in response to impulses transmitted to said switch, said impulses being divided into digits including at least two line selecting digits, means controlled by said first named means and operative at the end of a digit preceding all line selecting digits for selecting the type of ringing to be utilized in ringing over a selected line and for preparing the operating circuit for at least one of said group relays, and means controlled by said first named means and operative at the end of a single predetermined digit for completing the operating circuit for one of said group relays and the operating circuit for one of said unit relays.

94. In a telephone system, a plurality of lines divided into groups and including multi-party subscribers' lines, certain of said subscribers' lines being arranged for one type of selective ringing and others thereof being arranged for a different type of selective ringing, an automatic switch having access to said lines and including a plurality of group relays individually corresponding to said groups of lines, said switch including means operative in response to impulses transmitted to said switch, said impulses being divided into digits including at least two line selecting digits, means controlled by said first named means and operative at the end of a digit preceding all line selecting digits for selecting the type of ringing to be utilized in ringing over a selected line and for preparing the operating circuit for at least one of said group relays, and means controlled by said first named means and operative at the end of the impulses of the first of said line selecting digits for completing one of said prepared operating circuits.

95. In a telephone system, a plurality of lines divided into groups, an automatic switch having access to said lines and including a plurality of group relays individually corresponding to said groups of lines and a plurality of unit relays individually corresponding to the lines of each group, operating circuits for said relays, a device for registering the operation of said switch, said switch including means operative in response to impulses transmitted to said switch, said impulses being divided into digits including at least two line selecting digits, means controlled by said first named means and operative at the end of a digit preceding all line selecting digits for causing the operation of said register device and for preparing the operating circuit for at least one of said group relays, means controlled by said first named means and operative at the end of the impulses of the first of said line selecting digits for completing one of said prepared operating circuits, means controlled by said first named means and operative at the end of the second of said line selecting digits for completing the operating circuit for one of said unit relays, and means controlled by said first named means and operative at the end of a single predetermined digit for completing the operating circuit for one of said group relays and the operating circuit for one of said unit relays.

96. In a telephone system, a plurality of lines divided into groups, an automatic switch having access to said lines and including a plurality of group relays individually corresponding to said groups of lines and a plurality of unit relays individually corresponding to the lines of each group, operating circuits for said relays, a device for registering the operation of said switch, said switch including means operative in response to impulses transmitted to said switch, said impulses being divided into digits including at least two line selecting digits, means controlled by said first named means and operative at the end of a digit preceding all line selecting digits for causing the operation of said register device and for preparing the operating circuit for at least one of said group relays, means controlled by said first named means and operative at the end of the impulses of the first of said line selecting digits for completing one of said prepared operating circuits, and means controlled by said first named means and operative at the end of the second of said line selecting digits for completing the operating circuit for one of said unit relays.

97. In a telephone system, a plurality of lines divided into groups, an automatic switch having access to said lines and including a plurality of group relays individually corresponding to said groups of lines and a plurality of unit relays individually corresponding to the lines of each group, operating circuits for said relays, a device for registering the operation of said switch, said switch including means operative in response to impulses transmitted to said switch, said impulses being divided into digits including at least two line selecting digits, means controlled by said first named means and operative at the end of a digit preceding all line selecting digits for causing the operation of said register device and for preparing the operating circuit for at least one of said group relays, and means controlled by said first named means and operative at the end of a single predetermined digit for completing the operating circuit for one of said group relays and the operating circuit for one of said unit relays.

98. In a telephone system, a plurality of lines divided into groups, an automatic switch having access to said lines and including a plurality of group relays individually corresponding to said groups of lines, operating circuits for said relays, a device for registering the operation of said switch, said switch including means operative in response to impulses transmitted to said switch, said impulses being divided into digits including at least two line selecting digits, means controlled by said first named means and operative at the end of a digit preceding all line selecting digits for causing the operation of said register device and for preparing the operating circuit for at least one of said group relays, and means controlled by said first named means and operative at the end of the impulses of the first of said line selecting digits for completing one of said prepared operating circuits.

99. In a telephone system comprising an exchange having a line extending thereto which includes at least two conductors and is adapted to have a bridge connected across the conductors thereof when a call is initiated thereon; a link line normally disconnected from said first-mentioned line, a finder switch having access to said link line, a line circuit associated with said lines, means included in said line circuit and operative immediately a bridge is connected across the conductors of said first-mentioned line for causing said finder switch to seize said link line, and means included in said line circuit and operative when said link line is seized for connecting said lines together.

100. In a telephone system comprising an exchange having a line extending thereto which includes at least two conductors and is adapted to have a bridge connected across the conductors thereof when a call is initiated thereon; a link line normally disconnected from said first-mentioned line, a finder switch having access to said link line, a line circuit associated with said lines and including line and cut-off relays, an operating circuit for said line relay including a source of supply and said first-mentioned line, said operating circuit being completed immediately a bridge is connected across the conductors of said first-mentioned line, means responsive to the operation of said line relay for causing said finder switch to seize said link line, said cut-off relay being operative in response to seizure of said link line by said finder switch, and means responsive to the operation of said cut-off relay for connecting said lines together.

101. In a telephone system comprising an exchange having a line extending thereto which includes at least two conductors and is adapted to have a bridge connected across the conductors thereof when a call is initiated thereon; a link line including at least two conductors, a finder switch having a set of fixed contacts terminating said link line and a set of movable contacts adapted to engage said set of fixed contacts, a line circuit associated with said lines and including line and cut-off relays, said line relay being operative immediately a bridge is connected across the conductors of said first-mentioned line, means responsive to the operation of said line relay for causing said finder switch to move said set of movable contacts into engagement with said set of fixed contacts, thereby to seize said link line, said cut-off relay being operative in response to seizure of said link line by said finder switch, and means including contacts controlled by said cut-off relay for connecting at least one of the conductors of said first-mentioned line to a corresponding one of the conductors of said link line, thereby to connect said lines together.

102. In a telephone system comprising an exchange having a line extending thereto which includes at least two conductors and is adapted to have a bridge connected across the conductors thereof when a call is initiated thereon; a link line including at least two conductors, a finder switch having a set of fixed contacts terminating said link line and a set of movable contacts adapted to engage said set of fixed contacts, a line circuit associated with said lines and including a relay, an operating circuit for said relay including a source of supply normally connected across the conductors of said first-mentioned line, at least one of the conductors of said link line being normally disconnected from a corresponding one of the conductors of said first-mentioned line, thereby to prevent the presence of a potential difference between the contacts in said set of fixed contacts in said finder switch when said first-mentioned line is idle, said operating circuit being completed immediately a bridge is connected across the conductors of said first-mentioned line, means responsive to the operation of said relay for causing said finder switch to seize said link line, and means responsive to the operation of said finder switch to seize said link line for connecting said one conductor of said first-mentioned line to the corresponding conductor of said link line, thereby to connect said lines together.

103. In a telephone system comprising an exchange having a line extending thereto which includes at least two conductors and is adapted to have a bridge connected across the conductors thereof when a call is initiated thereon; a link line including at least two conductors, a finder switch having a set of fixed contacts terminating said link line and a set of movable contacts adapted to engage said set of fixed contacts, a line circuit associated with said lines and including line and cut-off relays, an operating circuit for said line relay including a source of supply normally connected across the conductors of said first-mentioned line, at least one of the conductors of said link line being normally disconnected from a corresponding one of the conductors of said first-mentioned line, thereby to prevent the presence of a potential difference between the contacts in said set of fixed contacts in said finder switch when said first-mentioned line is idle, said operating circuit being completed immediately a bridge is connected across the conductors of said first-mentioned line, means responsive to the operation of said line relay for causing said finder switch to seize said link line, said cut-off relay being operative in response to seizure of said link line by said finder switch, and means responsive to the operation of said cut-off relay for interrupting said operating circuit and for connecting said one conductor of said link line to said corresponding one conductor of said first-mentioned line, thereby to connect said lines together.

104. In a telephone system, an exchange having a line extending thereto, a link line normally disconnected from said first-mentioned line, a finder switch having access to said link line, a third line directly connected to said link line, a line circuit associated with said lines, a connector switch having access to said third line, means for causing said connector switch to seize said third line, and means included in said line circuit and responsive to the seizure of said third line for connecting said first-mentioned line to said link line.

JOHN H. VOSS.